(12) United States Patent
Heck et al.

(10) Patent No.: US 12,145,578 B2
(45) Date of Patent: Nov. 19, 2024

(54) DEVICES AND METHODS FOR ASSISTING OPERATION OF VEHICLES BASED ON SITUATIONAL ASSESSMENT FUSING EXPOENTIAL RISKS (SAFER)

(71) Applicant: Nauto, Inc., Palo Alto, CA (US)

(72) Inventors: Stefan Peter Heck, Palo Alto, CA (US); Benjamin Oren Alpert, Sunnyvale, CA (US); Tahmida Binte Mahmud, San Jose, CA (US); Mohammad Saad Billah, San Jose, CA (US); Ilan Hornstein, Menlo Park, CA (US)

(73) Assignee: Nauto, Inc., Palo Alto, CA (US)

( * ) Notice: Subject to any disclaimer, the term of this patent is extended or adjusted under 35 U.S.C. 154(b) by 194 days.

(21) Appl. No.: 17/726,236

(22) Filed: Apr. 21, 2022

(65) Prior Publication Data

US 2023/0166743 A1 Jun. 1, 2023

Related U.S. Application Data

(60) Provisional application No. 63/285,073, filed on Dec. 1, 2021.

(51) Int. Cl.
*G06F 17/00* (2019.01)
*B60Q 9/00* (2006.01)
(Continued)

(52) U.S. Cl.
CPC .......... *B60W 30/095* (2013.01); *B60Q 9/008* (2013.01); *B60W 30/09* (2013.01); *B60W 40/08* (2013.01);
(Continued)

(58) Field of Classification Search
CPC .... B60W 30/095; B60W 30/09; B60W 40/08; B60W 50/0097; B60W 50/14;
(Continued)

(56) References Cited

U.S. PATENT DOCUMENTS 11,474,893 B2  10/2022 Donegan et al.
11,574,462 B1 *  2/2023 Bhatia ...................... G06T 3/60
(Continued)

FOREIGN PATENT DOCUMENTS

GB    2494020 A  *  2/2013 ........... G01S 13/931

OTHER PUBLICATIONS

Collision Risk in Autonomous Vehicles: Classification, Challenges, and Open Research Areas (Year: 2024).*
(Continued)

*Primary Examiner* — Ronnie M Mancho
(74) *Attorney, Agent, or Firm* — Vista IP Law Group, LLP

(57) ABSTRACT

An apparatus includes: a first sensor configured to provide a first input associated with an environment outside a vehicle; a second sensor configured to provide a second input associated with an operation of the vehicle; and a processing unit having a first-stage processing system and a second-stage processing system; the first-stage processing system configured to receive the first input and the second input, process the first input to obtain a first time series of information, and process the second input to obtain a second time series of information; wherein the second-stage processing system comprises a neural network model configured to receive the first time series of information and a second time series of information in parallel; and wherein the neural network is configured to process the first time series and the second time series to determine a probability of a predicted event associated with an operation of the vehicle.

25 Claims, 37 Drawing Sheets

(51) Int. Cl.
*B60W 30/09* (2012.01)
*B60W 30/095* (2012.01)
*B60W 40/08* (2012.01)
*B60W 50/00* (2006.01)
*B60W 50/14* (2020.01)
*G05B 13/02* (2006.01)
*G06N 3/04* (2023.01)
*G07C 5/04* (2006.01)

(52) U.S. Cl.
CPC ........ *B60W 50/0097* (2013.01); *B60W 50/14* (2013.01); *G05B 13/027* (2013.01); *G06N 3/04* (2013.01); *G07C 5/04* (2013.01); *B60W 2050/143* (2013.01); *B60W 2050/146* (2013.01); *B60W 2420/403* (2013.01); *B60W 2420/408* (2024.01); *B60W 2520/10* (2013.01); *B60W 2540/00* (2013.01); *B60W 2554/802* (2020.02); *B60W 2556/10* (2020.02)

(58) Field of Classification Search
CPC ..... B60W 2050/143; B60W 2050/146; B60W 2420/403; B60W 2420/408; B60W 2520/10; B60W 2540/00; B60W 2554/802; B60W 2556/10; B60W 2540/223; B60W 2540/225; B60W 50/16; B60W 2540/229; B60W 30/0956; B60Q 9/008; G05B 13/027; G05B 15/02; G06N 3/04; G06N 3/044; G06N 3/045; G06N 3/08; G06N 7/01; G07C 5/04; G07C 5/0866
USPC ......................................................... 701/26
See application file for complete search history.

(56) References Cited

U.S. PATENT DOCUMENTS

| | | | |
|---|---|---|---|
| 11,603,095 | B2 | 3/2023 | Schleede et al. |
| 11,699,282 | B1* | 7/2023 | Saggu ................ G06V 10/774 |
| | | | 382/104 |
| 11,702,011 | B1* | 7/2023 | Suggu .................... G06V 10/82 |
| | | | 348/148 |
| 11,830,259 | B2* | 11/2023 | Ren ...................... G06V 40/18 |
| 2010/0030586 | A1 | 2/2010 | Taylor et al. |
| 2013/0278442 | A1 | 10/2013 | Rubin et al. |
| 2015/0248446 | A1 | 9/2015 | Nordstrom et al. |
| 2017/0072850 | A1 | 3/2017 | Curtis et al. |
| 2017/0228604 | A1 | 8/2017 | Ferguson et al. |
| 2018/0012082 | A1 | 1/2018 | Satazoda et al. |
| 2019/0156426 | A1 | 5/2019 | Drucker et al. |
| 2020/0174481 | A1 | 6/2020 | Van Heukelom et al. |
| 2021/0380115 | A1* | 12/2021 | Alpert ...................... G06N 3/08 |
| 2022/0126818 | A1 | 4/2022 | Marcotte et al. |
| 2023/0166743 | A1 | 6/2023 | Heck et al. |
| 2023/0331061 | A1 | 10/2023 | Yu et al. |

OTHER PUBLICATIONS

PCT International Search Report and Written Opinion for International Appln. No. PCT/US2022/029330, Applicant Nauto, Inc., dated Aug. 24, 2022 (36 pages).

Rezaei, M., et al., "Multisensor Data Fusion Strategies for Advanced Driver Assistance Systems," Tech Education and Publishing, 2009.

Non-Final Office Action for U.S. Appl. No. 17/726,269 dated Jun. 28, 2024.

* cited by examiner

750

SVM

LSTM

CNN

FIG. 33D
FIG. 33E
FIG. 33F
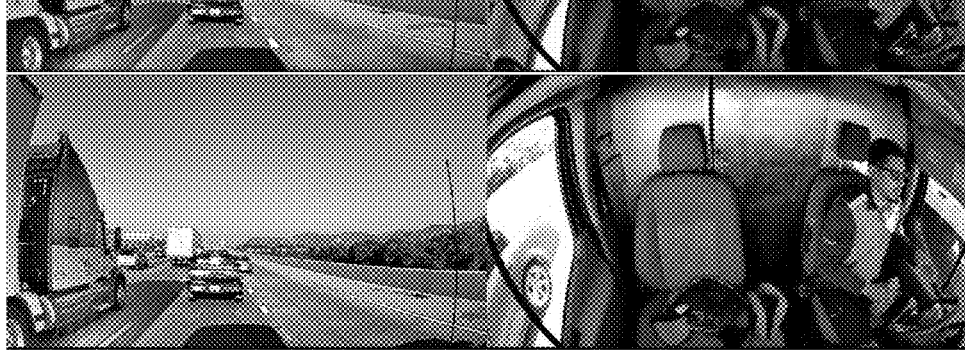
FIG. 33G

DEVICES AND METHODS FOR ASSISTING OPERATION OF VEHICLES BASED ON SITUATIONAL ASSESSMENT FUSING EXPOENTIAL RISKS (SAFER)

RELATED APPLICATION DATA

This application claims priority to, and the benefit of U.S. Provisional Patent Application No. 63/285,073 filed on Dec. 1, 2021. The entire disclosure of the above application is expressly incorporated by reference herein.

FIELD

The field relates to devices and methods for assisting operation of vehicles, scoring and insuring of driving behavior, and more particularly, to devices and methods for identifying driving and situational risks.

BACKGROUND

Sensors (e.g., cameras, radars, lidars, etc.) have been used in vehicles to capture images of road conditions outside the vehicles. For example, a camera may be installed in a subject vehicle for monitoring a traveling path of the subject vehicle or for monitoring other vehicles surrounding the subject vehicle.

It would be desirable to provide collision prediction and/or intersection violation prediction utilizing camera images. It would also be desirable to provide a warning for the driver and/or to automatically operate the vehicle in response to a predicted risk, such as collision and/or the intersection violation. In addition, it would be desirable to provide an output indicating good and/or bad driving, which may be helpful for training driver(s) and/or for fleet management. Alternatively or additionally, the output may also be helpful for comparing actual driver behavior to what good drivers have done in similar situations.

New techniques for determining and tracking risk of collision and/or for determining and tracking risk of intersection violation are described herein. Also, new techniques for providing control signal to operate a warning or feedback generator to warn a driver of risk of collision and/or risk of intersection violation, and/or to mitigate such risks, are described herein.

SUMMARY

An apparatus includes: a first sensor configured to provide a first input associated with an environment outside a vehicle; a second sensor configured to provide a second input associated with an operation of the vehicle; and a processing unit configured to receive the first input from the first sensor, and the second input from the second sensor; wherein the processing unit comprises a first-stage processing system and a second-stage processing system; wherein the first-stage processing system is configured to receive the first input from the first sensor and the second input from the second sensor, process the first input to obtain a first time series of information, and process the second input to obtain a second time series of information; wherein the second-stage processing system comprises a neural network model configured to receive the first time series of information and a second time series of information in parallel; and wherein the neural network is configured to process the first time series and the second time series to determine a probability of a predicted event associated with an operation of the vehicle.

By means of non-limiting examples, the first sensor may be a camera, a Lidar, a radar, or any combination of the foregoing, that is configured to sense a characteristic of an environment outside the vehicle. The first input from the first sensor may comprise one or more time series.

Also, by means of non-limiting examples, the second sensor may be a camera, a depth sensor, a radar, or any combination of the foregoing, that is configured to capture an image and/or detect a state of a driver. Alternatively or additionally, the second sensor may include one or more sensing units configured to sense one or more states (e.g., speed, acceleration, deceleration, braking, orientation, steering angle, brake application, wheel traction, engine state, brake pedal position, gas pedal position, turn signals state, etc.) of the vehicle (vehicle state(s)). The second input from the second sensor may comprise one or more time series.

Optionally, the processing unit is configured to combine (e.g., fuse) multiple metadata streams indicating or relating to different respective aspects of a situation, in order to determine if risks are coupled or combined in a way (e.g., non-linearly, exponentially, etc.) to become a very risky situation. For example, a driver smoking by itself may not be very risky. However, if the same driver is also using a cell phone, and is following the leading vehicle too closely, then the combined risks (e.g., risk of smoking, plus risk of using cell phone, plus risk of following car too closely) may indicate a very risky situation. The risky situation may be represented by a risk value that increases non-linearly (e.g., exponentially) due to a combination of risk factors. In some embodiments, each metadata stream may be a time-series of data obtained from processing raw data from one or more sensors.

In some embodiments, the processing unit is configured to determine peak(s) (or spike(s)) in a combination of risks, wherein the peak(s) represent an escalating risky situation. In some embodiments, the escalating risky situation may be represented by a risk value that increases non-linearly (e.g., exponentially) due to a combination of risk factors.

Also, in some embodiments, the processing unit is configured to identify a risky situation early enough to intervene (e.g., to give warning, feedback, recommendation, etc., to reduce one or more risk factors). In some embodiments, the processing unit may determine what other good drivers have done in similar situations to mitigate the risks, and may use such knowledge to give warning, feedback, or recommendation to reduce the one or more risk factors (e.g., to increase distance from leading vehicle, to change speed, to change direction, to change attention state, etc.).

Optionally, the first input has fewer dimensions or less complexity compared to the first time series of information.

Optionally, the first time series of information indicates a first risk factor, and a second time series of information indicates a second risk factor.

Optionally, the processing unit is configured to package the first time series and the second time series into a data structure for feeding to the neural network model.

Optionally, the data structure comprises a two-dimensional matrix of data. In some embodiments, the matrix of data may include multiple sensor streams from multiple sensors with same or different sensor types.

Optionally, the first time series indicates conditions outside the vehicle for different respective time points, and the second time series indicates states of a driver and/or a state of the vehicle for the different respective time points.

Optionally, the probability of the predicted event is a first probability of a first predicted event, wherein the processing unit is configured to determine a second probability of a second predicted event, wherein the first predicted event and the second predicted event are associated with the operation of the vehicle; and wherein the processing unit is configured to calculate a risk score based on the first probability of the first predicted event, and based on the second probability of the second predicted event.

Optionally, the first predicted event is a collision event, and the second predicted event is a non-risky event; and wherein the processing unit is configured to calculate the risk score based on the first probability of the collision event, and based on the second probability of the non-risky event.

Optionally, the processing unit is configured to calculate the risk score by applying a first weight to the first probability to obtain a first weighted probability, applying a second weight to the second probability to obtain a second weighted probability, and adding the first weighted probability and the second weighted probability.

Optionally, the processing unit is configured to determine a third probability of a third predicted event; and wherein the processing unit is configured to calculate the risk score based on the first probability of the first predicted event, based on the second probability of the second predicted event, and based on the third probability of the third predicted event.

Optionally, the first predicted event is a collision event, the second predicted event is a near-collision event, and the third predicted event is a non-risky event; and wherein the processing unit is configured to calculate the risk score based on the first probability of the collision event, based on the second probability of the near-collision event, and based on the third probability of the non-risky event.

Optionally, the processing unit is configured to calculate the risk score by: applying a first weight to the first probability to obtain a first weighted probability, applying a second weight to the second probability to obtain a second weighted probability, applying a third weight to the third probability to obtain a third weighted probability, and adding the first weighted probability, the second weighted probability, and the third weighted probability.

Optionally, the first input and the second input are obtained in the past T seconds, and wherein the processing unit is configured to process the first input and the second input obtained in the past T seconds to determine the probability of the predicted event, wherein T is at least 3 seconds.

Optionally, the predicted event is for a future time that is at least 1 second from a current time.

Optionally, the predicted event is for a future time that is at least 2 seconds from a current time.

Optionally, the processing unit is configured to calculate a first risk score for a first time point based on the probability, and wherein the processing unit is also configured to calculate a second risk score for a second time point, and to determine a difference between the first risk score and the second risk score, wherein the difference indicates whether a risky situation is escalating or subsiding.

Optionally, the processing unit is configured to determine a risk score based on the probability of the predicted event.

Optionally, the processing unit is configured to generate a control signal based on the risk score.

Optionally, the processing unit is configured to generate the control signal if the risk score meets a criterion.

Optionally, the processing unit is configured to generate the control signal for operating a device if the risk score meets the criterion.

Optionally, the device comprises: a speaker for generating an alarm; a display or a light-emitting device for providing a visual signal; a haptic feedback device; a collision avoidance system; or a vehicle control for the vehicle.

Optionally, the first time series and the second time series respectively comprise any two or more of: distance to lead vehicle, distance to intersection stop line, speed of the vehicle, time-to-collision, time-to-intersection-violation, estimated braking distance, information regarding road condition, information regarding special zone, information regarding environment (e.g., weather, road type, etc.), information regarding traffic condition, time of day, information regarding visibility condition, information regarding identified object, object position, object moving direction of, object speed, bounding box(es), operating parameter(s) of the vehicle, information regarding state(s) of a driver, information regarding driver history, time spent driving consecutively, proximity to meal times, information regarding accident history, and audio information.

Optionally, the first sensor comprises a camera, a Lidar, a radar, or any combination of the foregoing, configured to sense the environment outside a vehicle.

Optionally, the second sensor comprises a camera configured to view a driver of the vehicle.

Optionally, the second sensor comprises one or more sensing units configured to sense one or more characteristics of the vehicle.

Optionally, the first input comprises first images, and the second input comprises second images, and wherein the first-stage processing system is configured to receive first images and the second images, process the first images to obtain a first time series of information, and process the second images to obtain a second time series of information.

An apparatus includes: a first sensor configured to provide a first input; a second sensor configured to provide a second input; and a processing unit configured to receive the first input from the first sensor, and a second input from the second sensor; wherein the processing unit is configured to determine a first probability of a first predicted event, and a second probability of a second predicted event, wherein the first predicted event and the second predicted event are associated with an operation of a vehicle; and wherein the processing unit is configured to calculate a risk score based on the first probability of the first predicted event, and based on the second probability of the second predicted event.

Optionally, the first predicted event is a collision event, and the second predicted event is a non-risky event; and wherein the processing unit is configured to calculate the risk score based on the first probability of the collision event, and based on the second probability of the non-risky event.

Optionally, the processing unit is configured to calculate the risk score by applying a first weight to the first probability to obtain a first weighted probability, applying a second weight to the second probability to obtain a second weighted probability, and adding the first weighted probability and the second weighted probability.

Optionally, the processing unit is configured to determine a third probability of a third predicted event; and wherein the processing unit is configured to calculate the risk score based on the first probability of the first predicted event, based on the second probability of the second predicted event, and based on the third probability of the third predicted event.

Optionally, the first predicted event is a collision event, the second predicted event is a near-collision event, and the third predicted event is a non-risky event; and wherein the processing unit is configured to calculate the risk score based on the first probability of the collision event, based on the second probability of the near-collision event, and based on the third probability of the non-risky event.

Optionally, the processing unit is configured to calculate the risk score by: applying a first weight to the first probability to obtain a first weighted probability, applying a second weight to the second probability to obtain a second weighted probability, applying a third weight to the third probability to obtain a third weighted probability, and adding the first weighted probability, the second weighted probability, and the third weighted probability.

Optionally, the first input and the second input comprise data obtained in past T seconds, and wherein the processing unit is configured to process the data obtained in the past T seconds to determine the first probability of the first predicted event and the second probability of the second predicted event, wherein T is at least 3 seconds.

Optionally, the first predicted event is for a future time that is at least 1 second from a current time.

Optionally, the first predicted event is for a future time that is at least 2 seconds from a current time.

Optionally, the processing unit is configured to calculate the risk score for a first time point, and wherein the processing unit is also configured to calculate an additional risk score for a second time point, and to determine a difference between the risk score and the additional risk score, wherein the difference indicates whether a risky situation is escalating or subsiding.

Optionally, the processing unit is configured to generate a control signal based on the risk score.

Optionally, the processing unit is configured to generate the control signal if the risk score meets a criterion.

Optionally, the processing unit is configured to generate the control signal for operating a device if the risk score meets the criterion.

Optionally, the device comprises: a speaker for generating an alarm; a display or a light-emitting device for providing a visual signal; a haptic feedback device; a collision avoidance system; or a vehicle control for the vehicle.

Optionally, the processing unit is configured to determine the first probability of the first predicted event and the second probability of the second predicted event based on the first input and the second input.

Optionally, the processing unit comprises a first-stage processing system and a second-stage processing system, wherein the first-stage processing system is configured to obtain the first input and to process the first input to provide first output, wherein the second-stage processing system is configured to obtain the first output and to process the first output to provide second output, wherein the first output has fewer dimensions or less complexity compared to the first input, and wherein the second output has fewer dimensions or less complexity compared to the first output.

Optionally, the processing unit comprises a neural network model.

Optionally, the neural network model is configured to receive a first time series of information indicating a first risk factor, and a second time series of information indicating a second risk factor.

Optionally, the neural network model is configured to receive the first time series and the second time series in parallel, and/or to process the first time series and the second time series in parallel.

Optionally, the processing unit is configured to package the first time series and the second time series into a data structure for feeding to the neural network model.

Optionally, the data structure comprises a two-dimensional matrix of data. In some embodiments, the matrix of data may include multiple sensor streams from multiple sensors with same or different sensor types.

Optionally, the first time series indicates a condition outside the vehicle for different respective time points, and the second time series indicates a state of a driver and/or a state of the vehicle for the different respective time points.

Optionally, the first time series indicates a first characteristic of the vehicle for different respective time points, and the second time series indicates a second characteristic of the vehicle for the different respective time points.

Optionally, the first time series and second time series comprise one or a combination of two or more of: distance to lead vehicle, distance to intersection stop line, speed of the vehicle, time-to-collision, time-to-intersection-violation, estimated braking distance, information regarding road condition, information regarding special zone, information regarding environment (e.g., weather, road type, etc.), information regarding traffic condition, time of day, information regarding visibility condition, information regarding identified object, object position, object moving direction of, object speed, bounding box(es), operating parameter(s) of the vehicle, information regarding state(s) of a driver, information regarding driver history, time spent driving consecutively, proximity to meal times, information regarding accident history, and audio information.

Optionally, the first sensor comprises a camera, a Lidar, a radar, or any combination of the foregoing, configured to sense an environment outside a vehicle.

Optionally, the second sensor comprises a camera configured to view a driver of the vehicle.

Optionally, the second sensor comprises one or more sensing units configured to sense one or more characteristics of the vehicle.

Optionally, the first input comprises first images, and the second input comprises second images, and wherein the first-stage processing system is configured to receive first images and the second images, process the first images to obtain a first time series of information, and process the second images to obtain a second time series of information.

An apparatus includes: a first camera configured to view an environment outside a vehicle; a second camera configured to view a driver of the vehicle; and a processing unit configured to receive a first image from the first camera, and a second image from the second camera; wherein the processing unit comprises a first-stage processing system and a second-stage processing system; wherein the first-stage processing system is configured to receive first images from the first camera and second images from the second camera, process the first images to obtain a first time series of information, and process the second images to obtain a second time series of information; and wherein the second-stage processing system comprises a neural network model configured to receive the first time series of information and a second time series of information in parallel; and wherein the neural network is configured to process the first time series and the second time series to determine a probability of a predicted event associated with an operation of the vehicle.

Optionally, the first images have fewer dimensions or less complexity compared to the first time series of information.

Optionally, the first time series of information indicates a first risk factor, and a second time series of information indicates a second risk factor. In some embodiments, the number of time series may be more than two, and the number of risk factors indicated by the respective time series may be more than two.

Optionally, the processing unit is configured to package the first time series and the second time series into a data structure for feeding to the neural network model.

Optionally, the data structure comprises a two-dimensional matrix of data. In some embodiments, the matrix of data may include multiple sensor streams from multiple sensors with same or different sensor types.

Optionally, the first time series indicates conditions outside the vehicle for different respective time points, and the second time series indicates states of the driver for the different respective time points.

Optionally, the probability of the predicted event is a first probability of a first predicted event, wherein the processing unit is configured to determine a second probability of a second predicted event, wherein the first predicted event and the second predicted event are associated with the operation of the vehicle; and wherein the processing unit is configured to calculate a risk score based on the first probability of the first predicted event, and based on the second probability of the second predicted event.

Optionally, the first predicted event is a collision event, and the second predicted event is a non-risky event; and wherein the processing unit is configured to calculate the risk score based on the first probability of the collision event, and based on the second probability of the non-risky event.

Optionally, the processing unit is configured to calculate the risk score by applying a first weight to the first probability to obtain a first weighted probability, applying a second weight to the second probability to obtain a second weighted probability, and adding the first weighted probability and the second weighted probability.

Optionally, the processing unit is configured to determine a third probability of a third predicted event; and wherein the processing unit is configured to calculate the risk score based on the first probability of the first predicted event, based on the second probability of the second predicted event, and based on the third probability of the third predicted event.

Optionally, the first predicted event is a collision event, the second predicted event is a near-collision event, and the third predicted event is a non-risky event; and wherein the processing unit is configured to calculate the risk score based on the first probability of the collision event, based on the second probability of the near-collision event, and based on the third probability of the non-risky event.

Optionally, the processing unit is configured to calculate the risk score by: applying a first weight to the first probability to obtain a first weighted probability, applying a second weight to the second probability to obtain a second weighted probability, applying a third weight to the third probability to obtain a third weighted probability, and adding the first weighted probability, the second weighted probability, and the third weighted probability.

Optionally, the first images and the second images are obtained in the past T seconds, and wherein the processing unit is configured to process the first images and the second images obtained in the past T seconds to determine the probability of the predicted event, wherein T is at least 3 seconds.

Optionally, the predicted event is for a future time that is at least 1 second, or at least 2 seconds from a current time.

Optionally, the processing unit is configured to calculate a first risk score for a first time point based on the probability, and wherein the processing unit is also configured to calculate a second risk score for a second time point, and to determine a difference between the first risk score and the second risk score, wherein the difference indicates whether a risky situation is escalating or subsiding.

Optionally, the processing unit is configured to determine a risk score based on the probability of the predicted event.

Optionally, the processing unit is configured to generate a control signal based on the risk score.

Optionally, the processing unit is configured to generate the control signal if the risk score meets a criterion.

Optionally, the processing unit is configured to generate the control signal for operating a device if the risk score meets the criterion.

Optionally, the device comprises: a speaker for generating an alarm; a display or a light-emitting device for providing a visual signal; a haptic feedback device; a collision avoidance system, or a vehicle control for the vehicle.

Optionally, the first time series and the second time series respectively comprise any two or more of: distance to lead vehicle, distance to intersection stop line, speed of the vehicle, time-to-collision, time-to-intersection-violation, estimated braking distance, information regarding road condition, information regarding special zone, information regarding environment (e.g., weather, road type, etc.), information regarding traffic condition, time of day, information regarding visibility condition, information regarding identified object, object position, object moving direction of, object speed, bounding box(es), operating parameter(s) of the vehicle, information regarding state(s) of the driver, information regarding driver history, time spent driving consecutively, proximity to meal times, information regarding accident history, and audio information.

An apparatus includes: a first camera configured to view an environment outside a vehicle; a second camera configured to view a driver of the vehicle; and a processing unit configured to receive a first image from the first camera, and a second image from the second camera; wherein the processing unit is configured to determine a first probability of a first predicted event, and a second probability of a second predicted event, wherein the first predicted event and the second predicted event are associated with an operation of the vehicle; and wherein the processing unit is configured to calculate a risk score based on the first probability of the first predicted event, and based on the second probability of the second predicted event.

Optionally, the first predicted event is a collision event, and the second predicted event is a non-risky event; and wherein the processing unit is configured to calculate the risk score based on the first probability of the collision event, and based on the second probability of the non-risky event.

Optionally, the processing unit is configured to calculate the risk score by applying a first weight to the first probability to obtain a first weighted probability, applying a second weight to the second probability to obtain a second weighted probability, and adding the first weighted probability and the second weighted probability.

Optionally, the processing unit is configured to determine a third probability of a third predicted event; and wherein the processing unit is configured to calculate the risk score based on the first probability of the first predicted event, based on the second probability of the second predicted event, and based on the third probability of the third predicted event.

Optionally, the first predicted event is a collision event, the second predicted event is a near-collision event, and the third predicted event is a non-risky event; and wherein the processing unit is configured to calculate the risk score based on the first probability of the collision event, based on the second probability of the near-collision event, and based on the third probability of the non-risky event.

Optionally, the processing unit is configured to calculate the risk score by: applying a first weight to the first probability to obtain a first weighted probability, applying a second weight to the second probability to obtain a second weighted probability, applying a third weight to the third probability to obtain a third weighted probability, and adding the first weighted probability, the second weighted probability, and the third weighted probability.

Optionally, the processing unit is configured to process data obtained in the past T seconds to determine the first probability of the first predicted event and the second probability of the second predicted event, wherein T is at least 3 seconds.

Optionally, the first predicted event is for a future time that is at least 1 second or at least 2 seconds from a current time.

Optionally, the processing unit is configured to calculate the risk score for a first time point, and wherein the processing unit is also configured to calculate an additional risk score for a second time point, and to determine a difference between the risk score and the additional risk score, wherein the difference indicates whether a risky situation is escalating or subsiding.

Optionally, the processing unit is configured to generate a control signal based on the risk score.

Optionally, the processing unit is configured to generate the control signal if the risk score meets a criterion.

Optionally, the processing unit is configured to generate the control signal for operating a device if the risk score meets the criterion.

Optionally, the device comprises: a speaker for generating an alarm; a display or a light-emitting device for providing a visual signal; a haptic feedback device; a collision avoidance system; or a vehicle control for the vehicle.

Optionally, the processing unit is configured to obtain first images from the first camera, and second images from the second camera; and wherein the processing unit is configured to determine the first probability of the first predicted event and the second probability of the second predicted event based on the first images and the second images.

Optionally, the processing unit comprises a first-stage processing system and a second-stage processing system, wherein the first-stage processing system is configured to obtain raw data and to process the raw data to provide first outputs, wherein the second-stage processing system is configured to obtain the first outputs and to process the first outputs to provide second outputs, wherein the first outputs have fewer dimensions or less complexity compared to the raw data, and wherein the second output have fewer dimensions or less complexity compared to the first inputs.

Optionally, the processing unit comprises a neural network model.

Optionally, the neural network model is configured to receive inputs comprising at least a first time series of information indicating a first risk factor, and a second time series of information indicating a second risk factor.

Optionally, the neural network model is configured to receive the first time series and the second time series in parallel, and/or to process the first time series and the second time series in parallel.

Optionally, the processing unit is configured to package the inputs into a data structure for feeding to the neural network model.

Optionally, the data structure comprises a two-dimensional matrix of data.

Optionally, the first time series indicates conditions outside the vehicle for different respective time points, and the second time series indicates states of the driver for the different respective time points.

Optionally, the inputs comprise one or a combination of two or more of: distance to lead vehicle, distance to intersection stop line, speed of the vehicle, time-to-collision, time-to-intersection-violation, estimated braking distance, information regarding road condition, information regarding special zone, information regarding environment (e.g., weather, road type, etc.), information regarding traffic condition, time of day, information regarding visibility condition, information regarding identified object, object position, object moving direction of, object speed, bounding box(es), operating parameter(s) of the vehicle, information regarding state(s) of the driver, information regarding driver history, time spent driving consecutively, proximity to meal times, information regarding accident history, and audio information.

An apparatus includes: a first camera configured to view an environment outside a vehicle; a second camera configured to view a driver of the vehicle; and a processing unit configured to receive a first image from the first camera, and a second image from the second camera; wherein the processing unit comprises a model configured to receive a plurality of inputs, and generate a metric based on at least some of the inputs, and wherein the plurality of inputs comprises at least a first time series of information indicating a first risk factor, and a second time series of information indicating a second risk factor.

Optionally, the plurality of inputs comprises one or a combination of two or more of: distance to lead vehicle (which may indicate distance to collision), distance to intersection stop line, speed of vehicle, time-to-collision, time-to-intersection-violation, estimated braking distance, information regarding road condition (e.g., dry, wet, snow, etc.), information regarding (e.g., identifying) special zone (e.g., construction zone, school zone, etc.), information regarding (e.g., identifying) environment (e.g., urban, suburban, city, etc.), information regarding (e.g., identifying) traffic condition, time of day, information regarding (e.g., identifying) visibility condition (e.g., fog, snow, precipitation, sun angle, glare, etc.), identified object (e.g., stop sign, traffic light, pedestrian, car, etc.), position of object, moving direction of object, speed of object, bounding box(es), operating parameter of vehicle (e.g., kinematic signals such as acceleration, speed, centripetal force, steering angle, brake, accelerator position, turn signal, etc.), information regarding (e.g., identifying) state(s) of driver, such as a driver's gaze direction (e.g., looking up, looking down, looking left, looking right, etc.) using phone, holding object, smoking, eyes closed, head turned or moved away so that no-face is detected, gaze direction relative to driver, gaze direction mapped onto external object(s) or object(s) in vehicle (e.g., head unit, mirror, etc.), drowsy, fatigue, road rage, stress, sudden sickness (e.g., heart attack, stroke, pulse, sweat, pupil dilation, etc.), etc.), information regarding driver history (e.g., motor vehicle record, crash rate, experience, age, years of driving, tenure in fleet, experience with route, etc.), time spent driving consecutively, proximity to meal times, and information regarding accident history (e.g., fatality at the given time, accident at the given time, geospatial heatmap for risk data per location over time, etc.).

Optionally, the processing unit is configured to package two or more of the inputs into a data structure for feeding to the model.

Optionally, the data structure comprises a two-dimensional matrix of data.

Optionally, the model comprises a neural network model.

Optionally, the inputs comprise first information regarding a state of a driver, and second information regarding condition outside the vehicle.

Optionally, the neural network model is configured to receive the first information regarding the state of the driver and the second information regarding the condition outside the vehicle.

Optionally, the neural network model is configured to receive the first time series and the second time series in parallel, and/or process the first time series and the second time series in parallel.

Optionally, the processing unit is configured to package the inputs into a data structure for feeding to the model.

Optionally, the data structure comprises a two-dimensional matrix of data.

Optionally, the two-dimensional matrix of data comprises values of a first input of the plurality of inputs for different respective time points, and values of a second input of the plurality of inputs for different respective time points.

Optionally, the two-dimensional matrix of data comprises first information indicating states of a driver for different respective time points, and second information indicating conditions outside the vehicle.

Optionally, the model of the processing unit is configured to predict a near-collision, and determine a score indicating a probability of the predicted near-collision.

Optionally, the model of the processing unit is configured to predict a collision, and determine a score indicating a probability of the predicted collision.

Optionally, the model of the processing unit is configured to predict a non-event (e.g., non-risky event), and determine a score indicating a probability of the predicted non-event.

Optionally, the metric is a weighted sum of scores for different respective classifications.

Optionally, the classifications comprise at least "non-event" and "relevant event".

Optionally, the classifications comprise at least "non-event", "predicted near collision", and "predicted collision".

Optionally, at least one of the inputs is based on an output from the first camera.

Optionally, at least one of the inputs is based on an output from the second camera.

Optionally, the processing unit is configured to provide a control signal for operating a device if the metric meets a criterion.

Optionally, the device comprises a speaker for generating an alarm.

Optionally, the device comprises a display or a light-emitting device for providing a visual signal.

Optionally, the device comprises a component of the vehicle.

An apparatus includes: a first camera configured to view an environment outside a vehicle; a second camera configured to view a driver of the vehicle; and a processing unit configured to receive a first image from the first camera, and a second image from the second camera; wherein the processing unit is configured to determine first information indicating a risk of collision with the vehicle based at least partly on the first image; wherein the processing unit is configured to determine second information indicating a state of the driver based at least partly on the second image; and wherein the processing unit is configured to determine whether to provide a control signal for operating a device or not based on (1) the first information indicating the risk of collision with the vehicle, and (2) the second information indicating the state of the driver.

Optionally, the processing unit is configured to predict the collision at least 3 seconds or more before an expected occurrence time for the predicted collision.

Optionally, the processing unit is configured to predict the collision with sufficient lead time for a brain of the driver to process input and for the driver to perform an action to mitigate the risk of the collision.

Optionally, the sufficient lead time is dependent on the state of the driver.

Optionally, the first information indicating the risk of collision comprises a predicted collision, wherein the processing unit is configured to determine an estimated time it will take for the predicted collision to occur, and wherein the processing unit is configured to provide the control signal if the estimated time it will take for the predicted collision to occur is below a threshold.

Optionally, the device comprises a warning generator, and wherein the processing unit is configured to provide the control signal to cause the device to provide a warning for the driver if the estimated time it will take for the predicted collision to occur is below the threshold.

Optionally, the device comprises a vehicle control, and wherein the processing unit is configured to provide the control signal to cause the device to control the vehicle if the estimated time it will take for the predicted collision to occur is below the threshold.

Optionally, the threshold is variable based on the second information indicating the state of the driver.

Optionally, the processing unit is configured to repeatedly evaluate the estimated time with respect to the variable threshold, as the predicted collision is temporally approaching in correspondence with a decrease of the estimated time it will take for the predicted collision to occur.

Optionally, the threshold is variable in real time based on the state of the driver.

Optionally, the processing unit is configured to change (e.g., decrease or increase) the threshold if the state of the driver indicates that the driver is distracted or is not attentive to a driving task.

Optionally, the processing unit is configured to at least temporarily hold off in providing the control signal if the estimated time it will take for the predicted collision to occur is higher than the threshold.

Optionally, the processing unit is configured to determine a level of the risk of the collision, and wherein the processing unit is configured to adjust the threshold based on the determined level of the risk of the collision.

Optionally, the state of the driver comprises a distracted state, and wherein the processing unit is configured to determine a level of a distracted state of the driver, and wherein the processing unit is configured to adjust the threshold based on the determined level of the distracted state of the driver.

Optionally, the threshold has a first value if the state of the driver indicates that the driver is attentive to a driving task, and wherein the threshold has a second value higher than the first value if the state of the driver indicates that the driver is distracted or is not attentive to the driving task.

Optionally, the threshold is also based on sensor information indicating that the vehicle is being operated to mitigate the risk of the collision.

Optionally, the processing unit is configured to determine whether to provide the control signal or not based on (1) the first information indicating the risk of collision with the vehicle, (2) the second information indicating the state of the driver, and (3) sensor information indicating that the vehicle is being operated to mitigate the risk of the collision.

Optionally, the apparatus further includes a non-transitory medium storing a first model, wherein the processing unit is configured to process the first image based on the first model to determine the risk of the collision.

Optionally, the first model comprises a neural network model.

Optionally, the non-transitory medium is configured to store a second model, and wherein the processing unit is configured to process the second image based on the second model to determine the state of the driver.

Optionally, the processing unit is configured to determine metric values for multiple respective driver state classifications, and wherein the processing unit is configured to determine whether the driver is engaged with a driving task or not based on one or more of the metric values.

Optionally, the driver state classifications comprise two or more of: a driver's gaze direction (e.g., looking-down state, looking-up state, looking-left state, looking-right state, etc.), cellphone-using state, smoking state, holding-object state, hand(s)-not-on-the wheel state, not-wearing-seatbelt state, eye(s)-closed state, looking-straight state, one-hand-on-wheel state, and two-hands-on-wheel state.

Optionally, the processing unit is configured to compare the metric values with respective thresholds for the respective driver state classifications.

Optionally, the processing unit is configured to determine the driver as belonging to one of the driver state classifications if the corresponding one of the metric values meets or surpasses the corresponding one of the thresholds.

Optionally, the first camera, the second camera, and the processing unit are integrated as parts of an aftermarket device for the vehicle.

Optionally, the processing unit is configured to determine the second information by processing the second image to determine whether an image of the driver meets a driver state classification or not; and wherein the processing unit is configured to determine whether the driver is engaged with a driving task or not based on the image of the driver meeting the driver state classification or not.

Optionally, the processing unit is configured to process the second image based on a neural network model to determine the state of the driver.

Optionally, the processing unit is configured to determine whether an object in the first image or a bounding box of the object overlaps a region of interest.

Optionally, the region of interest has a geometry that is variable in correspondence with a shape of a road or a lane in which the vehicle is traveling.

Optionally, the processing unit is configured to determine a centerline of a road or a lane in which the vehicle is traveling, and wherein the region of interest has a shape that is based on the centerline.

Optionally, the processing unit is configured to determine a distance between the vehicle and a physical location based on a y-coordinate of the physical location in a camera image provided by the first camera, wherein the y-coordinate is with respect to an image coordinate frame.

A method performed by an apparatus, includes: obtaining a first image generated by a first camera, wherein the first camera is configured to view an environment outside a vehicle; obtaining a second image generated by a second camera, wherein the second camera is configured to view a driver of the vehicle; determining first information indicating a risk of collision with the vehicle based at least partly on the first image; determining second information indicating a state of the driver based at least partly on the second image; and determining whether to provide a control signal for operating a device or not based on (1) the first information indicating the risk of collision with the vehicle, and (2) the second information indicating the state of the driver.

Optionally, the first information is determined by predicting the collision, and wherein the collision is predicted at least 3 seconds or more before an expected occurrence time for the predicted collision.

Optionally, the first information is determined by predicting the collision, and wherein the collision is predicted with sufficient lead time for a brain of the driver to process input and for the driver to perform an action to mitigate the risk of the collision.

Optionally, the sufficient lead time is dependent on the state of the driver.

Optionally, the first information indicating the risk of collision comprises a predicted collision, wherein the method further comprises determining an estimated time it will take for the predicted collision to occur, and wherein the control signal is provided to cause the device to provide the control signal if the estimated time it will take for the predicted collision to occur is below a threshold.

Optionally, the device comprises a warning generator, and wherein the control signal is provided to cause the device to provide a warning for the driver if the estimated time it will take for the predicted collision to occur is below a threshold.

Optionally, the device comprises a vehicle control, and wherein the control signal is provided to cause the device to control the vehicle if the estimated time it will take for the predicted collision to occur is below the threshold.

Optionally, the threshold is variable based on the second information indicating the state of the driver.

Optionally, the estimated time is repeatedly evaluated with respect to the variable threshold, as the predicted collision is temporally approaching in correspondence with a decrease of the estimated time it will take for the predicted collision to occur.

Optionally, the threshold is variable in real time based on the state of the driver.

Optionally, the method further includes increasing the threshold if the state of the driver indicates that the driver is distracted or is not attentive to a driving task.

Optionally, the method further includes at least temporarily holding off in generating the control signal if the estimated time it will take for the predicted collision to occur is higher than the threshold.

Optionally, the method further includes determining a level of the risk of the collision, and adjusting the threshold based on the determined level of the risk of the collision.

Optionally, the state of the driver comprises a distracted state, and wherein the method further comprises determining a level of a distracted state of the driver, and adjusting the threshold based on the determined level of the distracted state of the driver.

Optionally, the threshold has a first value if the state of the driver indicates that the driver is attentive to a driving task, and wherein the threshold has a second value higher than the first value if the state of the driver indicates that the driver is distracted or is not attentive to the driving task.

Optionally, the threshold is also based on sensor information indicating that the vehicle is being operated to mitigate the risk of the collision.

Optionally, the act of determining whether to provide the control signal for operating the device or not is performed also based on sensor information indicating that the vehicle is being operated to mitigate the risk of the collision.

Optionally, the act of determining the first information indicating the risk of the collision comprises processing the first image based on a first model.

Optionally, the first model comprises a neural network model.

Optionally, the act of determining the second information indicating the state of the driver comprises processing the second image based on a second model.

Optionally, the method further includes determining metric values for multiple respective pose classifications, and determining whether the driver is engaged with a driving task or not based on one or more of the metric values.

Optionally, the pose classifications comprise two or more of: a driver's gaze direction (e.g., looking-down pose, looking-up pose, looking-left pose, looking-right pose, etc.), cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

Optionally, the method further includes comparing the metric values with respective thresholds for the respective pose classifications.

Optionally, the method further includes determining the driver as belonging to one of the pose classifications if the corresponding one of the metric values meets or surpasses the corresponding one of the thresholds.

Optionally, the method is performed by an aftermarket device, and wherein the first camera and the second camera are integrated as parts of the aftermarket device.

Optionally, the second information is determined by processing the second image to determine whether an image of the driver meets a pose classification or not; and wherein the method further comprises determining whether the driver is engaged with a driving task or not based on the image of the driver meeting the pose classification or not.

Optionally, the act of determining the second information indicating the state of the driver comprises processing the second image based on a neural network model.

Optionally, the method further includes determining whether an object in the first image or a bounding box of the object overlaps a region of interest.

Optionally, the region of interest has a geometry that is variable in correspondence with a shape of a road or a lane in which the vehicle is traveling.

Optionally, the method further includes determining a centerline of a road or a lane in which the vehicle is traveling, and wherein the region of interest has a shape that is based on the centerline.

Optionally, the method further includes determining a distance between the vehicle and a physical location based on a y-coordinate of the physical location in a camera image provided by the first camera, wherein the y-coordinate is with respect to an image coordinate frame.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

FIGS. 33A-33K illustrate a series of exterior images and corresponding interior images, particularly showing a problem that can be addressed by the technique of FIG. 25.

DESCRIPTION OF THE EMBODIMENTS

Figure 1:
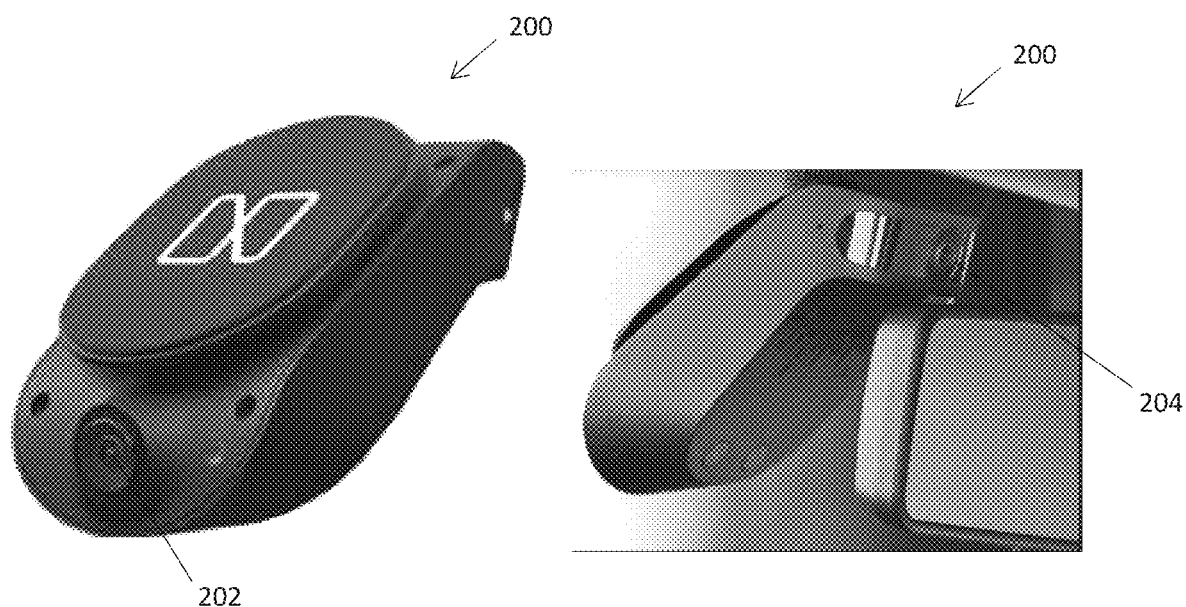
FIG. 1 illustrates an apparatus in accordance with some embodiments.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

FIG. 1 illustrates an apparatus 200 in accordance with some embodiments. The apparatus 200 is configured to be mounted to a vehicle, such as to a windshield of the vehicle, to the rear mirror of the vehicle, etc. The apparatus 200 includes a first camera 202 configured to view outside the vehicle, and a second camera 204 configured to view inside a cabin of the vehicle. In the illustrated embodiments, the apparatus 200 is in a form of an after-market device that can be installed in a vehicle (i.e., offline from the manufacturing process of the vehicle). The apparatus 200 may include a connector configured to couple the apparatus 200 to the vehicle. By means of non-limiting examples, the connector may be a suction cup, an adhesive, a clamp, one or more screws, etc. The connector may be configured to detachably secure the apparatus 200 to the vehicle, in which case, the apparatus 200 may be selectively removed from and/or coupled to the vehicle as desired. Alternatively, the connector may be configured to permanently secure the apparatus 200 to the vehicle. In other embodiments, the apparatus 200 may be a component of the vehicle that is installed during a manufacturing process of the vehicle. It should be noted that the apparatus 200 is not limited to having the configuration shown in the example, and that the apparatus 200 may have other configurations in other embodiments. For example, in other embodiments, the apparatus 200 may have a different form factor. In other embodiments, the apparatus 200 may be an end-user device, such as a mobile phone, a tablet, etc., that has one or more cameras.

Figure 2A:
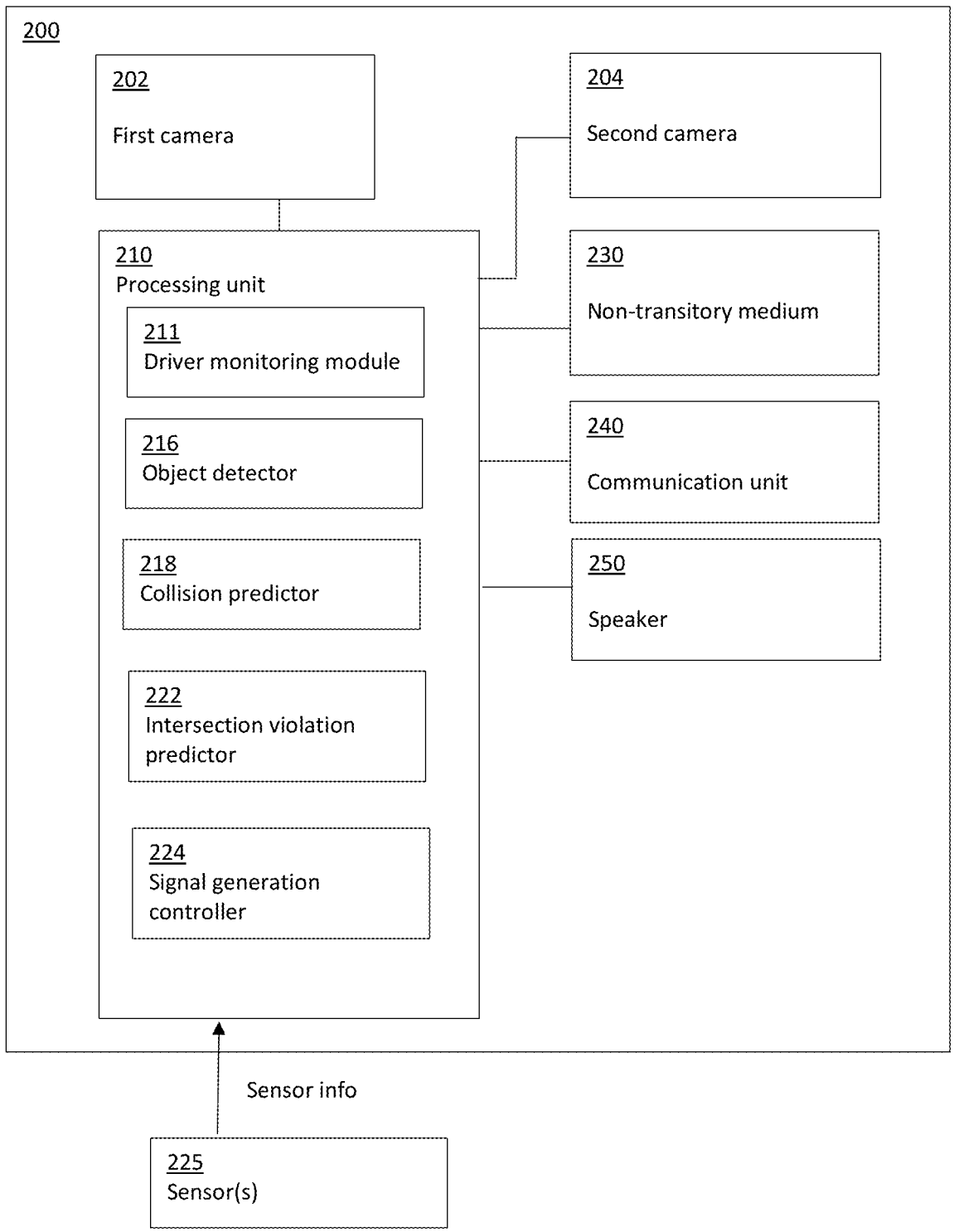
FIG. 2A illustrates a block diagram of the apparatus of FIG. 1 in accordance with some embodiments.

FIG. 2A illustrates a block diagram of the apparatus 200 of FIG. 1 in accordance with some embodiments. The apparatus 200 includes the first camera 202 and the second camera 204. As shown in the figure, the apparatus 200 also includes a processing unit 210 coupled to the first camera 202 and the second camera 204, a non-transitory medium 230 configured to store data, a communication unit 240 coupled to the processing unit 210, and a speaker 250 coupled to the processing unit 210.

In the illustrated embodiments, the first camera 202, the second camera 204, the processing unit 210, the non-transitory medium 230, the communication unit 240, and the speaker 250 may be integrated as parts of an aftermarket device for the vehicle. In other embodiments, the first camera 202, the second camera 204, the processing unit 210, the non-transitory medium 230, the communication unit 240, and the speaker 250 may be integrated with the vehicle, and may be installed in the vehicle during a manufacturing process of the vehicle.

The processing unit 210 is configured to obtain images from the first camera 202 and images from the second camera 204, and process the images from the first and second cameras 202, 204. In some embodiments, the images from the first camera 202 may be processed by the processing unit 210 to monitor an environment outside the vehicle (e.g., for collision detection, collision prevention, driving environment monitoring, etc.). Also, in some embodiments, the images from the second camera 204 may be processed by the processing unit 210 to monitor a driving behavior of the driver (e.g., whether the driver is distracted, drowsy, focused, etc.). In further embodiments, the processing unit 210 may process images from the first camera 202 and/or the second camera 204 to determine a risk of collision, to predict the collision, to provision alerts for the driver, etc. In other embodiments, the apparatus 200 may not include the first camera 202. In such cases, the apparatus 200 is configured to monitor only the environment inside a cabin of the vehicle.

The processing unit 210 of the apparatus 200 may include hardware, software, or a combination of both. By means of non-limiting examples, hardware of the processing unit 210 may include one or more processors and/or more or more integrated circuits. In some embodiments, the processing unit 210 may be implemented as a module and/or may be a part of any integrated circuit.

The non-transitory medium 230 is configured to store data relating to operation of the processing unit 210. In the illustrated embodiments, the non-transitory medium 230 is configured to store a model, which the processing unit 210 can access and utilize to identify pose(s) of a driver as appeared in images from the camera 204, and/or to determine whether the driver is engaged with a driving task or not. Alternatively, the model may configure the processing unit 210 so that it has the capability to identify pose(s) of the driver and/or to determine whether the driver is engaged with a driving task or not. Optionally, the non-transitory medium 230 may also be configured to store image(s) from the first camera 202, and/or image(s) from the second camera 204. Also, in some embodiments, the non-transitory medium 230 may also be configured to store data generated by the processing unit 210.

The model stored in the transitory medium 230 may be any computational model or processing model, including but not limited to neural network model. In some embodiments, the model may include feature extraction parameters, based upon which, the processing unit 210 can extract features from images provided by the camera 204 for identification of objects, such as a driver's head, a hat, a face, a nose, an eye, a mobile device, etc. Also, in some embodiments, the model may include program instructions, commands, scripts, etc. In one implementation, the model may be in a form of an application that can be received wirelessly by the apparatus 200.

The communication unit 240 of the apparatus 200 is configured to receive data wirelessly from a network, such as a cloud, the Internet, Bluetooth network, etc. In some embodiments, the communication unit 240 may also be configured to transmit data wirelessly. For example images from the first camera 202, images from the second camera 204, data generated by the processing unit, or any combination of the foregoing, may be transmitted by the communication unit 240 to another device (e.g., a server, an accessory device such as a mobile phone, another apparatus 200 in another vehicle, etc.) via a network, such as a cloud, the Internet, Bluetooth network, etc. In some embodiments, the communication unit 240 may include one or more antennas. For example, the communication 240 may include a first antenna configured to provide long-range communication, and a second antenna configured to provide near-field communication (such as via Bluetooth). In other embodiments, the communication unit 240 may be configured to transmit and/or receive data physically through a cable or electrical contacts. In such cases, the communication unit 240 may include one or more communication connectors configured to couple with a data transmission device. For example, the communication unit 240 may include a connector configured to couple with a cable, a USB slot configured to receive a USB drive, a memory-card slot configured to receive a memory card, etc.

The speaker 250 of the apparatus 200 is configured to provide audio alert(s) and/or message(s) to a driver of the vehicle. For example, in some embodiments, the processing unit 210 may be configured to detect an imminent collision between the vehicle and an object outside the vehicle. In such cases, in response to the detection of the imminent collision, the processing unit 210 may generate a control signal to cause the speaker 250 to output an audio alert and/or message. As another example, in some embodiments, the processing unit 210 may be configured to determine whether the driver is engaged with a driving task or not. If the driver is not engaged with a driving task, or is not engaged with the driving task for a prescribed period (e.g., 2 seconds, 3 seconds, 4 seconds, 5 seconds, etc.), the processing unit 210 may generate a control signal to cause the speaker 250 to output an audio alert and/or message.

Alternatively or additionally, the processing unit 210 may generate a control signal to operate a haptic feedback device to warn the driver, and/or provide an input to a collision avoidance system, Although the apparatus 200 is described as having the first camera 202 and the second camera 204, in other embodiments, the apparatus 200 may include only the second camera (cabin camera) 204, and not the first camera 202. Also, in other embodiments, the apparatus 200 may include multiple cameras configured to view the cabin inside the vehicle.

As shown in FIG. 2A, the processing unit 210 also includes a driver monitoring module 211, an object detector 216, a collision predictor 218, an intersection violation predictor 222, and a signal generation controller 224. The driver monitoring module 211 is configured to monitor the driver of the vehicle based on one or more images provided by the second camera 204. In some embodiments, the driver monitoring module 211 is configured to determine one or more poses of the driver. Also, in some embodiments, the driver monitoring module 211 may be configured to determine a state of the driver, such as whether the driver is alert, drowsiness, attentive to a driving task, etc. In some cases, a pose of a driver itself may also be considered to be a state of the driver.

The object detector 216 is configured to detect one or more objects in the environment outside the vehicle based on one or more images provided by the first camera 202. By means of non-limiting examples, the object(s) being detected may be a vehicle (e.g., car, motorcycle, etc.), a lane boundary, human, bicycle, an animal, a road sign (e.g., stop sign, street sign, no turn sign, etc.), a traffic light, a road marking (e.g., stop line, lane divider, text painted on road, etc.), etc. In some embodiments, the vehicle being detected may be a lead vehicle, which is a vehicle in front of the subject vehicle that is traveling in the same lane as the subject vehicle.

The collision predictor 218 is configured to determine a risk of a collision based on output from the object detector 216. For example, in some embodiments, the collision predictor 218 may determine that there is a risk of collision with a lead vehicle, and outputs information indicating the risk of such collision. In some embodiments, the collision predictor 218 may optionally also obtain sensor information indicating a state of the vehicle, such as the speed of the vehicle, the acceleration of the vehicle, a turning angle of the vehicle, a turning direction of the vehicle, a braking of the vehicle, a traveling direction of the vehicle, engine state, wheel traction, turn signals state, gas pedal position, brake pedal position, or any combination of the foregoing. In such cases, the collision predictor 218 may be configured to determine the risk of the collision based on the output from the object detector 216, and also based on the obtained sensor information. Also, in some embodiments, the collision predictor 218 may be configured to determine a relative speed between the subject vehicle and an object (e.g., a lead vehicle), and determine that there is a risk of collision based on the determined relative speed. In some embodiments, the collision predictor 218 may be configured to determine a speed of the subject vehicle, a speed of a moving object, a traveling path of the subject vehicle, and a traveling path of the moving object, and determine that there is a risk of the collision based on these parameters. For example, if an object is moving along a path that intersects the path of the subject vehicle, and if the time it will take for the object and the subject vehicle to collide based on their respective speeds is less than a time threshold, then the collision predictor 218 may determine that there is a risk of collision. It should be noted that the object that may be collided with the subject vehicle is not limited to a moving object (e.g., car, motorcycle, bicycle, pedestrian, animal, etc.), and that the collision predictor 218 may be configured to determine the risk of collision with non-moving object, such as a parked car, a street sign, a light post, a building, a tree, a mailbox, etc.

In some embodiments, the collision predictor 218 may be configured to determine a time it will take for the predicted collision to occur, and compare the time with a threshold time. If the time is less than the threshold time, the collision predictor 218 may determine that there is a risk of collision with the subject vehicle. In some embodiments, the threshold time for identifying the risk of collision may be at least: 2, 3, 4, 5, 6, 7, 8, 9, 10, 11, 12, 13, 14, 15, 16, 17, 18, 19, 20 seconds, or higher. In some embodiments, when predicting the collision, the collision predictor 218 may consider the speed, acceleration, traveling direction, braking operation, or any combination of the foregoing, of the subject vehicle. Optionally, the collision predictor 218 may also consider the speed, acceleration, traveling direction, or any combination of the foregoing, of the detected object predicted to collide with the vehicle.

The intersection violation predictor 222 is configured to determine a risk of an intersection violation based on output from the object detector 216. For example, in some embodiments, the intersection violation predictor 222 may determine that there is a risk that the subject vehicle may not be able to stop at a target area associated with a stop sign or a red light, and outputs information indicating the risk of such intersection violation. In some embodiments, the intersection violation predictor 222 may optionally also obtain sensor information indicating a state of the vehicle, such as the speed of the vehicle, the acceleration of the vehicle, a turning angle of the vehicle, a turning direction of the vehicle, a braking of the vehicle, or any combination of the foregoing. In such cases, the intersection violation predictor 222 may be configured to determine the risk of the intersection violation based on the output from the object detector 216, and also based on the obtained sensor information.

Also, in some embodiments, the intersection violation predictor 222 may be configured to determine a target area (e.g., a stop line) at which the subject vehicle is expected to stop, determine a distance between the subject vehicle and the target area, and compare the distance with a threshold distance. If the distance is less than the threshold distance, the intersection violation predictor 222 may determine that there is a risk of intersection violation.

In other embodiments, the intersection violation predictor 222 may be configured to determine a target area (e.g., a stop line) at which the subject vehicle is expected to stop, determine a time it will take for the vehicle to reach the target area, and compare the time with a threshold time. If the time is less than the threshold time, the intersection violation predictor 222 may determine that there is a risk of intersection violation. In some embodiments, the threshold time for identifying the risk of intersection violation may be at least: 2, 3, 4, 5, 6, 7, 8, 9, 10, 11, 12, 13, 14, 15, 16, 17, 18, 19, 20 seconds, or higher. In some embodiments, when predicting the intersection violation, the intersection violation predictor 222 may consider the speed, acceleration, traveling direction, braking operation, or any combination of the foregoing, of the subject vehicle.

It should be noted that the intersection violation is not limited to stop sign and red-light violations, and that the intersection violation predictor 222 may be configured to determine the risk of other intersection violations, such as the vehicle moving into a wrong-way street, the vehicle turning at an intersection with a "no turning on red light" sign, etc.).

In some embodiments, the signal generation controller 224 is configured to determine whether to generate a control signal based on output from the collision predictor 218, and output from the driver monitoring module. Alternatively or additionally, the signal generation controller 224 is configured to determine whether to generate a control signal based on output from the intersection violation predictor 222, and optionally also based on output from the driver monitoring module. In some embodiments, the signal generation controller 224 is configured to determine whether to generate the control signal also based on sensor information provided by one or more sensors at the vehicle.

In some embodiments, the control signal is configured to cause a device (e.g., a warning generator) to provide a warning for the driver if the estimated time it will take for the predicted collision to occur is below a threshold (action threshold). For examples, the warning generator may output an audio signal, a visual signal, a mechanical vibration (shaking steering wheel), or any combination of the foregoing, to alert the driver. Alternatively or additionally, the control signal is configured to cause a device (e.g., a vehicle control) to control the vehicle if the estimated time it will take for the predicted collision to occur is below the threshold (action threshold). For examples, the vehicle control may automatically apply the brake of the vehicle, automatically disengage the gas pedal, automatically activate hazard lights, automatically steer the vehicle, or any combination of the foregoing. Thus, in some embodiments, the control signal may be fed to a braking system (e.g., automatic emergency braking system), a steering system, a lane control system, a level 3 automation system, etc., or any combination of the foregoing. In some embodiments, the signal generation controller 224 may be configured to provide a first control signal to cause a warning to be provided for the driver. If the driver does not take any action to mitigate the risk of collision, the signal generation controller 224 may then provide a second control signal to cause the vehicle control to control the vehicle, such as to automatically apply brake of the vehicle.

In some embodiments, the signal generation controller 224 may be a separate component (e.g., module) from the collision predictor 218 and the intersection violation predictor 222. In other embodiments, the signal generation controller 224 or at least a part of the signal generation controller 224 may be implemented as a part of the collision predictor 218 and/or the intersection violation predictor 222. Also, in some embodiments, the collision predictor 218 and the intersection violation predictor 222 may be integrated together.

Figure 2B:
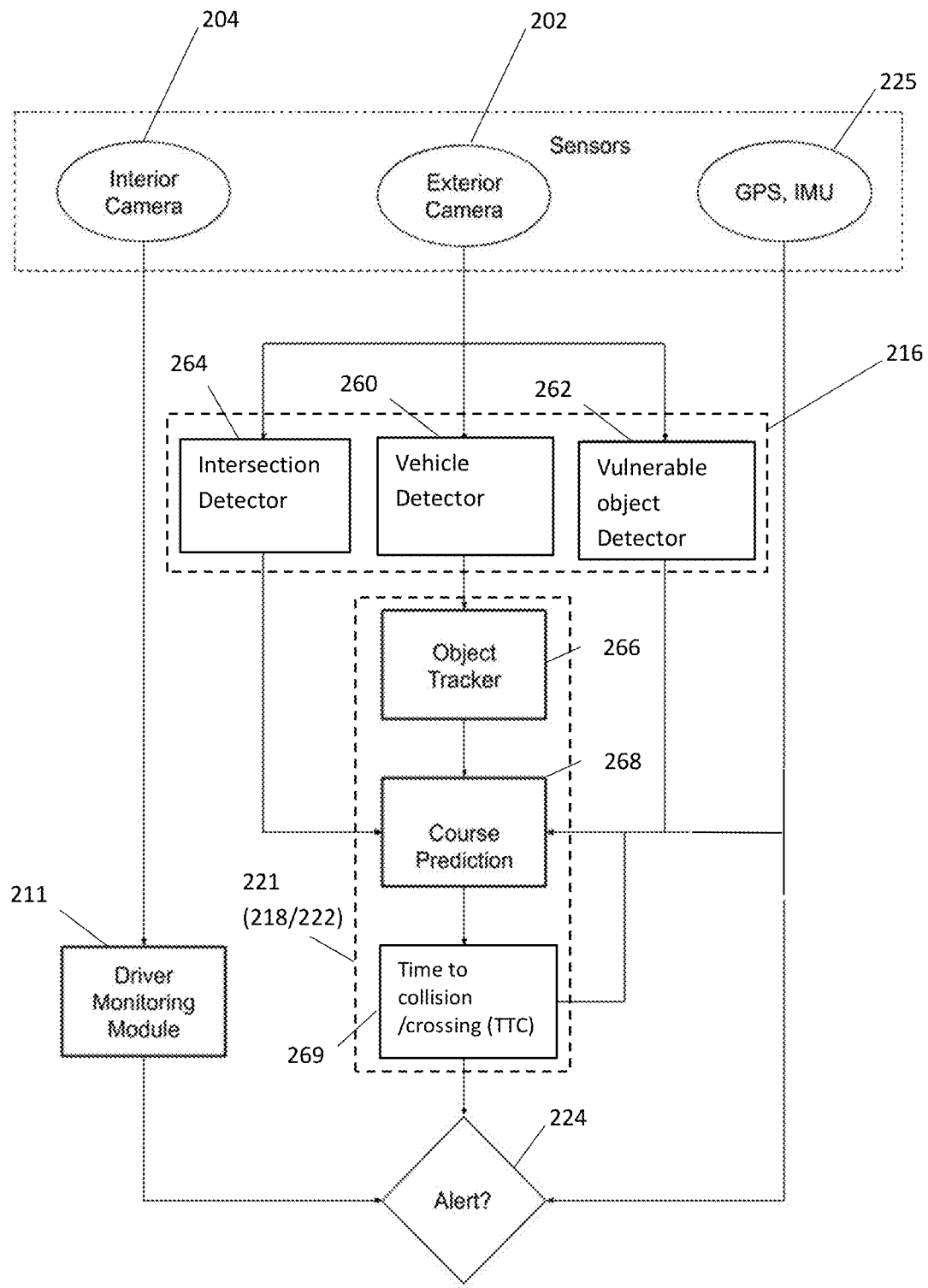
FIG. 2B illustrates an example of a processing scheme for the apparatus of FIG. 2A.

During use, the apparatus 200 is coupled to a vehicle such that the first camera 202 is viewing outside the vehicle, and the second camera 204 is viewing a driver inside the vehicle. While the driver operates the vehicle, the first camera 202 captures images outside the vehicle, and the second camera 204 captures images inside the vehicle. FIG. 2B illustrates an example of a processing scheme for the apparatus 200. As shown in the figure, during use of the apparatus 200, the second camera 204 provides images as input to the driver monitoring module 211. The driver monitoring module 211 analyzes the images to determine one or more poses for the driver of the subject vehicle. By means of non-limiting examples, the one or more poses may include looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose. In some embodiments, the driver monitoring module 211 may be configured to determine one or more states of the driver based on the determined pose(s) of the driver. For example, the driver monitoring module 211 may determine whether the driver is distracted or not based on one or more determined poses for the driver. As another example, the driver monitoring module 211 may determine whether the driver is drowsy or not based on one or more determined poses for the driver. In some embodiments, if the driver has certain pose (e.g., cellphone-using pose), then the driver monitoring module 211 may determine that the driver is distracted. Also, in some embodiments, the driver monitoring module 211 may analyze a sequence of pose classifications for the driver over a period to determine if the driver is drowsy or not.

The first camera 202 provides images as input to the object detector 216, which analyzes the images to detect one or more objects in the images. As shown in the figure, the object detector 216 comprises different detectors configured to detect different types of objects. In particular, the object detector 216 has a vehicle detector 260 configured to detect vehicles outside the subject vehicle, vulnerable object detector 262 configured to detect vulnerable objects, such as humans, bicycles with bicyclists, animals, etc., and an intersection detector 264 configured to detect one or more items (e.g., stop sign, traffic light, crosswalk marking, etc.) for identifying an intersection. In some embodiments, the object detector 216 may be configured to determine different types of objects based on different respective models. For example, there may be a vehicle detection model configured to detect vehicles, a human detection model configured to detect humans, an animal detection model configured to detect animals, a traffic light detection model configured to detect traffic lights, a stop sign detection model configured to detect stop signs, a centerline detection model configured to detect centerline of a road, etc. In some embodiments, the different models may be different respective neural network models trained to detect different respective types of objects.

The vehicle detector 260 is configured to detect vehicles outside the subject vehicle, and provide information (such as vehicle identifiers, vehicle positions, etc.) regarding the detected vehicles to module 221. The module 221 may be the collision predictor 218 and/or the intersection violation predictor 222. The module 221 includes an object tracker 266 configured to track one or more of the detected vehicles, a course predictor 268 configured to determine a course of a predicted collision, and a time to collision/crossing (TTC) module 269 configured to estimate a time it will take for the estimated collision to occur. In some embodiments, the object tracker 266 is configured to identify a leading vehicle that is traveling in front of the subject vehicle. Also, in some embodiments, the course predictor 268 is configured to determine the course of the predicted collision based on the identified leading vehicle and sensor information from the sensor(s) 225. For example, based on the speed of the subject vehicle, and a direction of traveling of the subject vehicle, the course predictor 268 may determine a course of a predicted collision. The TTC module 269 is configured to calculate a time it will take for the estimated collision to occur based on information regarding the predicted course of collision and sensor information from the sensor(s) 225. For example, the TTC module 269 may calculate a TTC (time-to-collision) based on a distance of the collision course and a relative speed between the leading vehicle and the subject vehicle. The signal generation controller 224 is configured to determine whether to generate a control signal to operate a warning generator to provide a warning for the driver, and/or to operate a vehicle control to control the vehicle (e.g., to automatically disengage the gas pedal operation, to apply brake, etc.), based on output from the module 221 and output from the TTC module 269. In some embodiments, if the TTC is less than a threshold (e.g., 3 seconds), then the signal generation controller 224 generates the control signal to operate the warning generator and/or the vehicle control. Also, in some embodiments, the threshold may be adjustable based on the output from the driver monitoring module 211. For example, if the output from the driver monitoring module 211 indicates that the driver is distracted or not attentive to a driving task, then the signal generation controller 224 may increase the threshold (e.g., making the threshold to be 5 seconds). This way, the signal generation controller 224 will provide the control signal when the TTC with the leading vehicle is less than 5 seconds.

It should be noted that the module 221 is not limited to predicting collision with a leading vehicle, and that the module 221 may be configured to predict collision with other vehicles. For example, in some embodiments, the module 221 may be configured to detect a vehicle that is traveling towards a path of the subject vehicle, such as a vehicle approaching an intersection, a vehicle merging towards the lane of the subject vehicle, etc. In these situations, the course predictor 268 determines the course of the subject vehicle, as well as the course of the other vehicle, and also determines the intersection between the two courses. The TTC module 269 is configured to determine the TTC based on the location of the intersection, the speed of the other vehicle, and the speed of the subject vehicle.

The vulnerable object detector 262 is configured to detect vulnerable objects outside the subject vehicle, and provide information (such as object identifiers, object positions, etc.) regarding the detected objects to module 221. For example, the vulnerable object detector 262 may detect humans outside the subject vehicle, and provide information regarding the detected humans to the module 221. The module 221 includes an object tracker 266 configured to track one or more of the detected objects (e.g., humans), a course predictor 268 configured to determine a course of a predicted collision, and a time to collision/crossing (TTC) module 269 configured to estimate a time it will take for the estimated collision to occur. Because certain objects, such as human, animal, cyclist, etc., may have movement direction that is unpredictable, in some embodiments, the course predictor 268 is configured to determine a box surrounding the image of the detected object for indicating possible positions of the object. In some embodiments, the course predictor 268 is configured to determine the course of the predicted collision based on the box surrounding the identified object (e.g., human), and sensor information from the sensor(s) 225. For example, based on the speed of the subject vehicle, a direction of traveling of the subject vehicle, and the box surrounding the identified object, the course predictor 268 may determine that the current traveling path of the subject vehicle will intersect the box. In such case, the course of the predicted collision will be the traveling path of the subject vehicle, and the location of the predicted collision will be the intersection between the traveling path of the subject vehicle and the box surrounding the object. The TTC module 269 is configured to calculate a time it will take for the estimated collision to occur based on information regarding the predicted course of collision and sensor information from the sensor(s) 225. For example, the TTC module 269 may calculate a TTC (time-to-collision) based on a distance of the collision course and a relative speed between the leading vehicle and the human. The signal generation controller 224 is configured to determine whether to generate a control signal to operate a warning generator to provide a warning for the driver, and/or to operate a vehicle control to control the vehicle (e.g., to automatically disengage the gas pedal operation, to apply brake, etc.), based on output from the module 221 and output from the TTC module 269. In some embodiments, if the TTC is less than a threshold (e.g., 3 seconds), then the signal generation controller 224 generates the control signal to operate the warning generator and/or the vehicle control. Also, in some embodiments, the threshold may be adjustable based on the output from the driver monitoring module 211. For example, if the output from the driver monitoring module 211 indicates that the driver is distracted or not attentive to a driving task, then the signal generation controller 224 may increase the threshold (e.g., making the threshold to be 5 seconds). This way, the signal generation controller 224 will provide the control signal when the TTC with the object is less than 5 seconds.

It should be noted that the module 221 is not limited to predicting collision with a human, and that the module 221 may be configured to predict collision with other objects. For example, in some embodiments, the module 221 may be configured to detect animals, bicyclists, roller-skaters, skateboarders, etc. In these situations, the course predictor 268 may be configured to determine the course of the subject vehicle, as well as the course of the detected object (if the object is moving in one direction, such as a bicyclist), and also determines the intersection between the two courses. In other cases, if the object's movement is more unpredictable (such as an animal), the course predictor 268 may determine the path of the subject vehicle, and a box encompassing a range of possible positions of the object, and may determine the intersection between the path of the subject vehicle and the box, as similarly discussed. The TTC module 269 is configured to determine the TTC based on the location of the intersection and the speed of the subject vehicle.

The intersection detector 264 is configured to detect one or more objects outside the subject vehicle indicating an intersection, and provide information (such as type of intersection, required stop location for the vehicle, etc.) regarding the intersection to module 221. By means of non-limiting examples, the one or more objects indicating an intersection may include a traffic light, a stop sign, a road marking, etc., or any combination of the foregoing. Also, the intersections that can be detected by the intersection detector 264 may include a stop-sign intersection, a traffic-light intersection, an intersection with a train railroad, etc. The module 221 includes a course predictor 268 configured to determine a course of a predicted intersection violation, and a time to collision/crossing (TTC) module 269 configured to estimate a time it will take for the estimated intersection violation to occur. The TTC module 269 is configured to calculate a time it will take for the estimated intersection violation to occur based on the location of the required stopping for the vehicle and sensor information from the sensor(s) 225. For example, the TTC module 269 may calculate a TTC (time-to-crossing) based on a distance of the course (e.g., a distance between the current position of the vehicle and the location of the required stopping for the vehicle), and a speed of the subject vehicle. In some embodiments, the location of the required stopping may be determined by the object detector 216 detecting a stop line marking on the road. In other embodiments, there may not be a stop line marking on the road. In such cases, the course predictor 268 may determine an imaginary line or a graphical line indicating the location of the required stopping. The signal generation controller 224 is configured to determine whether to generate a control signal to operate a warning generator to provide a warning for the driver, and/or to operate a vehicle control to control the vehicle (e.g., to automatically disengage the gas pedal operation, to apply brake, etc.), based on output from the module 221 and output from the TTC module 269. In some embodiments, if the TTC is less than a threshold (e.g., 3 seconds), then the signal generation controller 224 generates the control signal to operate the warning generator and/or the vehicle control. Also, in some embodiments, the threshold may be adjustable based on the output from the driver monitoring module 211. For example, if the output from the driver monitoring module 211 indicates that the driver is distracted or not attentive to a driving task, then the signal generation controller 224 may increase the threshold (e.g., making the threshold to be 5 seconds). This way, the signal generation controller 224 will provide the control signal when the time to crossing the intersection is less than 5 seconds.

In some embodiments, with respect to a predicted collision with another vehicle, a predicted collision with an object, or a predicted intersection violation, the signal generation controller 224 may be configured to apply different values of threshold for generating the control signal based on the type of state of the driver indicated by the output of the driver monitoring module 211. For example, if the output of the driver monitoring module 211 indicates that the driver is looking at a cell phone, then the signal generation controller 224 may generate the control signal to operate the warning generator and/or to operate the vehicle control in response to the meeting or being less than a threshold of 5 seconds. On the other hand, if the output of the driver monitoring module 211 indicates that the driver is drowsy, then the signal generation controller 224 may generate the control signal to operate the warning generator and/or to operate the vehicle control in response to the TTC being below a threshold of 8 seconds (e.g., longer than the threshold for the case in which the driver is using a cell phone). In some cases, a longer time threshold (for comparison with the TTC value) may be needed to alert the driver and/or to control the vehicle because certain state of the driver (such as the driver being sleepy or drowsy) may take longer for the driver to react to an imminent collision. Accordingly, the signal generation controller 224 will alert the driver and/or may operate the vehicle control earlier in response to a predicted collision in these circumstances.

Driver State Determination

Figure 3:
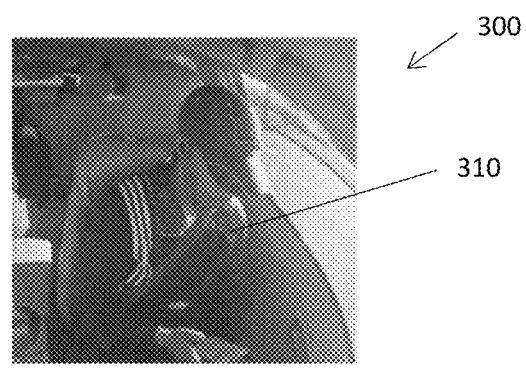
FIG. 3 illustrates an example of an image captured by a camera of the apparatus of FIG. 2.

As described herein, the second camera 204 is configured for viewing a driver inside the vehicle. While the driver operates the vehicle, the first camera 202 captures images outside the vehicle, and the second camera 204 captures images inside the vehicle. FIG. 3 illustrates an example of an image 300 captured by the second camera 204 of the apparatus 200 of FIG. 2. As shown in the figure, the image 300 from the second camera 202 may include an image of a driver 310 operating the subject vehicle (the vehicle with the apparatus 200). The processing unit 210 is configured to processing image(s) (e.g., the image 300) from the camera 202, and to determine whether the driver is engaged with a driving task or not. By means of non-limiting examples, a driving task may be paying attention to a road or environment in front of the subject vehicle, having hand(s) on steering wheel, etc.

Figure 4:
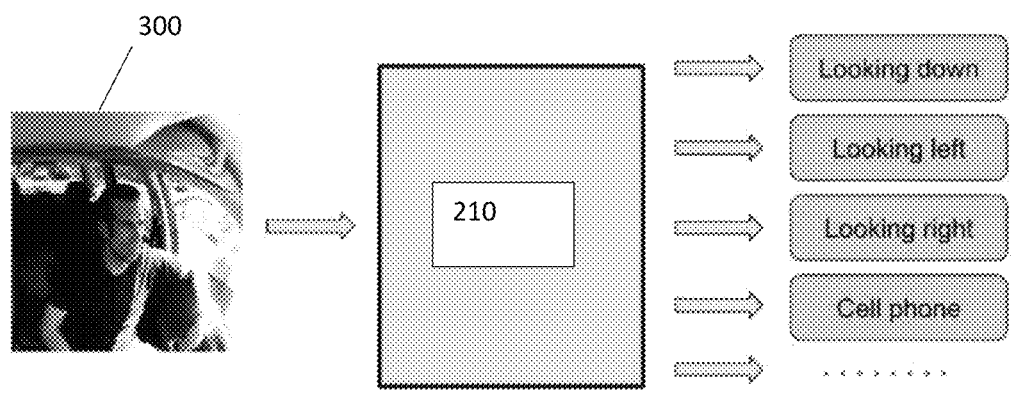
FIG. 4 illustrates an example of classifier.

As shown in FIG. 4, in some embodiments, the processing unit 210 is configured to process the image 300 of the driver from the camera 202, and to determine whether the driver belongs to certain pose classification(s). By means of non-limiting examples, the pose classification(s) may be one or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose. Also, in some embodiments, the processing unit 210 is configured to determine whether the driver is engaged with a driving task or not based on one or more pose classifications. For example, if the driver's head is "looking" down, and the driver is holding a cell phone, then the processing unit 210 may determine that the driver is not engaged with a driving task (i.e., the driver is not paying attention to the road or to an environment in front of the vehicle). As another example, if the driver's head is "looking" to the right or left, and if the angle of head turn has passed a certain threshold, then the processing unit 210 may determine that the driver is not engaged with a driving task.

In some embodiments, the processing unit 210 is configured to determine whether the driver is engaged with a driving task or not based on one or more pose(s) of the driver as it appears in the image without a need to determine a gaze direction of an eye of the driver. This feature is advantageous because a gaze direction of an eye of the driver may not be captured in an image, or may not be determined accurately. For example, a driver of the vehicle may be wearing a hat that prevents his/her eyes from being captured by the vehicle camera. The driver may also be wearing sun glasses that obstruct the view of the eyes. In some cases, if the driver is wearing transparent prescription glasses, the frame of the glasses may also obstruct the view of the eyes, and/or the lens of the glasses may make detection of the eyes inaccurate. Accordingly, determining whether the driver is engaged with a driving task or not without a need to determine gaze direction of the eye of the driver is advantageous, because even if the eye(s) of the driver cannot be detected and/or if the eye's gazing direction cannot be determined, the processing unit 210 can still determine whether the driver is engaged with a driving task or not.

In some embodiments, the processing unit 210 may use context-based classification to determine whether the driver is engaged with a driving task or not. For example, if the driver's head is looking downward, and if the driver is holding a cell phone at his/her lap wherein the driver's head is oriented towards, then the processing unit 210 may determine that the driver is not engaged with a driving task. The processing unit 210 may make such determination even if the driver's eyes cannot be detected (e.g., because they may be blocked by a cap like that shown in FIG. 3). The processing unit 210 may also use context-based classification to determine one or more poses for the driver. For example, if the driver's head is directing downward, then the processing unit 210 may determine that the driver is looking downward even if the eyes of the driver cannot be detected. As another example, if the driver's head is directing upward, then the processing unit 210 may determine that the driver is looking upward even if the eyes of the driver cannot be detected. As a further example, if the driver's head is directing towards the right, then the processing unit 210 may determine that the driver is looking right even if the eyes of the driver cannot be detected. As a further example, if the driver's head is directing towards the left, then the processing unit 210 may determine that the driver is looking left even if the eyes of the driver cannot be detected.

In one implementation, the processing unit 210 may be configured to use a model to identify one or more poses for the driver, and to determine whether the driver is engaged with a driving task or not. The model may be used by the processing unit 210 to process images from the camera 204. In some embodiments, the model may be stored in the non-transitory medium 230. Also, in some embodiments, the model may be transmitted from a server, and may be received by the apparatus 200 via the communication unit 240.

In some embodiments, the model may be a neural network model. In such cases, the neural network model may be trained based on images of other drivers. For example, the neural network model may be trained using images of drivers to identify different poses, such as looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, two-hands-on-wheel pose, etc. In some embodiments, the neural network model may be trained to identify the different poses even without detection of the eyes of the persons in the images. This allows the neural network model to identify different poses and/or to determine whether a driver is engaged with a driving task or not based on context (e.g., based on information captured in the image regarding the state of the driver other than a gazing direction of the eye(s) of the driver). In other embodiments, the model may be any of other types of model that is different from neural network model.

In some embodiments, the neural network model may be trained to classify pose(s) and/or to determine whether the driver is engaged with a driving task or not, based on context. For example, if the driver is holding a cell phone, and has a head pose that is facing downward towards the cell phone, then the neural network model may determine that the driver is not engaged with a driving task (e.g., is not looking at the road or the environment in front of the vehicle) without the need to detect the eyes of the driver.

In some embodiments, deep learning or artificial intelligence may be used to develop a model that identifies pose(s) for the driver and/or to determine whether the driver is engaged with a driving task or not. Such a model can distinguish a driver who is engaged with a driving task from a driver who is not.

In some embodiments, the model utilized by the processing unit 210 to identify pose(s) for the driver may be a convolutional neural network model. In other embodiments, the model may be simply any mathematical model.

Figure 5:
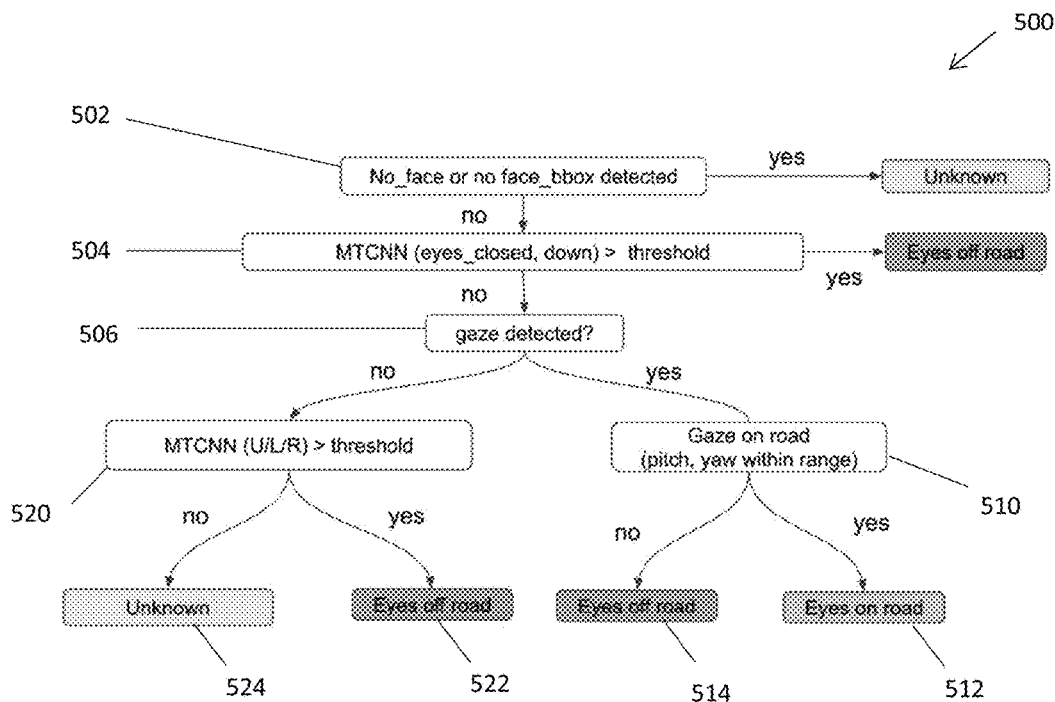
FIG. 5 illustrates a method in accordance with some embodiments.

FIG. 5 illustrates an algorithm 500 for determining whether a driver is engaged with a driving task or not. For example, the algorithm 500 may be utilized for determining whether a driver is paying attention to the road or environment in front of the vehicle. The algorithm 500 may be implemented and/or performed using the processing unit 210 in some embodiments.

First, the processing unit 210 processes an image from the camera 204 to attempt to detect a face of a driver based on the image (item 502). If the face of the driver cannot be detected in the image, the processing unit 210 may then determine that it is unknown as to whether the driver is engaged with a driving task or not. On the other hand, if the processing unit 210 determines that a face of the driver is present in the image, the processing unit 210 may then determine whether the eye(s) of the driver is closed (item 504). In one implementation, the processing unit 210 may be configured to determine eye visibility based on a model, such as a neural network model. If the processing unit 210 determines that the eye(s) of the driver is closed, then the processing unit 210 may determine that the driver is not engaged with a driving task. On the other hand, if the processing unit 210 determines that the eye(s) of the driver is not closed, the processing unit 210 may then attempt to detect a gaze of the eye(s) of the driver based on the image (item 506).

Referring to item 510 in the algorithm 500, if the processing unit 210 successfully detects a gaze of the eye(s) of the driver, the processing unit 210 may then determine a direction of the gaze (item 510). For example, the processing unit 210 may analyze the image to determine a pitch (e.g., up-down direction) and/or a yaw (e.g., left-right direction) of the gazing direction of the eye(s) of the driver. If the pitch of the gazing direction is within a prescribed pitch range, and if the yaw of the gazing direction is within a prescribed yaw range, then the processing unit 210 may determine that the user is engaged with a driving task (i.e., the user is viewing the road or the environment ahead of the vehicle) (item 512). On the other hand, if the pitch of the gazing direction is not within the prescribed pitch range, or if the yaw of the gazing direction is not within the prescribed yaw range, then the processing unit 210 may determine that the user is not engaged with a driving task (item 514).

Referring to item 520 in the algorithm 500, if the processing unit 210 cannot successfully detect a gaze of the eye(s) of the driver, the processing unit 210 may then determine whether the driver is engaged with a driving task or not without requiring a determination of a gaze direction of the eye(s) of the driver (item 520). In some embodiments, the processing unit 210 may be configured to use a model to make such determination based on context (e.g., based on information captured in the image regarding the state of the driver other than a gazing direction of the eye(s) of the driver). In some embodiments, the model may be a neural network model that is configured to perform context-based classification for determining whether the driver is engaged with a driving task or not. In one implementation, the model is configured to process the image to determine whether the driver belongs to one or more pose classifications. If the driver is determined as belonging to one or more pose classifications, then the processing unit 210 may determine that the driver is not engaged with a driving task (item 522). If the driver is determined as not belonging to one or more pose classifications, the processing unit 210 may then determine that the driver is engaged with a driving task or that it is unknown whether the driver is engaged with a driving task or not (item 524).

In some embodiments, the above items 502, 504, 506, 510, 520 may be repeatedly performed by the processing unit 210 to process multiple images in a sequence provided by the camera 204, thereby performing real-time monitoring of the driver while the driver is operating the vehicle.

It should be noted that the algorithm 500 is not limited to the example described, and that the algorithm 500 implemented using the processing unit 210 may have other features and/or variations. For example, in other embodiments, the algorithm 500 may not include item 502 (detection of a face of a driver). As another example, in other embodiments, the algorithm 500 may not include item 504 (detecting of closed-eye condition). Also, in further embodiments, the algorithm 500 may not include item 506 (attempt to detect gaze) and/or item 510 (determination of gaze direction).

Also, in some embodiments, even if a gaze direction of the eye(s) of the driver can be detected by the processing unit 210, the processing unit 210 may still perform context-based classification to determine whether the driver belongs to one or more poses. In some cases, the pose classification(s) may be used by the processing unit 210 to confirm a gaze direction of the eye(s) of the driver. Alternatively, the gaze direction of the eye(s) of the driver may be used by the processing unit 210 to confirm one or more pose classifications for the driver.

Figure 6:
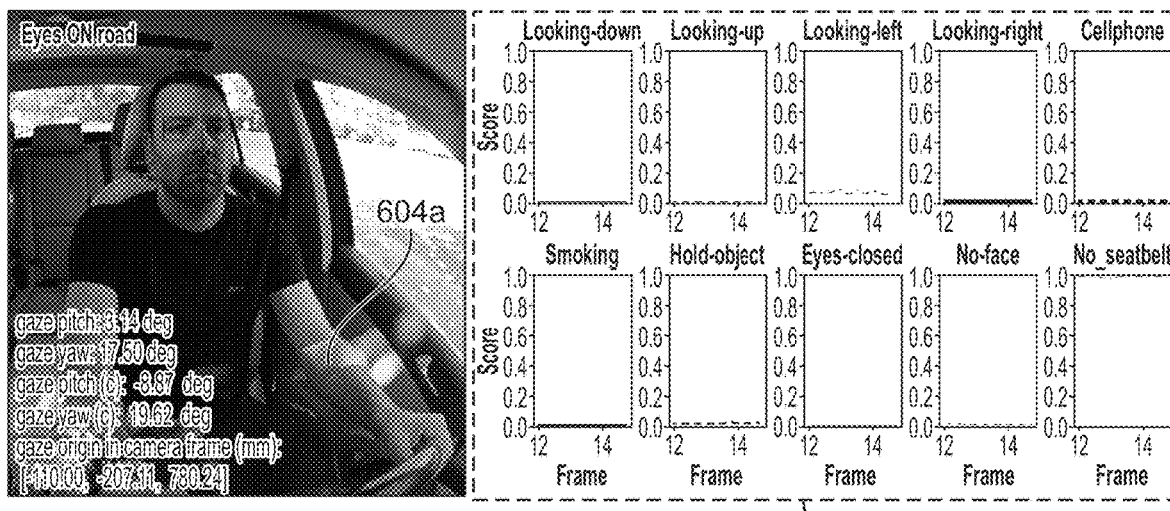
FIG. 6 illustrates an example of an image captured by the camera of FIG. 1, any various classifier outputs.

As discussed, in some embodiments, the processing unit 210 is configured to determine whether the driver belongs to one or more pose classifications based on image from the camera 204, and to determine whether the driver is engaged with a driving task or not based on the one or more pose classifications. In some embodiments, the processing unit 210 is configured to determine metric values for multiple respective pose classifications, and to determine whether the driver is engaged with a driving task or not based on one or more of the metric values. FIG. 6 illustrates examples of classification outputs 602 provided by the processing unit 210 based on the image 604*a*. In the example, the classification outputs 602 include metric values for respective different pose classifications—i.e., "looking down" classification, "looking up" classification, "looking left" classification, "looking right" classification, "cellphone utilization" classification, "smoking" classification, "hold-object" classification, "eyes-closed" classification, "no face" classification, and "no seatbelt" classification. The metric values for these different pose classifications are relatively low (e.g., below 0.2), indicating that the driver in the image 604*a* does not meet any of these pose classifications. Also, in the illustrated example, because the driver's eyes are not closed, the gaze direction of the driver can be determined by the processing unit 210. The gaze direction is represented by a graphical object superimposed on the nose of the driver in the image. The graphical object may include a vector or a line that is parallel to a gaze direction. Alternatively or additionally, the graphical object may include one or more vectors or one or more lines that are perpendicular to the gaze direction.

Figure 7:
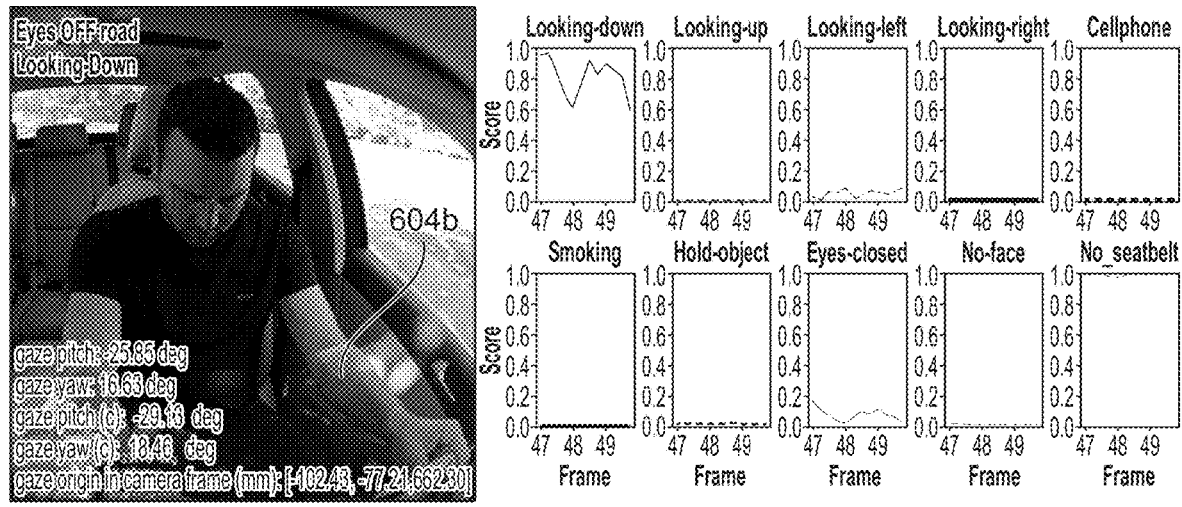
FIG. 7 illustrates another example of an image captured by the camera of FIG. 1, any various classifier outputs.

FIG. 7 illustrates other examples of classification outputs 602 provided by the processing unit 210 based on image 604*b*. In the illustrated example, the metric value for the "looking down" pose has a relatively high value (e.g., higher than 0.6), indicating that the driver has a "looking down" pose. The metric values for the other poses have relatively low values, indicating that the driver in the image 604*b* does not meet these pose classifications.

Figure 8:
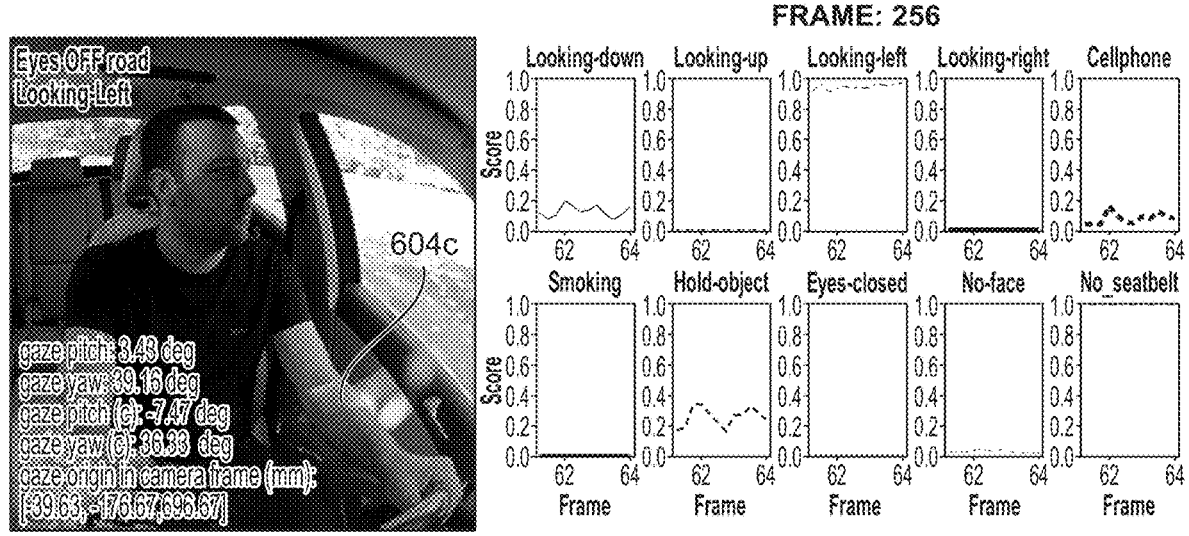
FIG. 8 illustrates another example of an image captured by the camera of FIG. 1, any various classifier outputs.

FIG. 8 illustrates other examples of classification outputs 602 provided by the processing unit 210 based on image 604*c*. In the illustrated example, the metric value for the "looking left" pose has a relatively high value (e.g., higher than 0.6), indicating that the driver has a "looking left" pose. The metric values for the other poses have relatively low values, indicating that the driver in the image 604*c* does not meet these pose classifications.

In some embodiments, the processing unit 210 is configured to compare the metric values with respective thresholds for the respective pose classifications. In such cases, the processing unit 210 is configured to determine the driver as belonging to one of the pose classifications if the corresponding one of the metric values meets or surpasses the corresponding one of the thresholds. For example, the thresholds for the different pose classifications may be set to 0.6. In such cases, if any of the metric values for any of the pose classifications exceeds 0.6, then the processing unit 210 may determine that the driver as having a pose belonging to the pose classification (i.e., the one with the metric value exceeding 0.6). Also, in some embodiments, if any of the metric values for any of the pose classifications exceeds the pre-set threshold (e.g., 0.6), then the processing unit 210 may determine that the driver is not engaged with a driving task. Following the above example, if the metric value for the "looking down" pose, the "looking up" pose, the "looking left" pose, the "looking right" pose, the "cellphone usage" pose, or the "eye closed" pose is higher than 0.6, then the processing unit 210 may determine that the driver is not engaged with a driving task.

In the above examples, the same pre-set threshold is implemented for the different respective pose classifications. In other embodiments, at least two of the thresholds for the at least two respective pose classifications may have different values. Also, in the above examples, the metric values for the pose classifications have a range from 0.0 to 1.0, with 1.0 being the highest. In other embodiments, the metric values for the pose classifications may have other ranges. Also, in other embodiments, the convention of the metric values may be reversed in that a lower metric value may indicate that the driver is meeting a certain pose classification, and a higher metric value may indicate that the driver is not meeting a certain pose classification.

Also, in some embodiments, the thresholds for the different pose classifications may be tuned in a tuning procedure, so that the different pose classifications will have their respective tuned thresholds for allowing the processing unit 210 to determine whether an image of a driver belongs to certain pose classification(s) or not.

In some embodiments, a single model may be utilized by the processing unit 210 to provide multiple pose classifications. The multiple pose classifications may be outputted by the processing unit 210 in parallel or in sequence. In other embodiments, the model may comprise multiple sub-models, with each sub-model being configured to detect a specific classification of pose. For example, there may be a sub-model that detects face, a sub-model that detects gaze direction, a sub-model that detects looking-up pose, a sub-model that detects looking-down pose, a sub-model that detects looking-right pose, a sub-model that detects looking-left pose, a sub-model that detects cell phone usage pose, a sub-model that detects hand(s)-not-on-the wheel pose, a sub-model that detects not-wearing-seatbelt pose, a sub-model that detects eye(s)-closed pose, etc.

In the above embodiments, the thresholds for the respective pose classifications are configured to determine whether a driver's image meet the respective pose classifications. In other embodiments, the thresholds for the respective pose classifications may be configured to allow the processing unit 210 to determine whether the driver is engaging with a driving task or not. In such cases, if one or more metric values for one or more respective pose classifications meet or surpass the respective one or more thresholds, then the processing unit 210 may determine that the driver is engaged with the driving task or not. In some embodiments, the pose classifications may belong to a "distraction" class. In such cases, if a criterion for any of the pose classifications is met, then the processing unit 210 may determine that the driver is not engaged with the driving task (e.g., the driver is distracted). Examples of pose classifications belonging to "distraction" class include "looking-left" pose, "looking-right" pose, "looking-up" pose, "looking-down" pose, "cell phone holding" pose, etc. In other embodiments, the pose classifications may belong to an "attention" class. In such cases, if a criterion for any of the pose classifications is met, then the processing unit 210 may determine that the driver is engaged with the driving task (e.g., the driver is paying attention to driving). Examples of pose classifications belonging to "attention" class include "looking-straight" pose, "hand(s) on wheel" pose, etc.

As illustrated in the above examples, context-based classification is advantageous because it allows the processing unit 210 to identify driver who is not engaged with a driving task even if a gaze direction of the eyes of the driver cannot be detected. In some cases, even if the apparatus 200 is mounted at very off angle with respect to the vehicle (which may result in the driver appearing at odd angles and/or positions in the camera images), context-based identification will still allow the processing unit 210 to identify driver who is not engaged with a driving task. Aftermarket products may be mounted in different positions, making it difficult to detect eyes and gaze. The features described herein are advantageous because they allow determination of whether the driver is engaged with driving task or not even if the apparatus 200 is mounted in such a way that the driver's eyes and gaze cannot be detected.

It should be noted that the processing unit 210 is not limited to using a neural network model to determine pose classification(s) and/or whether a driver is engaged with a driving task or not, and that the processing unit 210 may utilized any processing technique, algorithm, or processing architecture to determine pose classification(s) and/or whether a driver is engaged with a driving task or not. By means of non-limiting examples, the processing unit 210 may utilize equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, or a combination of two or more of the above, to process image(s) from the camera 204 to determine pose classification(s) and/or whether a driver is engaged with a driving task or not. A pose classification can be a binary classification or binary score (e.g., looking up or not), a score (e.g., continuous or discontinuous), a classification (e.g., high, medium, low), or be any other suitable measure of pose classification.

Also, it should be noted that the processing unit 210 is not limited to detecting poses indicating that the driver is not engaged with driving task (e.g., poses belonging to "distraction" class). In other embodiments, the processing unit 210 may be configured to detect poses indicating that the driver is engaged with driving task (e.g., poses belonging to "attention" class). In further embodiments, the processing unit 210 may be configured to detect both (1) poses indicating that the driver is not engaged with driving task, and (2) poses indicating that the driver is engaged with driving task.

In one or more embodiments described herein, the processing unit 210 may be further configured to determine a collision risk based on whether the driver is engaged with a driving task or not. In some embodiments, the processing unit 210 may be configured to determine the collision risk based solely on whether the driver is engaged with a driving task or not. For example, the processing unit 210 may determine that the collision risk is "high" if the driver is not engaged with a driving task, and may determine that the collision risk is "low" if the driver is engaged with a driving task. In other embodiments, the processing unit 210 may be configured to determine the collision risk based on additional information. For example, the processing unit 210 may be configured to keep track how long the driver is not engaged with a driving task, and may determine a level of collision risk based on a duration of the "lack of engagement with a driving task" condition. As another example, the processing unit 210 may process images from the first camera 202 to determine whether there is an obstacle (e.g., a vehicle, a pedestrian, etc.) in front of the subject vehicle, and may determine the collision risk based on a detection of such obstacle and in combination of the pose classification(s).

In the above embodiments, camera images from the camera 204 (viewing an environment in the cabin of the vehicle) are utilized to monitor driver's engagement with driving task. In other embodiments, camera images from the camera 202 (the camera viewing the external environment of the vehicle) may also be utilized as well. For example, in some embodiments, the camera images capturing the outside environment of the vehicle may be processed by the processing unit 210 to determine whether the vehicle is turning left, moving straight, or turning right. Based on the direction in which the vehicle is travelling, the processing unit 210 may then adjust one or more thresholds for pose classifications of the driver, and/or one or more thresholds for determining whether the driver is engaged with driving task or not. For example, if the processing unit 210 determines that the vehicle is turning left (based on processing of images from the camera 202), the processing unit 210 may then adjust the threshold for the "looking-left" pose classification, so that a driver who is looking left will not be classified as not engaged with driving task. In one implementation the threshold for "looking-left" pose classification may have a value of 0.6 for a straight-travelling vehicle, and may have a value of 0.9 for a left-turning vehicle. In such cases, if the processing unit 210 determines that the vehicle is travelling straight (based on processing of image(s) from the camera 202), and determines that the metric for the "looking-left" pose has a value of 0.7 (based on processing of image(s) from the camera 204), then the processing unit 210 may determine that the driver is not engaged with the driving task (because the metric value of 0.7 surpasses the threshold 0.6 for straight travelling vehicle). On the other hand, if the processing unit 210 determines that the vehicle is turning left (based on processing of image(s) from the camera 202), and determines that the metric for the "looking-left" pose has a value of 0.7 (based on processing of image(s) from the camera 204), then the processing unit 210 may determine that the driver is engaged with the driving task (because the metric value of 0.7 does not surpass the threshold 0.9 for left-turning vehicle). Thus, as illustrated in the above examples, a pose classification (e.g., "looking-left" pose) may belong to "distraction" class in one situation, and may belong to "attention" class in another situation. In some embodiments, the processing unit 210 is configured to process images of the external environment from the camera 202 to obtain an output, and adjust one or more thresholds based on the output. By means of non-limiting examples, the output may be a classification of driving condition, a classification of the external environment, a determined feature of the environment, a context of an operation of the vehicle, etc.

Drowsiness Detection

In some embodiments, the processing unit 210 may also be configured to processing images (e.g., the image 300) from the camera 204, and to determine whether the driver is drowsy or not based on the processing of the images. In some embodiments, the processing unit 210 may also process images from the camera 204 to determine whether the driver is distracted or not. In further embodiments, the processing unit 210 may also process images from the camera 202 to determine a collision risk.

Figure 9:
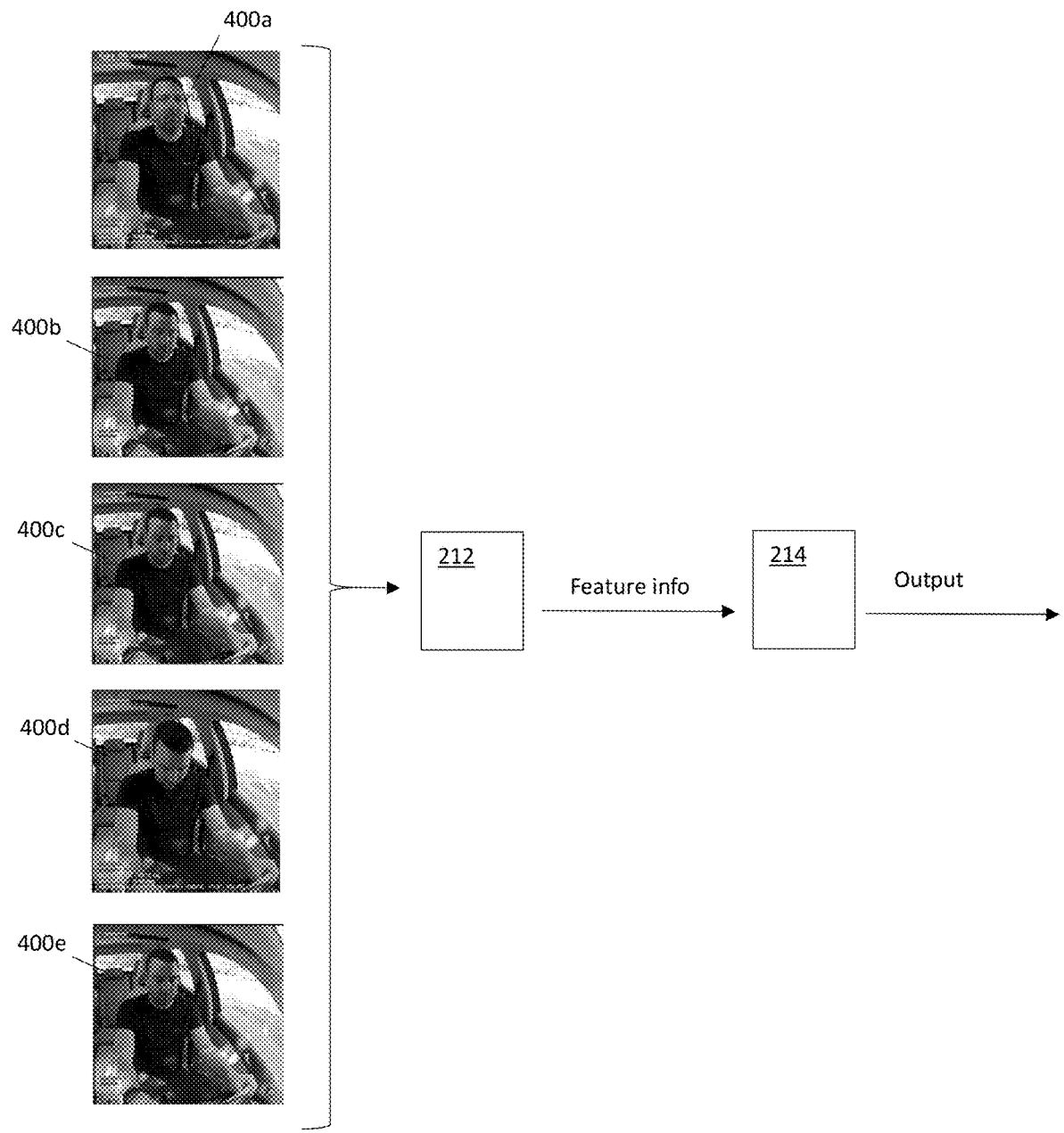
FIG. 9 illustrates an example of a processing architecture having a first model and a second model coupled in series.

In some embodiments, the driver monitoring module 211 of the processing unit 210 may include a first model and a second model that are configured to operate together to detect drowsiness of the driver. FIG. 9 illustrates an example of a processing architecture having the first model 212 and the second model 214 coupled in series. The first and second models 212, 214 are in the processing unit 210, and/or may be considered as parts of the processing unit 210 (e.g., a part of the driver monitoring module 211). Although the models 212, 214 are shown schematically to be in the processing unit 210, in some embodiments, the models 212, 214 may be stored in the non-transitory medium 230. In such cases, the models 212, 214 may still be considered as a part of the processing unit 210. As shown in the example, a sequence of images 400a-400e from the camera 204 are received by the processing unit 210. The first model 212 of the processing unit 210 is configured to process the images 400a-400e. In some embodiments, the first model 212 is configured to determine one or more poses for a corresponding one of the images 400a-400e. For example, the first model 212 may analyze the image 400a and may determine that the driver has a "opened-eye(s)" pose and a "head-straight" pose. The first model 212 may analyze the image 400b and may determine that the driver has a "closed-eye(s)" pose. The first model 212 may analyze the image 400c and may determine that the driver has a "closed-eye(s)" pose. The first model 212 may analyze the image 400d and may determine that the driver has a "closed-eye(s)" pose and a "head-down" pose. The first model 212 may analyze the image 400e and may determine that the driver has a "closed-eye(s)" pose and a "head-straight" pose. Although only five images 400a-400e are shown, in other examples, the sequence of images received by the first model 212 may be more than five. In some embodiments, the camera 202 may have a frame rate of at least 10 frames per second (e.g., 15 fps), and the first model 212 may continue to receive images from the camera 202 at that rate for the duration of the operation of the vehicle by the driver.

In some embodiments, the first model may be a single model utilized by the processing unit 210 to provide multiple pose classifications. The multiple pose classifications may be outputted by the processing unit 210 in parallel or in sequence. In other embodiments, the first model may comprise multiple sub-models, with each sub-model being configured to detect a specific classification of pose. For example, there may be a sub-model that detects face, a sub-model that detects head-up pose, a sub-model that detects head-down pose, a sub-model that detects closed-eye(s) pose, a sub-model that detects head-straight pose, a sub-model that detects opened-eye(s) pose, etc.

In some embodiments, the first model 212 of the processing unit 210 is configured to determine metric values for multiple respective pose classifications. The first model 212 of the processing unit 210 is also configured to compare the metric values with respective thresholds for the respective pose classifications. In such cases, the processing unit 210 is configured to determine the driver as belonging to one of the pose classifications if the corresponding one of the metric values meets or surpasses the corresponding one of the thresholds. For example, the thresholds for the different pose classifications may be set to 0.6. In such cases, if any of the metric values for any of the pose classifications exceeds 0.6, then the processing unit 210 may determine that the driver as having a pose belonging to the pose classification (i.e., the one with the metric value exceeding 0.6).

In the above examples, the same pre-set threshold is implemented for the different respective pose classifications. In other embodiments, at least two of the thresholds for the at least two respective pose classifications may have different values. Also, in the above examples, the metric values for the pose classifications have a range from 0.0 to 1.0, with 1.0 being the highest. In other embodiments, the metric values for the pose classifications may have other ranges. Also, in other embodiments, the convention of the metric values may be reversed in that a lower metric value may indicate that the driver is meeting a certain pose classification, and a higher metric value may indicate that the driver is not meeting a certain pose classification.

As discussed, in some embodiments, the first model 212 is configured to process images of the driver from the camera 204, and to determine whether the driver belongs to certain pose classifications. The pose classifications may belong to a "drowsiness" class, in which each of the pose classifications may indicate sign of drowsiness. By means of non-limiting examples, the pose classification(s) in the "drowsiness" class may be one or more of: head-down pose, closed-eye(s), etc., or any of other poses that would be helpful in determining whether the driver is drowsy. Alternatively or additionally, the pose classifications may belong to an "alertness" class, in which each of the pose classifications may indicate sign of alertness. By means of non-limiting examples, the pose classification(s) may be one or more of: cellphone-usage pose, etc., or any of other poses that would be helpful in determining whether the driver is drowsy or not. In some embodiments, certain poses may belong to both "drowsiness" class and "alertness" class. For example, head-straight and open-eye(s) pose may belong to both classes.

As shown in the figure, the pose identifications (or classifications) may be outputted by the first model 212 as feature information. The second model 214 obtains the feature information from the first model 212 as input, and processes the feature information to determine whether the driver is drowsy or not. The second model 214 also generates an output indicating whether the driver is drowsy or not.

In some embodiments, the feature information outputted by the first model 212 may be a time series of data. The time series of data may be pose classifications of the driver for the different images 400 at the different respective times. In particular, as images are generated sequentially one-by-one by the camera 204, the first model 212 processes the images sequentially one-by-one to determine pose(s) for each image. As pose classification(s) is determined for each image by the first model 212, the determined pose classification(s) for that image is then outputted by the first model 212 as feature information. Thus, as images are received one-by-one by the first model 212, feature information for the respective images are also outputted one-by-one sequentially by the first model 212.

Figure 10:
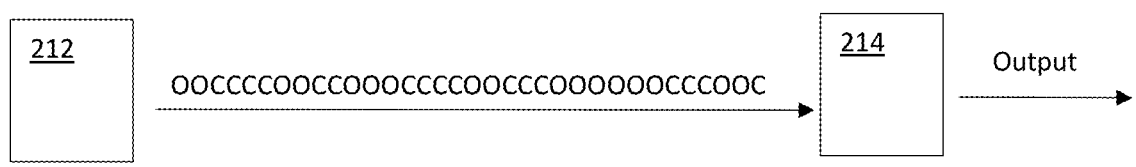
FIG. 10 illustrates an example of feature information received by the second model.

FIG. 10 illustrates an example of feature information received by the second model 214. As shown in the figure, the feature information includes pose classifications for the different respective images in a sequence, wherein "O" indicates that the driver has an "opened-eye(s)" pose in the image, and "C" indicates that the driver has a "closed-eye(s)" pose in the image. As the sequence of feature information is obtained by the second model 214, the second model 214 analyzes the feature information to determine whether the driver is drowsy or not. In one implementation, the second model 214 may be configured (e.g., programmed, made, trained, etc.) to analyze the pattern of the feature information, and determine whether it is a pattern that is associated with drowsiness (e.g., a pattern indicating drowsiness). For example, the second model 214 may be configured to determine blink rate, eye closure duration, time took to achieve eyelid closure, PERCLOS, or any of other metric(s) that measures or indicates alertness or drowsiness, based on the time series of feature information.

In some embodiments, if the blink rate has a value that surpasses a blink rate threshold value associated with drowsiness, then the processing unit 210 may determine that the driver is drowsy.

Alternatively or additionally, if the eye closure duration has a value that surpasses an eye closure duration threshold value associated with drowsiness, then the processing unit 210 may determine that the driver is drowsy. A person who is drowsy may have a longer eye closure duration compared to a person who is alert.

Alternatively or additionally, if the time it took to achieve eyelid closure has a value that surpasses a time threshold value associated with drowsiness, then the processing unit 210 may determine that the driver is drowsy. It should be noted that the time it took to achieve eyelid closure is a time interval between a state of the eyes being substantially opened (e.g., at least 80% opened, at least 90% opened, 100% opened, etc.) until the eyelids are substantially closed (e.g., at least 70% closed, at least 80% closed, at least 90% closed, 100% closed, etc.). It is a measure of a speed of the closing of the eyelid. A person who is drowsy tends to have a slower speed of eyelid closure compared to a person who is alert.

Alternatively or additionally, if the PERCLOS has a value that surpasses a PERCLOS threshold value associated with drowsiness, then the processing unit 210 may determine that the driver is drowsy. It should be noted that PERCLOS is a drowsiness metric that indicates the proportion of time in a minute that the eyes are at least 80 percent closed. PERCLOS is the percentage of eyelid closure over the pupil over time and reflects slow eyelid closures rather than blinks.

Figure 11:
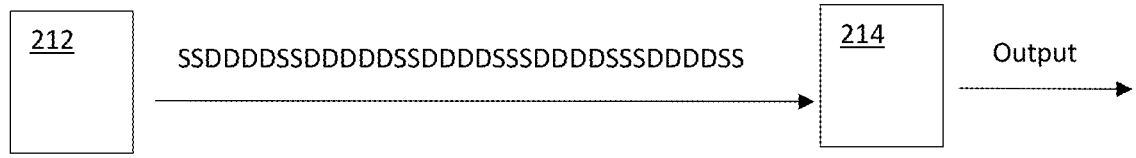
FIG. 11 illustrates another example of feature information received by the second model.

It should be noted that the feature information provided by the first model 212 to the second model 214 is not limited to the examples of pose classifications described in FIG. 10, and that the feature information utilized by the second model 214 for detecting drowsiness may include other pose classifications. FIG. 11 illustrates another example of feature information received by the second model 214. As shown in the figure, the feature information includes pose classifications for the different respective images in a sequence, wherein "S" indicates that the driver has a "head straight" pose in the image, and "D" indicates that the driver has a "head down" pose in the image. As the sequence of feature information is obtained by the second model 214, the second model 214 analyzes the feature information to determine whether the driver is drowsy or not. For example, if the "head straight" and "head down" pose classifications repeated in a certain pattern that is associated with drowsiness, then the processing unit may determine that the driver is drowsy. In one implementation, the second model 214 may be configured (e.g., programmed, made, trained, etc.) to analyze the pattern of the feature information, and determine whether it is a pattern that is associated with drowsiness (e.g., a pattern indicating drowsiness).

In some embodiments, the feature information provided by the first model 212 to the second model 214 may have a data structure that allows different pose classifications to be associated with different time points. Also, in some embodiments, such data structure may also allow one or more pose classifications to be associated with a particular time point.

Also, in some embodiments, the output of the first model 212 may be a numerical vector (e.g., a low dimensional numerical vector, such as embedding) that provides a numerical representation of pose(s) detected by the first model 212. The numerical vector may not be interpretable by a human, but may provide information regarding detected pose(s). In other embodiments, the output of the first model 212 may be any information indicating, representing, or associated with external scene, IMU signal, audio signal, etc. Also, in some embodiments, embeddings may represent any high dimensional signal, such as imaging signals, IMU signal, audio signal, etc.

In some embodiments, the first model 212 may be a neural network model. In such cases, the neural network model may be trained based on images of other drivers. For example, the neural network model may be trained using images of drivers to identify different poses, such as head-down pose, head-up pose, head-straight pose, closed-eye(s) pose, opened-eye(s) pose, cellphone-usage pose, etc. In other embodiments, the first model 212 may be any of other types of model that is different from neural network model.

Also, in some embodiments, the second model 214 may be a neural network model. In such cases, the neural network model may be trained based on feature information. For example, the feature information may be any information indicating a state of a driver, such as pose classification. In one implementation, the neural network model may be trained using feature information output by the first model 212. In other embodiments, the second model 214 may be any of other types of model that is different from neural network model.

In some embodiments, the first model 212 utilized by the processing unit 210 to identify pose(s) for the driver may be a convolutional neural network model. In other embodiments, the first model 212 may be simply any mathematical model. Also, in some embodiments, the second model 214 utilized by the processing unit 210 to determine whether the driver is drowsy or not may be a convolutional neural network model. In other embodiments, the second model 214 may be simply any mathematical model.

In some embodiments, the first model 212 may be a first neural network model trained to classify pose(s) based on context. For example, if the driver's head is facing down, then the neural network model may determine that the driver is not looking straight even if the eyes of the driver cannot be detected (e.g., because the eyes may be blocked by a hat/cap). Also, in some embodiments, the second model 214 may be a second neural network model trained to determine whether the driver is drowsy or not based on context. For example, if the blink rate exceeds a certain threshold, and/or if the head-down pose and head-straight pose repeats in a period pattern, then the neural network model may determine that the driver is drowsy. As another example, if the time it took to achieve eyelid closure exceeds a certain threshold, then the neural network model may determine that the driver is drowsy.

In some embodiments, deep learning or artificial intelligence may be used to develop one or more models that identifies pose(s) for the driver and/or to determine whether the driver is drowsy or not. Such model(s) can distinguish a driver who is drowsy from a driver who is alert.

It should be noted that the processing unit 210 is not limited to using neural network model(s) to determine pose classification(s) and/or whether a driver is drowsy or not, and that the processing unit 210 may utilized any processing technique, algorithm, or processing architecture to determine pose classification(s) and/or whether a driver is drowsy or not. By means of non-limiting examples, the processing unit 210 may utilize equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, or a combination of two or more of the above, to process image(s) from the camera 204 to determine pose classification(s) and/or to process time series of feature information to determine whether a driver is drowsy or not. A pose classification can be a binary classification or binary score (e.g., head down or not), a score (e.g., continuous or discontinuous), a classification (e.g., high, medium, low), or may be any other suitable measure of pose classification. Similarly, a drowsiness classification can be a binary classification or binary score (e.g., drowsy or not), a score (e.g., continuous or discontinuous), a classification (e.g., high, medium, low), or may be any other suitable measure of drowsiness.

In some embodiments, the determination of whether a driver is drowsy or not may be accomplished by analyzing a pattern of pose classifications of the driver that occur over a period, such as a period that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc. The period may be any pre-determined time duration of a moving window or moving box (for identifying data that was generated in the last time duration, e.g., data in the last fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.).

In some embodiments, the first model 212 and the second model 214 may be configured to operate together to detect "micro sleep" event, such as slow eyelid closure that occurs over a duration of sub-second, between 1 to 1.5 second or more than 2 seconds. In other embodiments, the first model 212 and the second model 214 may be configured to operate together to detect early sign(s) of drowsiness based on images captured in a longer period, such as a period that is longer than 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.

As illustrated in the above examples, using multiple sequential models to detect drowsiness is advantageous. In particular, the technique of combining the use of (1) the first model to process camera images (one-by-one as each camera image is generated) to identify driver's poses, and (2) the second model to process feature information resulted from processing of camera images by the first model, obviates the need for the processing unit 210 to collect a sequence of images in a batch, and to process the batch of camera images (video) together. This saves significant computational resource and memory space. In addition, as described in the above examples, the second model does not process images from the camera. Instead, the second model receives feature information as output from the first model, and process the feature information to determine whether the driver is drowsy or not. This is advantageous because processing feature information is easier and faster than processing a batch of camera images. Also, context-based classification is advantageous because it allows the processing unit 210 to identify different poses of the driver accurately. In some cases, even if the apparatus 200 is mounted at very off angle with respect to the vehicle (which may result in the driver appearing at odd angles and/or positions in the camera images), context-based identification will still allow the processing unit 210 to correctly identify poses of the driver. Aftermarket products may be mounted in different positions. The features described herein are also advantageous because they allow determination of whether the driver is drowsy or not even if the apparatus 200 is mounted at different angles.

It should be noted that the processing unit 210 is not limited to detecting poses indicating that the driver is drowsy (e.g., poses belonging to "drowsiness" class). In other embodiments, the processing unit 210 may be configured to detect poses indicating that the driver is alert (e.g., poses belonging to "alertness" class). In further embodiments, the processing unit 210 may be configured to detect both (1) poses indicating that the driver is drowsy, and (2) poses indicating that the driver is alert.

In some embodiments, the processing unit 210 may obtain (e.g., by receiving or determining) additional parameter(s) for determining whether the driver is drowsy or not. By means of non-limiting examples, the processing unit 210 may be configured to obtain acceleration of the vehicle, deceleration of the vehicle, vehicle position with respect to the driving lane, information regarding driver participation in the driving, etc. In some cases, one or more of the above parameters may be obtained by the second model 214, which then determines whether the driver is drowsy or not based on the output from the first model 212, as well as based on such parameter(s). It should be noted that acceleration, deceleration, and information regarding driver participation are indicators of whether the driver is actively driving or not. For example, if the driver is changing speed or turning the steering wheel, then the driver is less likely to be drowsy. In some embodiments, sensors built within the vehicle may provide acceleration and deceleration information. In such cases, the processing unit 210 may be hardwired to the vehicle system for receiving such information. Alternatively, the processing unit 210 may be configured to receive such information wirelessly. In further embodiments, the apparatus 200 comprising the processing unit 210 may optionally further include an accelerometer for detecting acceleration and deceleration. In such cases, the second model 214 may be configured to obtain the acceleration and/or deceleration information from the accelerometer. Also, information regarding driver participation may be any information indicating that the driver is or is not operating the vehicle. By means of non-limiting examples, such information may include one or more of: turning of steering wheel or lack thereof, activating of turning light lever or lack thereof, changing of gear or lack thereof, braking or lack thereof, pressing of acceleration pedal or lack thereof, etc. In some embodiments, information regarding driver participation may be information regarding driver participation that occurs within a certain past duration of time (e.g., within the last 10 seconds or longer, last 20 seconds or longer, last 30 seconds or longer, last 1 minute or longer, etc.).

In addition, in some embodiments, the vehicle position with respect to the driving lane may be determined by the processing unit 210 processing images from the external facing camera 202. In particular, the processing unit 210 may be configured to determine whether the vehicle is traveling within a certain threshold from a center line of the lane. If the vehicle is traveling within the certain threshold from the center line of the lane, that means the driver is actively participating in the driving. On the other hand, if the vehicle is drifting away from the center line of the lane past the threshold, that means the driver may not be actively participating in the driving. In some embodiments, the second model 214 may be configured to receive images from the first camera 202, and to determine whether the vehicle is traveling within a certain threshold from the center line of the lane. In other embodiments, another module may be configured to provide this feature. In such cases, the output of the module is input to the second model 214 for allowing the model 214 to determine whether the driver is drowsy or not based on the output of the module.

Also, in one or more embodiments described herein, the processing unit 210 may be further configured to determine a collision risk based on whether the driver is drowsy or not. In some embodiments, the processing unit 210 may be configured to determine the collision risk based solely on whether the driver is drowsy or not. For example, the processing unit 210 may determine that the collision risk is "high" if the driver is drowsy, and may determine that the collision risk is "low" if the driver is not drowsy (e.g., alert). In other embodiments, the processing unit 210 may be configured to determine the collision risk based on additional information. For example, the processing unit 210 may be configured to keep track how long the driver has been drowsy, and may determine a level of collision risk based on a duration of the drowsiness.

As another example, the processing unit 210 may process images from the first camera 202 to determine an output, and may determine the collision risk based on such output and in combination of the pose classification(s) and/or drowsiness determination. By means of non-limiting examples, the output may be a classification of driving condition, a classification of the external environment, a determined feature of the environment, a context of an operation of the vehicle, etc. For examples, in some embodiments, the camera images capturing the outside environment of the vehicle may be processed by the processing unit 210 to determine whether the vehicle is turning left, moving straight, turning right, whether there is an obstacle (e.g., a vehicle, a pedestrian, etc.) in front of the subject vehicle, etc. If the vehicle is turning, and/or if there is an obstacle detected in the travelling path of the vehicle, while drowsiness is detected, the processing unit 210 may then determine that the collision risk is high.

It should be noted that the second model 214 of the processing unit 210 is not limited to receiving only output from the first model 212. The second model 214 may be configured to receive other information (as input(s)) that are in addition to the output from the first model 212. For example, in other embodiments, the second model 214 may be configured to receive sensor signals from one or more sensors mounted to a vehicle, wherein the sensor(s) is configured to sense information about movement characteristic(s) and/or operation characteristic(s) of the vehicle. By means of non-limiting examples, the sensor signals obtained by the second model 214 may be accelerometer signals, gyroscope signals, speed signals, location signals (e.g., GPS signals), etc., or any combination of the foregoing. In further embodiments, the processing unit 210 may include a processing module that processes the sensor signals. In such cases, the second model 214 may be configured to receive the processed sensor signals from the processing module. In some embodiments, the second model 214 may be configured to process the sensor signals (provided by the sensor(s))

or the processed sensor signals (provided from the processing module) to determine a collision risk. The determination of the collision risk may be based on drowsiness detection and the sensor signals. In other embodiments, the determination of the collision risk may be based on drowsiness detection, the sensor signals, and images of surrounding environment outside the vehicle captured by the camera 202.

Also, in some embodiments, the processing unit 210 may include a facial landmark(s) detection module configured to detect one or more facial landmarks of the driver as captured in images of the camera 204. In such cases, the second model 214 may be configured to receive output from the facial landmark(s) detection module. In some cases, the output from the facial landmark(s) detection module may be utilized by the second model 214 to determine drowsiness and/or alertness. Alternatively or additionally, the output from the facial landmark(s) detection module may be used to train the second model 214.

Also, in some embodiments, the processing unit 210 may include an eye landmark(s) detection module configured to detect one or more eye landmarks of the driver as captured in images of the camera 204. In such cases, the second model 214 may be configured to receive output from the eye landmark(s) detection module. In some cases, the output from the eye landmark(s) detection module may be utilized by the second model 214 to determine drowsiness and/or alertness. Alternatively or additionally, the output from the eye landmark(s) detection module may be used to train the second model 214. An eye landmark may be a pupil, an eyeball, an eyelid, etc., or any feature associated with an eye of a driver.

In some embodiments, if the second model 214 is configured to receive one or more other information that are in addition to the output from the first model 212, the second model 214 may be configured to receive the one or more information, and the output from the first model 212 in parallel. This allows different information to be received by the second model 214 independently and/or simultaneously.

Figure 12:
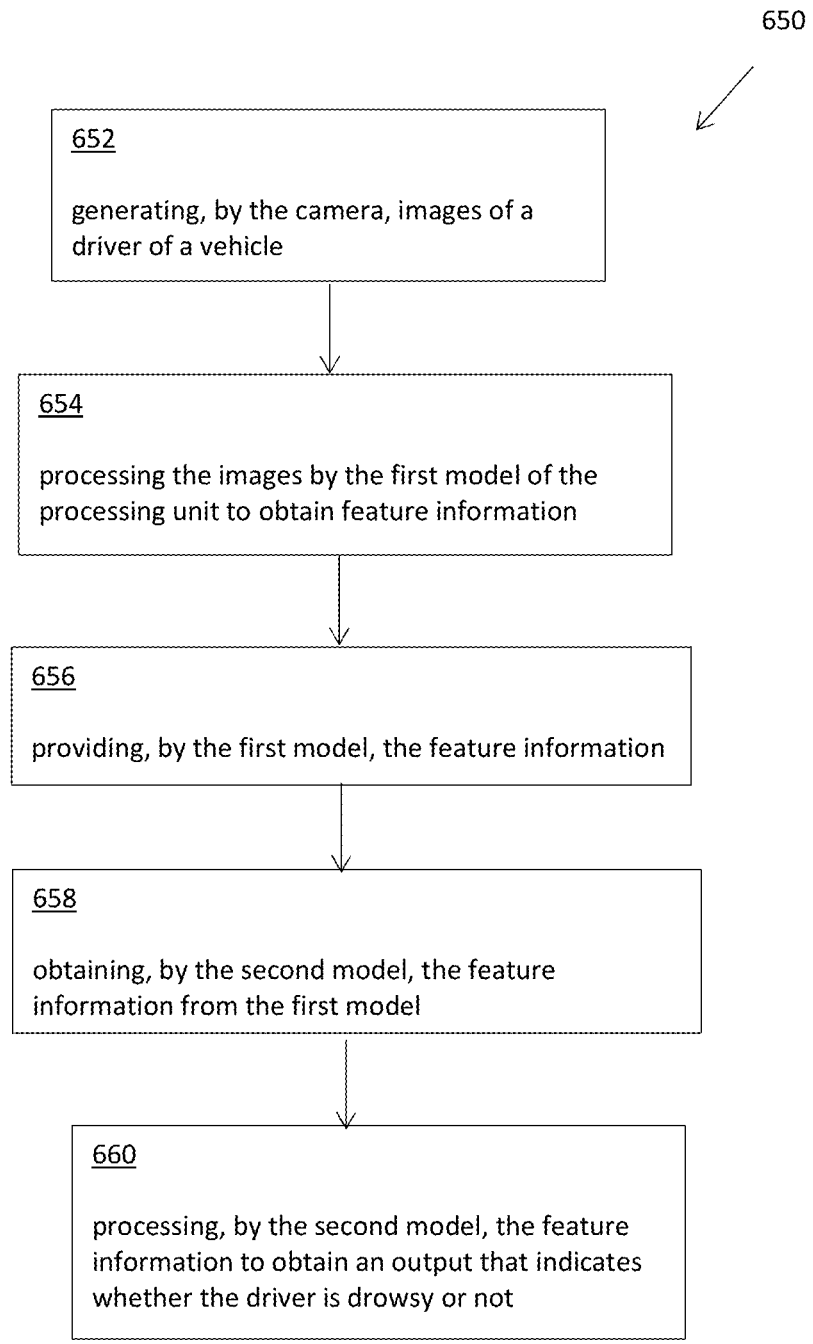
FIG. 12 illustrates a method of detecting drowsiness performed by the apparatus of FIG. 2 in accordance with some embodiments.

FIG. 12 illustrates a method 650 performed by the apparatus 200 of FIG. 2A in accordance with some embodiments. The method 650 includes: generating, by the camera, images of a driver of a vehicle (item 652); processing the images by the first model of the processing unit to obtain feature information (item 654); providing, by the first model, the feature information (item 656); obtaining, by the second model, the feature information from the first model (item 658); and processing, by the second model, the feature information to obtain an output that indicates whether the driver is drowsy or not (item 660).

It should be noted that the poses that can be determined by the driver monitoring module 211 is not limited to the examples described, and that the driver monitoring module 211 may determine other poses or behaviors of the driver. By means of non-limiting examples, the driver monitoring module 211 may be configured to detect talking, singing, eating, daydreaming etc., or any combination of the foregoing, of the driver. Detecting cognitive distraction (e.g., talking) is advantageous because even if the driver is looking at the road, the risk of intersection violation and/or the risk of collision may be higher if the driver is cognitively distracted (compared to if the driver is attentive to driving).

Collision Prediction

Figure 13:
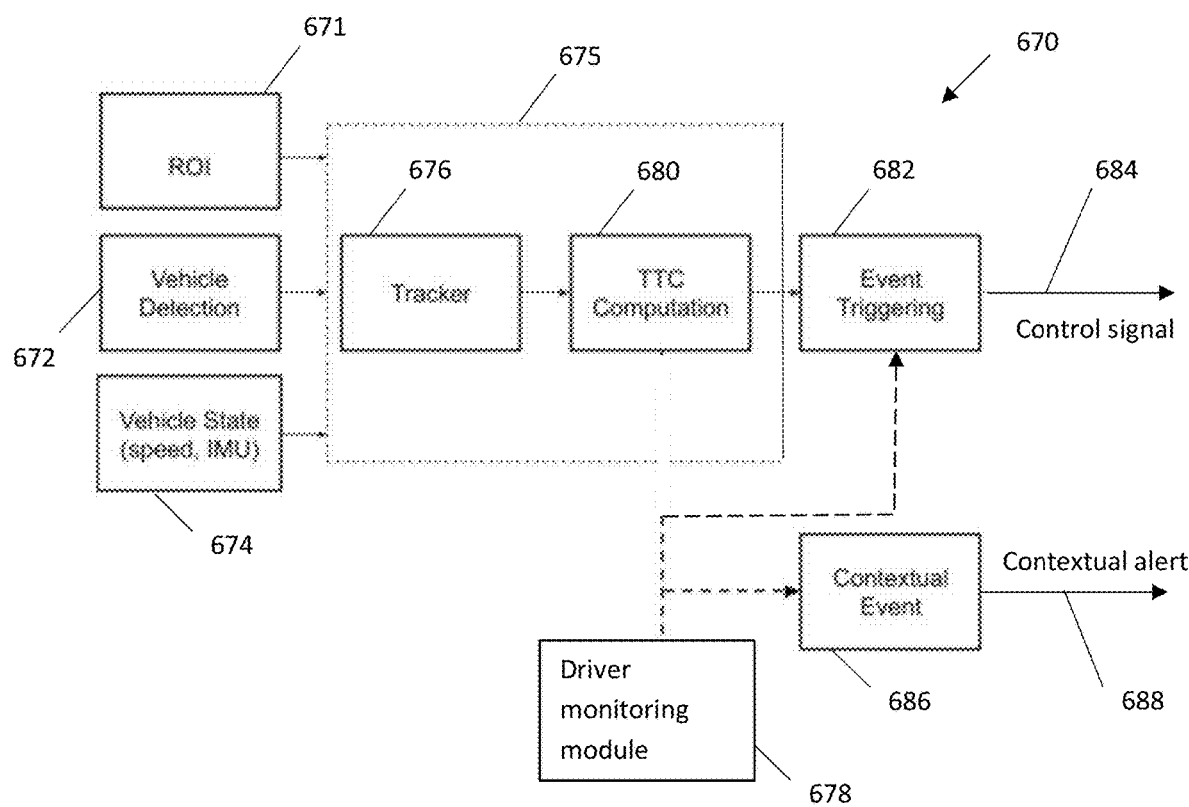
FIG. 13 illustrates an example of a processing architecture that may be implemented using the apparatus of FIG. 2A.

FIG. 13 illustrates an example of a processing architecture 670 in accordance with some embodiments. At least part(s) of the processing architecture 670 may be implemented using the apparatus of FIG. 2A in some embodiments. The processing architecture 670 includes a calibration module 671 configured to determine a region of interest for detecting object(s) in an image that may be at risk of collision with the subject vehicle, a vehicle detector 672 configured to detect vehicles, and a vehicle state module 674 configured to obtain information regarding one or more states of the subject vehicle. The processing architecture 670 also includes a collision predictor 675 having a tracker 676 and a time-to-collision (TTC) computation unit 680. The processing architecture 670 further includes a driver monitoring module 678 configured to determine whether the driver of the subject vehicle is distracted or not. The processing architecture 670 also includes an even trigger module 682 configured to generate a control signal 684 in response to detection of certain event(s) based on output provided by the collision predictor 675, and a contextual event module 686 configured to provide a contextual alert 688 based on output provided by the driver monitoring module 678.

In some embodiments, the vehicle detector 672 may be implemented by the object detector 216, and/or may be considered as an example of the object detector 216. The collision predictor 675 may be an example of the collision predictor 218 of the processing unit 210 in some embodiments. The driver monitoring module 678 may be implemented by the driver monitoring module 211 of the processing unit 210 in some embodiments. The even trigger module 682 may be implemented using the signal generation controller 224 of the processing unit 210, and/or may be considered as examples of the signal generation controller 224.

During use, the calibration module 671 is configured to determine a region of interest for the first camera 202 for detecting vehicle(s) that may be at risk of collision with the subject vehicle. The calibration module 671 will be described further in reference to FIGS. 15A-15C. The vehicle detector 672 is configured to identify vehicles in camera images provided by the first camera 202. In some embodiments, the vehicle detector 672 is configured to detect vehicles in images based on a model, such as a neural network model that has been trained to identify vehicles.

The driver monitoring module 678 is configured to determine whether the driver of the subject vehicle is distracted or not. In some embodiments, the driver monitoring module 678 may determine one or more poses of the driver based on images provided by the second camera 204. The driver monitoring module 678 may determine whether the driver is distracted or not based on the poses of the driver. In some cases, the driver monitoring module 678 may determine one or more poses of the driver based on a model, such as a neural network model that has been trained to identify poses of drivers.

The collision predictor 675 is configured to select one or more of the vehicles detected by the vehicle detector 672 as possible candidates for collision prediction. In some embodiments, the collision predictor 675 is configured to select a vehicle for collision prediction if the image of the vehicle intersects the region of interest (determined by the calibration module 671) in an image frame. The collision predictor 675 is also configured to track the state of the selected vehicle (by the tracker 676). By means of non-limiting examples, the state of the selected vehicle being tracked may be: a position of the vehicle, a speed of the vehicle, an acceleration or deceleration of the vehicle, a movement direction of the vehicle, etc., or any combination of the foregoing. In some embodiments, the tracker 676 may be configured to determine if a detected vehicle is in a collision course with the subject vehicle based on a traveling path of the subject vehicle and/or a traveling path of the detected vehicle. Also, in some embodiments, the tracker 676 may be configured to determine that a vehicle is a leading vehicle if an image of the detected vehicle as it appears in an image frame from the first camera 202 intersects a region of interest in the image frame.

The TTC unit 680 of the collision predictor 675 is configured to calculate an estimated time it will take for the selected vehicle to collide with the subject vehicle for the predicted collision based on the tracked state of the selected vehicle and the state of the subject vehicle (provide by the vehicle state module 674). For example, if the tracked state of the selected vehicle indicates that the vehicle is in the path of the subject vehicle, and is travelling slower than the subject vehicle, the TTC unit 680 then determines the estimated time it will take for the selected vehicle to collide with the subject vehicle. As another example, if the tracked state of the selected vehicle indicates that the vehicle is a leading vehicle that is in front of the subject vehicle, the TTC unit 680 then determines the estimated time it will take for the selected vehicle to collide with the subject vehicle. In some embodiments, the TTC unit 680 may determine the estimated time to the predicted collision based on the relative speed between the two vehicles and/or a distance between the two vehicles. The TTC unit 680 is configured to provide the estimated time (TTC parameter) as output.

It should be noted that the collision predictor 675 is not limited to predicting collision between a leading vehicle and the subject vehicle, and that the collision predictor 675 may be configured to predict other types of collisions. For example, in some embodiments, the collision predictor 675 may be configured to predict collision between the subject vehicle and another vehicle that are traveling in two different respective roads (e.g., intersecting roads) and that are heading towards an intersection. As another example, in some embodiments, the collision predictor 675 may be configured to predict collision between the subject vehicle and another vehicle traveling in a next lane that is merging or drifting into the lane of the subject vehicle.

The event triggering module 682 is configured to provide a control signal based on output provided by the collision predictor 675 and output provided by the driver monitoring module 678. In some embodiments, the event trigger module 682 is configured to continuously or periodically monitor the state of the driver based on output provided by the driver monitoring module 678. The event trigger module 682 also monitors the TTC parameter in parallel. If the TTC parameter indicates that the estimated time it will take for the predicted collision to occur is below a certain threshold (e.g., 8 seconds, 7 seconds, 6, seconds, 5 seconds, 4 seconds, 3 seconds, etc.), and if the output by the driver monitoring module 678 indicates that the driver is distracted or not attentive to a driving task, then the event triggering module 682 will generate a control signal 682.

In some embodiments, the control signal 684 from event triggering module 682 may be transmitted to a warning generator that is configured to provide a warning for the driver. Alternatively, or additionally, the control signal 684 from the event triggering module 682 may be transmitted to a vehicle control that is configured to control the vehicle (e.g., to automatically disengage the gas pedal operation, to apply brake, etc.).

In some embodiments, the threshold is variable based on the output from the driver monitoring module 678. For example, if the output from the driver monitoring module 678 indicates that the driver is not distracted and/or is attentive to a driving task, then the event trigger module 682 may generate the control signal 684 to operate the warning generator and/or to operate the vehicle control in response to the TTC meeting or being below a first threshold (e.g., 3 seconds). On the other hand, if the output from the driver monitoring module 678 indicates that the driver is distracted or is not attentive to a driving task, then the event trigger module 682 may generate the control signal 684 to operate the warning generator and/or to operate the vehicle control in response to the TTC meeting or being below a second threshold (e.g., 5 seconds) that is higher than the first threshold.

Also, in some embodiments, the event trigger module 682 may be configured to apply different values of threshold for generating the control signal 684 based on the type of state of the driver indicated by the output of the driver monitoring module 678. For example, if the output of the driver monitoring module 678 indicates that the driver is looking at a cell phone, then the event trigger module 682 may generate the control signal 684 to operate the warning generator and/or to operate the vehicle control in response to the TTC meeting or being below a threshold of 5 seconds. On the other hand, if the output of the driver monitoring module 678 indicates that the driver is drowsy, then the event trigger module 682 may generate the control signal 684 to operate the warning generator and/or to operate the vehicle control in response to the TTC meeting or being below a threshold of 8 seconds (e.g., longer than the threshold for the case in which the driver is using a cell phone). In some cases, a longer time threshold (for comparison with the TTC value) may be needed to alert the driver and/or to control the vehicle because certain state of the driver (such as the driver being sleepy or drowsy) may take longer for the driver to react to an imminent collision. Accordingly, the event triggering module 682 will alert the driver and/or may operate the vehicle control earlier in response to a predicted collision in these circumstances.

In some embodiments, the TTC unit 680 is configured to determine a TTC value for a predicted collision, and then keep track of the passage of time with respect to the TTC value. For example, if the TTC unit 680 determines that the TTC for a predicted collision is 10 seconds, then the TTC unit 680 may perform a countdown of time for the 10 seconds. As the TTC unit 680 is doing the countdown, the TTC unit 680 periodically outputs the TTC to let the event triggering module 682 know the current TTC value. Thus, the TTC outputted by the TTC unit 680 at different respective times for the predicted collision will have different respective values based on the countdown. In other embodiments, the TTC unit 680 is configured to repeatedly determine the TTC values for the predicted collision based on images from the first camera 202. In such cases, the TTC outputted by the TTC unit 680 at different respective times for the predicted collision will have different respective values computed by the TTC unit 680 based on the images from the first camera 202.

Also, in some embodiments, the collision predictor 675 may continue to monitor the other vehicle and/or the state of the subject vehicle after a collision has been predicted. For example, if the other vehicle has moved out of the path of the subject vehicle, and/or if the distance between the two vehicles is increasing (e.g., because the other vehicle has accelerated, and/or the subject vehicle has decelerated), then the collision predictor 675 may provide an output indicating that there is no longer any risk of collision. In some embodiments, the TTC unit 680 may output a signal indicating to the event triggering module 682 that it does not need to generate the control signal 684. In other embodiments, the TTC unit 680 may output a predetermined arbitrary TTC value that is very high (e.g., 2000 seconds), or a TTC having a negative value, so that when the event triggering module 682 processes the TTC value, it won't result in a generation of the control signal 684.

Embodiments of the collision predictor 675 (example of collision predictor 218) and embodiments of the event triggering module 682 (example of the signal generation controller 224) will be described further below.

The contextual event module 686 is configured to provide a contextual alert 688 based on output provided by the driver monitoring module 678. For example, if the output of the driver monitoring module 678 indicates that the driver has been distracted for a duration that exceeds a duration threshold, or in a frequency that exceeds a frequency threshold, then the contextual event module 686 may generate an alert to warn the driver. Alternatively or additionally, the contextual event module 686 may generate a message to inform a fleet manager, insurance company, etc. In other embodiments, the contextual event module 686 is optional, and the processing architecture 670 may not include the contextual event module 686.

In other embodiments, item 672 may be a human detector, and the processing architecture 670 may be configured to predict collision with humans, and to generate a control signal based on the predicted collision and the state of the driver outputted by the driver monitoring module 678, as similarly described herein.

In further embodiments, item 672 may be an object detector configured to detect object(s) associated with an intersection, and the processing architecture 670 may be configured to predict intersection violation, and to generate a control signal based on the predicted intersection violation and the state of the driver outputted by the driver monitoring module 678, as similarly described herein.

In still further embodiments, item 672 may be an object detector configured to detect multiple classes of objects, such as vehicles, humans, and objects associated with an intersection, etc. In such cases, the processing architecture 670 may be configured to predict vehicle collision, predict human collision, predict intersection violation, etc., and to generate a control signal based on any one of these predicted events, and based on the state of the driver outputted by the driver monitoring module 678, as similarly described herein.

Figure 14:
FIG. 14 illustrates examples of object detection in accordance with some embodiments.

FIG. 14 illustrates examples of object detection in accordance with some embodiments. As shown in the figure, the objects being detected are vehicles captured in the images provided by the first camera 202. The detection of the objects may be performed by the object detector 216. In the illustrated example, the identified vehicles are provided respective identifiers (e.g., in the form of bounding boxes to indicate the spatial extents of the respective identified vehicle). It should be noted that the object detector 216 is not limited to providing identifiers that are rectangular bounding boxes for the identified vehicles, and that the object detector 216 may be configured to provide other forms of identifiers for the respective identified vehicles. In some embodiments, the object detector 216 may distinguish vehicle(s) that are leading vehicle(s) from other vehicle(s) that are not leading vehicle(s).

Figure 15A:
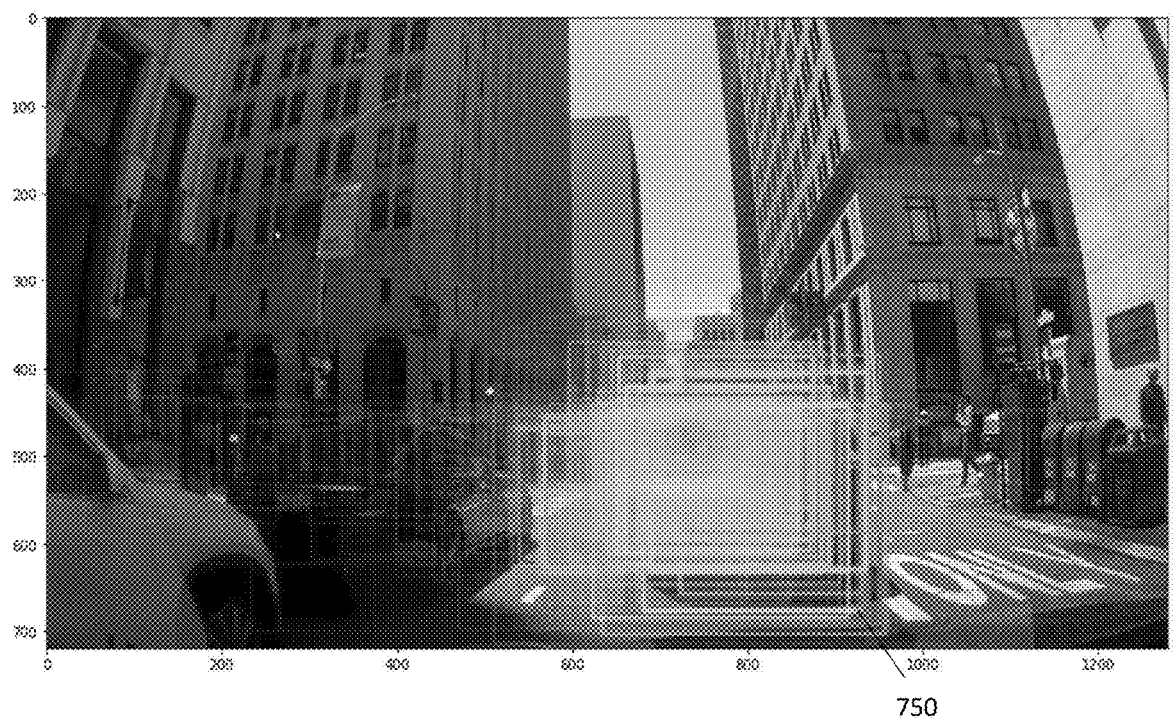
FIG. 15A illustrates another example of object identifiers, particularly showing each object identifier being a box representing a leading vehicle.

Also, in some embodiments, the processing unit 210 may keep track of identified leading vehicles, and may determine a region of interest based on a spatial distribution of such identified leading vehicles. For example, as shown in FIG. 15A, the processing unit 210 may use the identifiers 750 (in the form of bounding boxes in the example) of leading vehicles that were identified over a period (e.g., the previous 5 seconds, the previous 10 seconds, the previous 1 minute, the previous 2 minutes, etc.), and form a region of interest based on the spatial distribution of the identifiers 750. In the illustrated embodiments, the region of interest has a certain dimension, and location with respect to the camera image frame (wherein the location is towards the bottom of the image frame, and is approximately centered horizontally).

Figure 15B:
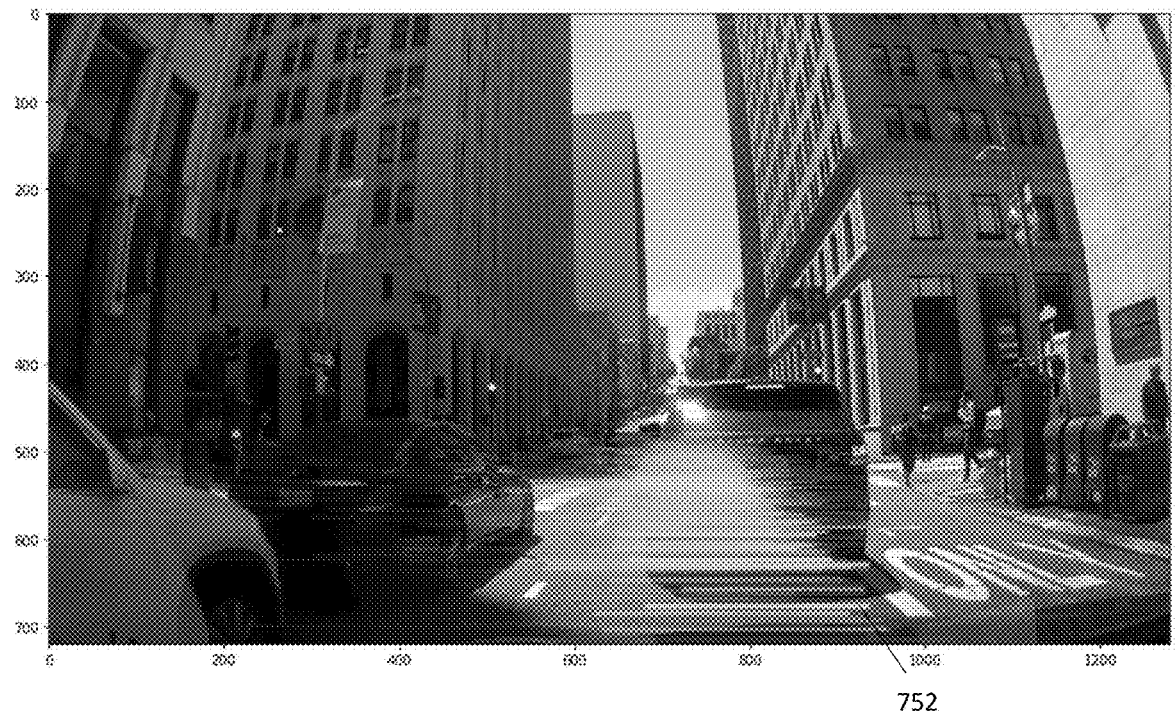
FIG. 15B illustrates another example of object identifiers, particularly showing each object identifier being a horizontal line.
Figure 15C:
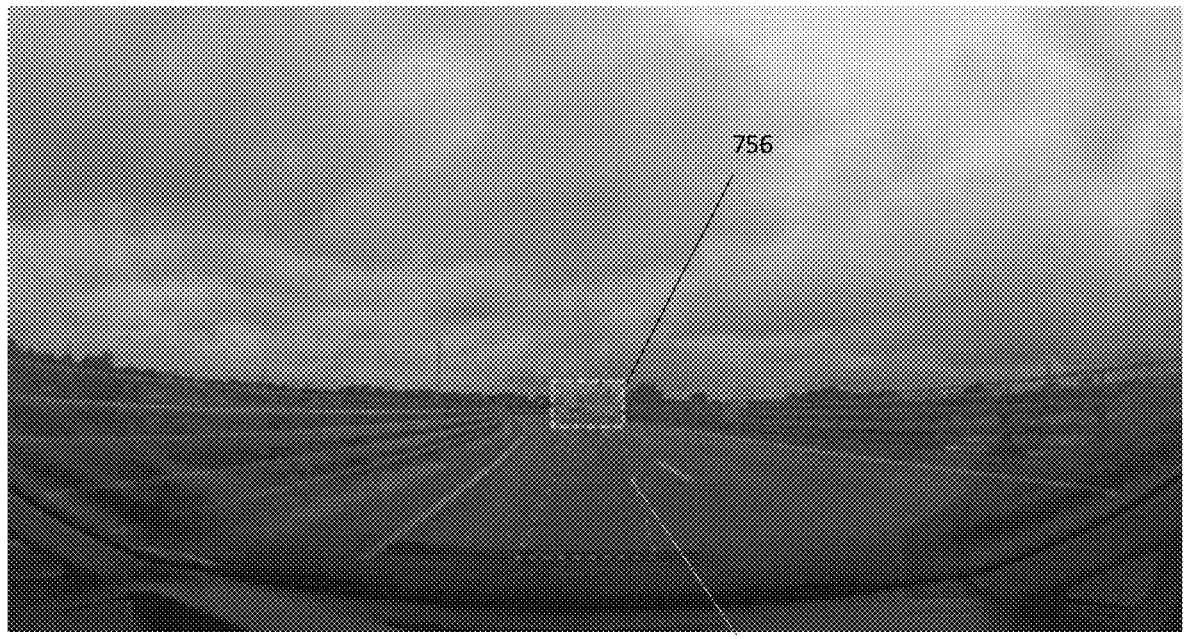
FIG. 15C illustrates an example of lead vehicle detection in accordance with some embodiments.

In some embodiments, instead of using the bounding boxes, the processing unit 2 may utilize horizontal lines 752 to form the region of interest (FIG. 15B). In the illustrated example, each horizontal line 752 represents an identified leading vehicle that has been identified over a period. The horizontal line 752 may be considered as an example of identifier of an identified leading vehicle. In some cases, the horizontal lines 752 may be obtained by extracting only the bottom sides of the bounding boxes (e.g., such as the ones 750 shown in FIG. 15A). As shown in FIG. 15B, the distribution of the horizontal lines 752 form a region of interest (represented by the area filled in by the horizontal lines 752) having an approximate triangular shape or trapezoidal shape. The processing unit 210 may utilize such region of interest as a detection zone to detect future leading vehicles. For example, as shown in FIG. 15C, the processing unit 210 may use the identifiers (e.g., lines 752) of the identified leading vehicles to form the region of interest 754, which has a triangular shape in the example. The region of interest 754 may then be utilized by the object detector 216 to identify leading vehicles. In the example shown in the figure, the object detector 216 detects a vehicle 756. Because at least a part of the detected vehicle 756 is located in the region of interest 754, the object detector 216 may determine that the identified vehicle is a leading vehicle.

In some embodiments, the region of interest 754 may be determined by a calibration module in the processing unit 210 during a calibration process. Also, in some embodiments, the region of interest 754 may be updated periodically during use of the apparatus 200. It should be noted that the region of interest 754 for detecting leading vehicles is not limited to the example described, and that the region of interest 754 may have other configurations (e.g., size, shape, location, etc.) in other embodiments. Also, in other embodiments, the region of interest 754 may be determined using other techniques. For example, in other embodiments, the region of interest 754 for detecting leading vehicles may be pre-determined (e.g., programmed during manufacturing) without using the distribution of previously detected leading vehicles.

Figure 15D:
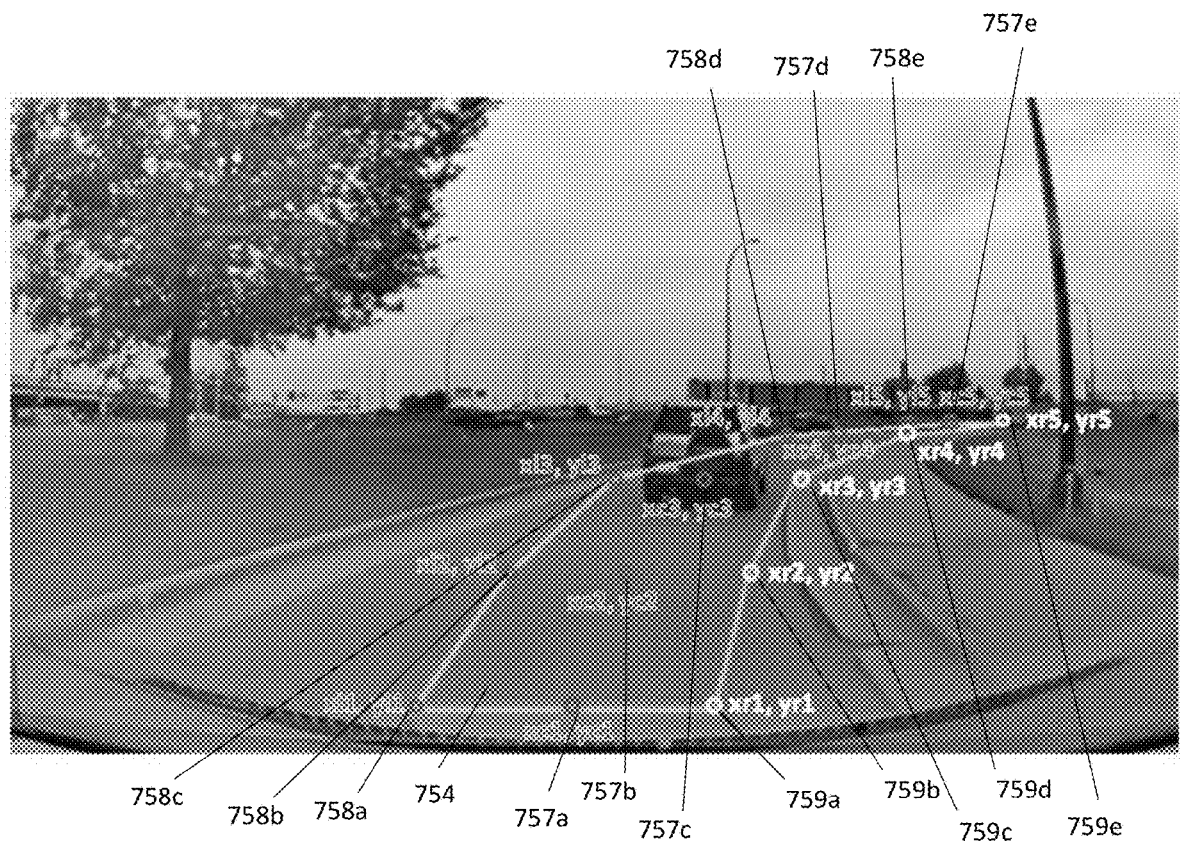
FIG. 15D illustrates a technique of determining a region of interest based on centerline detection.

In the above example, the region of interest 754 has a triangular shape that may be determined during a calibration process. In other embodiments, the region of interest 754 may have other shapes, and may be determined based on a detection of a centerline of a lane. For example, in other embodiments, the processing unit 210 may include a centerline detection module configured to determine a centerline of a lane or road in which the subject vehicle is traveling. In some embodiments, the centerline detection module may be configured to determine the centerline by processing images from the first camera 202. In one implementation, the centerline detection module analyzes images from the first camera 202 to determine the centerline of the lane or road based on a model. The model may be a neural network model that has been trained to determine centerline based on images of various road conditions. Alternatively, the model may be any of other types of model, such as a mathematical model, an equation, etc. FIG. 15D illustrates an example of the centerline detection module having determined a centerline, and an example of a region of interest that is based on the detected centerline. As shown in the figure, the centerline detection module determines a set of points 757a-757e that represent a centerline of the lane or road in which the subject vehicle is traveling. Although five points 757a-757e are shown, in other examples, the centerline detection module may determine more than five points 757 or fewer than five points 757 representing the centerline. Also, as shown in the figure, based on the points 757a-757e, the processing unit 210 may determine a set of left points 758a-758e, and a set of right points 759a-759e. The processing unit 210 may also determine a first set of lines connecting the left points 758a-758e, and a second set of lines connecting the right points 759a-759e. As shown in the figure, the first set of lines form a left boundary of a region of interest 754, and the second set of lines form a right boundary of the region of interest 754.

In the illustrated example, the processing unit 210 is configured to determine the left point 758a as having the same y-coordinate as the centerline point 757a, and a x-coordinate that is a distance d1 to the left of the x-coordinate of the centerline point 757a. Also, the processing unit 210 is configured to determine the right point 759a as having the same y-coordinate as the centerline point 757a, and a x-coordinate that is a distance d1 to the right of the x-coordinate of the centerline point 757a. Thus, the left point 758a, the center line point 757a, and the right point 759a are horizontally aligned. Similarly, the processing unit 210 is configured to determine the left points 758b-758e as having the same respective y-coordinates as the respective centerline points 757b-757e, and having respective x-coordinates that are at respective distances d2-d5 to the left of the respective x-coordinates of the centerline points 757b-757e. The processing unit 210 is also configured to determine the right points 759b-759e as having the same respective y-coordinates as the respective centerline points 757b-757e, and having respective x-coordinates that are at respective distances d2-d5 to the right of the respective x-coordinates of the centerline points 757b-757e.

In the illustrated example, d1>d2>d3>d4>d5, which results in the region of interest 754 having a tapering shape that corresponds with the shape of the road as it appears in the camera images. As the first camera 202 repeatedly provides camera images capturing the road while the vehicle is traveling, the processing unit 210 repeatedly determines the centerline and the left and right boundaries of the region of interest 754 based on the centerline. Thus, the region of interest 754 has a tapering shape that is variable (e.g., the curvature of the tapering of the region of interest 754 is variable) in correspondence with a changing shape of the road as it appears in the camera images. In other words, because the centerline is determined based on the shape of the road, and because the shape of the region of interest 754 is based on the determined centerline, the shape of the region of interest 754 is variable in correspondence with the shape of the road in which the vehicle is traveling.

Figure 15E:
FIG. 15E illustrates an advantage of using the region of interest of FIG. 15D for detecting object that is at risk of collision.

FIG. 15E illustrates an advantage of using the region of interest 754 of FIG. 15D in the detection of object that presents a risk of collision. In particular, the right side of the figure shows the region of interest 754 that is determined based on centerline of the road or lane in which the subject vehicle is traveling, as described with reference to FIG. 15D. The left side of the figure shows another region of interest 754 that is determined based on camera calibration like that described with reference to FIGS. 15A-15C, and has a shape that is independent of the centerline (e.g., curvature of the centerline) of the road/lane. Because the region of interest 754 on the left side is not dependent on the curvature of the road/lane, the shape of the region of interest 754 does not necessarily correspond with the shape of the road/lane. Accordingly, in the illustrated example, the processing unit 210 may incorrectly detect a pedestrian as a possible risk of collision because it intersects the region of interest 754. In another similar situation, the region of interest 754 in the left diagram may incorrectly detect a parked vehicle that is outside the subject lane as an object that presents a risk of collision. In some embodiments, the processing unit 210 may be configured to perform additional processing to address the issue of false positive (e.g., falsely detecting an object as a risk of collision). On the other hand, the region of interest 754 on the right side is advantageous because it does not have the above issue of false positive.

It should be noted that other techniques may be employed in other embodiments to determine a region of interest 754 having a shape that is variable in correspondence with a shape of the road. For example, in other embodiments, the processing unit 210 may include a road or lane boundary module configured to identify left and right boundaries of the lane or road in which the subject vehicle is traveling. The processing unit 210 may also determine one or more lines to fit the left boundary, and one or more lines to fit the right boundary, and may determine the region of interest 754 based on the determined lines.

In some embodiments, the processing unit 210 may be configured to determine both (1) a first region of interest (such as the triangular region of interest 754 described with reference to FIGS. 15A-15C), and (2) a second region of interest like the region of interest 754 described with reference to FIG. 15D. The first region of interest may be used by the processing unit 210 for cropping camera images. For example, certain parts of a camera image that are away from the first region of interest, or that are at certain distance away from the first region of interest may be cropped to reduce an amount of image data that will need to be processed. The second region of interest may be used by the processing unit 210 for determining whether a detected object poses a risk of collision. For example, if a detected object or if a bounding box of a detected object overlaps with the second region of interest, then the processing unit 210 may determine that there is a risk of collision with the detected object. In some embodiments, the first region of interest may also be used by the processing unit 210 to detect leading vehicles in camera images. The widths of the detected vehicles and their corresponding positions with respect to the coordinate system of the images may be used by the processing unit 210 to determine y-to-distance mapping, which will be described in further detail below with reference to FIG. 20.

In some embodiments, the collision predictor 218 may be configured to determine whether the region of interest 754 (e.g., the polygon created based on the centerline) intersects with a bounding box of a detected object, such as a lead vehicle, a pedestrian, etc. If so, then the collision predictor 218 may determine that there is a risk of collision, and the object corresponding to the bounding box is considered eligible for TTC computation.

Figure 16:
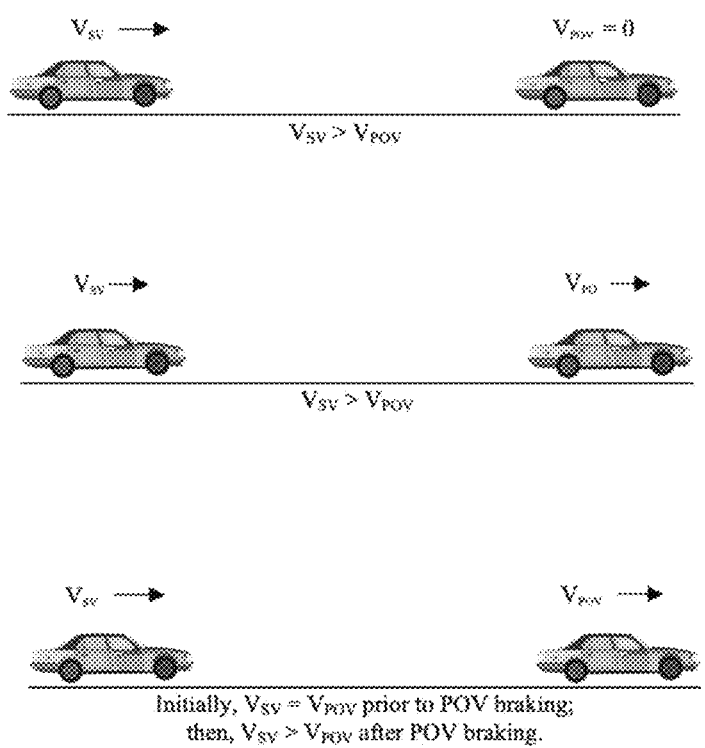
FIG. 16 illustrates three exemplary scenarios involving collision with lead vehicle.

In some embodiments, the collision predictor 218 may be configured to predict collision with leading vehicles in at least three different scenarios. FIG. 16 illustrates three exemplary scenarios involving collision with lead vehicle. In the top diagram (first scenario), the subject vehicle (the left vehicle) is traveling at non-zero speed Vsv, and the leading vehicle (the right vehicle) has come to a complete stop, thus having speed Vpov=0. In the middle diagram (second scenario), the subject vehicle (the left vehicle) is traveling at non-zero speed Vsv, and the leading vehicle (the right vehicle) is traveling at non-zero speed Vpov that is less than speed Vsv. In the bottom diagram (third scenario), the subject vehicle (the left vehicle) was initially traveling at non-zero speed Vsv, and the leading vehicle (the right vehicle) was also initially traveling at non-zero speed Vpov=Vsv. The leading vehicle then brakes, and the speed Vpov is reduced such that the speed Vsv of the subject vehicle is now greater than the speed Vpov of the leading vehicle. In some embodiments, the collision predictor 218 is configured to predict collisions between the subject vehicle and the leading vehicle that may occur in any of the three scenarios shown in FIG. 16. In one implementation, the collision predictor 218 may analyze a sequence of images from the first camera 202 to determine a relative speed between the subject vehicle and the leading vehicle. In another implementation, the collision predictor 218 may obtain sensor information indicating the relative speed between the subject vehicle and the leading vehicle. For example, the collision predictor 218 may obtain a sequence of sensor information indicating distances between the subject vehicle and the leading vehicle over a period. By analyzing the change in distance over the period, the collision predictor 218 may determine the relative speed between the subject vehicle and the leading vehicle. Also, in some embodiments, the collision predictor 218 may obtain a speed of the subject vehicle, such as from a speed sensor of the subject vehicle, from a GPS system, or from a separate speed sensor that is different from that of the subject vehicle.

In some embodiments, the collision predictor 218 may be configured to predict a collision between the subject vehicle and the leading vehicle based on the relative speed between the subject vehicle and the leading vehicle, the speed of the subject vehicle, the speed of the leading vehicle, or any combination of the foregoing. For example, in some cases, the collision predictor 218 may determine that there is a risk of collision if (1) the object detector 216 detects a leading vehicle, (2) the relative speed between the leading vehicle and the subject vehicle is non-zero, and (3) the distance between the leading vehicle and the subject vehicle is decreasing. In some cases, criteria (2) and (3) may be combined to indicate whether the subject vehicle is traveling faster than the leading vehicle or not. In such cases, the collision predictor 218 may determine that there is a risk of collision if (1) the object detector 216 detects a leading vehicle, and (2) the subject vehicle is traveling faster than the leading vehicle (such that the subject vehicle is moving towards the leading vehicle).

In some embodiments, the collision predictor 218 may obtain other information for use to determine whether there is a risk of collision. By means of non-limiting examples, the collision predictor 218 may obtain information (e.g., camera images, detected light, etc.) indicating that the leading vehicle is braking, operation parameters (such as information indicating the acceleration, deceleration, turning, etc.) of the subject vehicle, operation parameters (such as information indicating the acceleration, deceleration, turning, etc.) of the leading vehicle, or any combination of the foregoing.

In some embodiments, the collision predictor 218 is configured to predict the collision at least 3 seconds or more before an expected occurrence time for the predicted collision. For example, the collision predictor 218 may be configured to predict the collision at least: 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, etc., before the expected occurrence time for the predicted collision. Also, in some embodiments, the collision predictor 218 is configured to predict the collision with sufficient lead time for a brain of the driver to process input and for the driver to perform an action to mitigate the risk of the collision. In some embodiments, the sufficient lead time may be dependent on the state of the driver, as determined by the driver monitoring module 211.

Figure 17:
FIG. 17 illustrates another example of object detection in which the object(s) being detected is human.

It should be noted that the object detector 216 may be configured to detect human in some embodiments. In such cases, the collision predictor 218 may be configured to predict a collision with a human. FIG. 17 illustrates another example of object detection in which the object(s) being detected is human. As shown in the figure, the objects being detected are humans captured in the images provided by the first camera 202. The detection of the objects may be performed by the object detector 216. In the illustrated example, the identified humans are provided respective identifiers (e.g., in the form of bounding boxes 760 to indicate the spatial extents of the respective identified vehicle). It should be noted that the object detector 216 is not limited to providing identifiers that are rectangular bounding boxes 760 for the identified humans, and that the object detector 216 may be configured to provide other forms of identifiers for the respective identified humans. In some embodiments, the object detector 216 may distinguish human(s) that are in front of the subject vehicle (e.g., in the path of the vehicle) from other human(s) that is not in the path of the subject vehicle. In some embodiments, the same region of interest 754 described previously for detecting leading vehicles may be utilized by the object detector 216 to detect human that is in the path of the subject vehicle.

In some embodiments, the collision predictor 218 may be configured to determine a direction of movement of a detected human by analyzing a sequence of images of the human provided by the first camera 202. The collision predictor 218 may also be configured to determine a speed of movement (e.g., how fast the human is walking or running) of the detected human by analyzing the sequence of images of the human. The collision predictor 218 may also be configured to determine whether there is a risk of collision with a human based on a traveling path of the subject vehicle and also based on a movement direction of the detected human. Such feature may be desirable to prevent collision with a human who is not in the path of the vehicle, but may be located at a sidewalk moving towards the path of the subject vehicle.

In some embodiments, the collision predictor 218 is configured to determine an area next to the detected human indicating a possible position of the human in some future time (e.g., next 0.5 second, next 1 second, next 2 seconds, next 3 seconds, etc.) based on the speed and direction of movement of the detected human. The collision predictor 218 may then determine whether the subject vehicle will traverse the determined area (e.g., in a box) indicating the predicted position of the human based on the speed of the subject vehicle. In one implementation, the collision predictor 218 may determine whether the determined area intersects the region of interest 754. If so, then the collision predictor 218 may determine that there is a risk of collision with the human, and may generate an output indicating the predicted collision.

Figure 18:
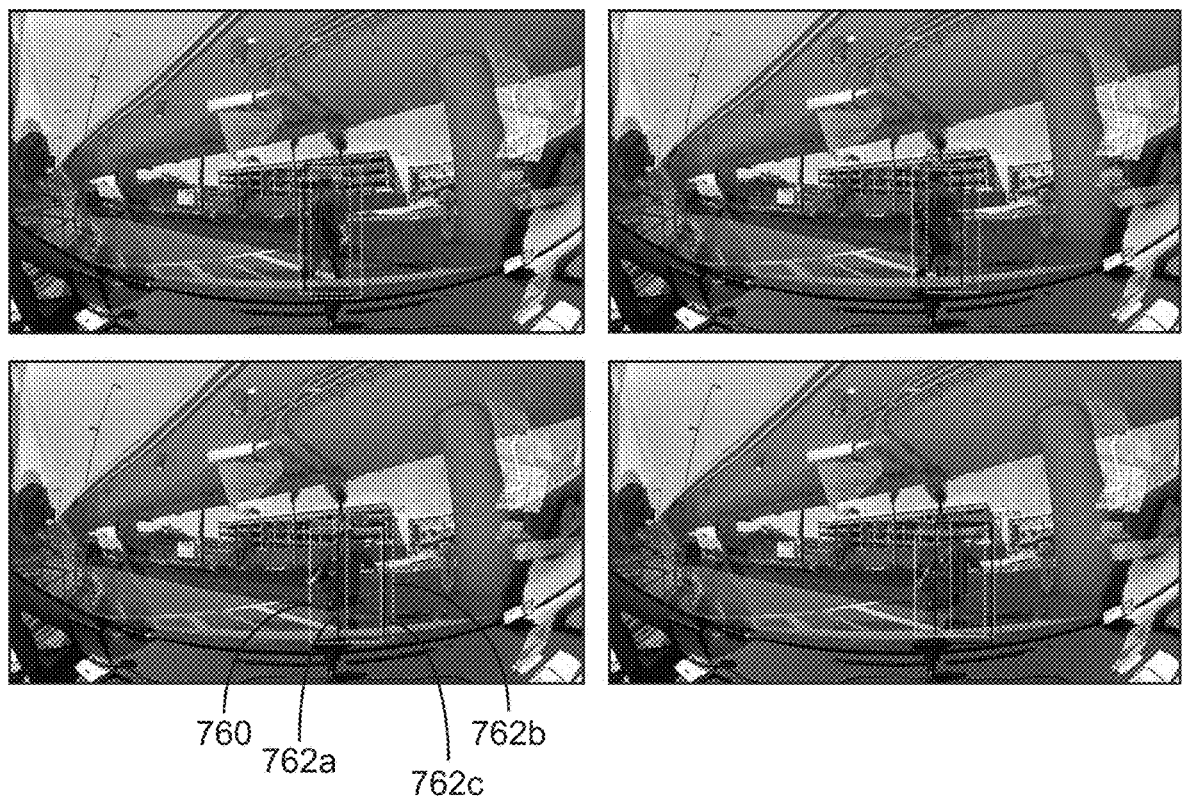
FIG. 18 illustrates examples of human movement prediction.

FIG. 18 illustrates examples of predicted positions of a human based on the human's walking speed and direction. Because human movement is somewhat less predictable in nature, in some embodiments, even if a detected human is standing (e.g., a pedestrian standing next to a roadway), the collision predictor 218 may determine an area with respect to the human indicating possible positions of the human (e.g., in case the human starts walking or running). For example, the collision predictor 218 may determine the bounding box 760 (e.g., a rectangular box) surrounding the detected human, and may then increase the dimension(s) of the bounding box 760 to account for uncertainty in the future predicted positions of the human, wherein the enlarged box defines an area indicating the predicted positions of the human. The collision predictor 218 may then determine whether the subject vehicle will traverse the determined area indicating the predicted positions of the human. In one implementation, the collision predictor 218 may determine whether the determined area of the enlarged box intersects the region of interest 754. If so, then the collision predictor 218 may determine that there is a risk of collision with the human, and may generate an output indicating the predicted collision.

In some embodiments, the collision predictor 218 may be configured to predict collision with humans in at least three different scenarios. In the first scenario, the detected human (or the bounding box 760 surrounding the detected human) intersects the region of interest 754, indicating that the human is already in the traveling path of the subject vehicle. In the second scenario, the detected human is not in the traveling path of the subject vehicle, and is standing next to the traffic roadway. In such cases, the collision predictor 218 may use the area of an enlarged bounding box of the detected human to determine whether there is a risk of collision, as described above. If the enlarged bounding box intersects the region of interest 754 (for detecting collision), then the collision predictor 218 may determine that there is a risk of collision with the standing human. In the third scenario, the detected human is moving and the image of the human (or its bounding box 760) does not intersect with the region of interest 754 (for detecting collision). In such cases, the collision predictor 218 may use area of predicted positions of the human to determine whether there is a risk of collision, as described above. If the area of predicted positions intersects the region of interest 754, then the collision predictor 218 may determine that there is a risk of collision with the human.

In some embodiments, the enlarged bounding box may have a dimension that is based on the dimension of the detected object plus an additional length, wherein the length is predetermined to account for uncertainty of movement of the object. In other embodiments, the enlarged bounding box may be determined based on prediction of the object location. As shown in FIG. 18, a detected object may have an initial bounding box 760. Based on the positions of the object in the images from the first camera 202, the processing unit 210 may predict the location of the moving object. As shown in the figure, a box 762a may be determined by the processing unit 210 that represents possible locations for the object at 0.3 sec in the future from now. The processing unit 210 may also determine box 762b representing possible locations for the object at 0.7 sec in the future from now, and box 762c representing possible locations for the object at 1 sec in the future from now. In some embodiments, the collision predictor 218 may continue to predict the future positions of a detected object (e.g., human) at certain future time, and determine if the path of the subject vehicle will intersect any of these positions. If so, then the collision predictor 218 may determine that there is a risk of collision with the object.

In some embodiments, the region of interest 754 may be enlarged in response to the driver monitoring module 211 detecting the driver being distracted. For example, the region of interest 754 may be widened in response to the driver monitoring module 211 detecting the driver being distracted. This has the benefit of considering objects that are outside the road or lane as possible risks of collision. For example, if the driver is distracted, the processing unit 210 then widens the region of interest 754. This has the effect of relaxing the threshold for detecting overlapping of a detected object with the region of interest 754. If a bicyclist is driving on the edge of the lane, the processing unit 210 may detect the bicyclist as a possible risk of collision because it may overlap the enlarged region of interest 754. On the other hand, if the driver is attentive (e.g., not distracted), region of interest 754 will be smaller, and the bicyclist may not intersect the region of interest 754. Accordingly, in this scenario, the processing unit 210 may not consider the bicyclist as presenting a risk of collision, which makes sense because an attentive driver is likely going to avoid a collision with the bicyclist.

In some embodiments, to reduce computational demand, the collision predictor 218 may not determine risk of collision for all of the detected humans in an image. For example, in some embodiments, the collision predictor 218 may exclude detected humans who are inside vehicles, humans who are standing at bus stops, humans who are sitting outside, etc. In other embodiments, the collision predictor 218 may consider all detected humans for collision prediction.

In some embodiments, the object detector 216 may utilize one or more models to detect various objects, such as cars (as illustrated in the figure), motorcycles, pedestrian, animals, lane dividers, street signs, traffic signs, traffic lights, etc. In some embodiments, the model(s) utilized by the object detector 216 may be a neural network model that has been trained to identify various objects. In other embodiments, the model(s) may be any of other types of models, such as mathematical model(s), configured to identify objects. The model(s) utilized by the object detector 216 may be stored in the non-transitory medium 230, and/or may be incorporated as a part of the object detector 216.

Intersection Violation Prediction

Figure 19A:
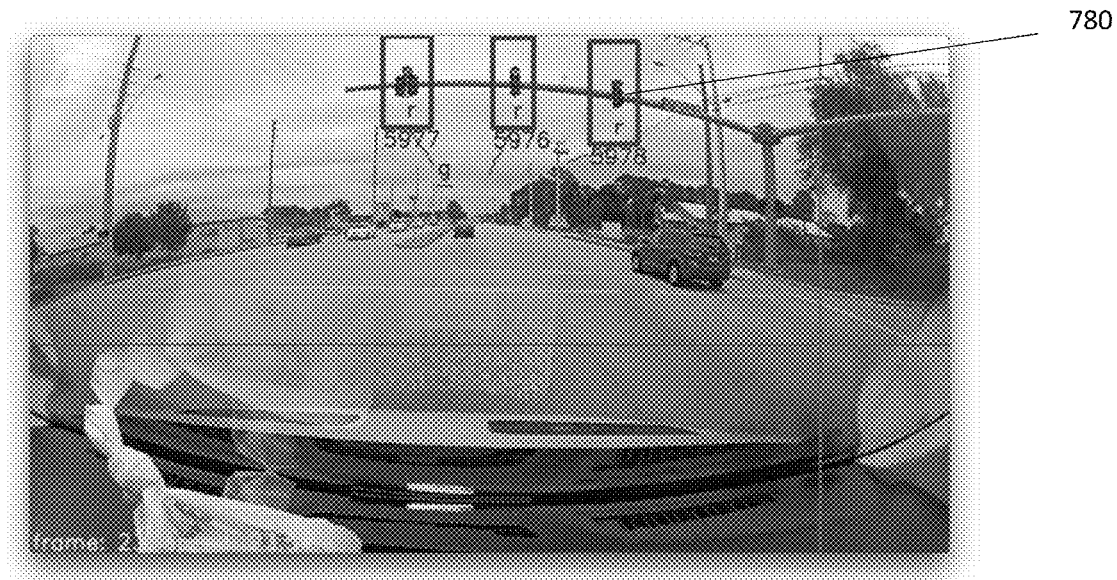
FIGS. 19A-19B illustrate other examples of object detection in which the objects being detected are associated with an intersection.
Figure 19B:
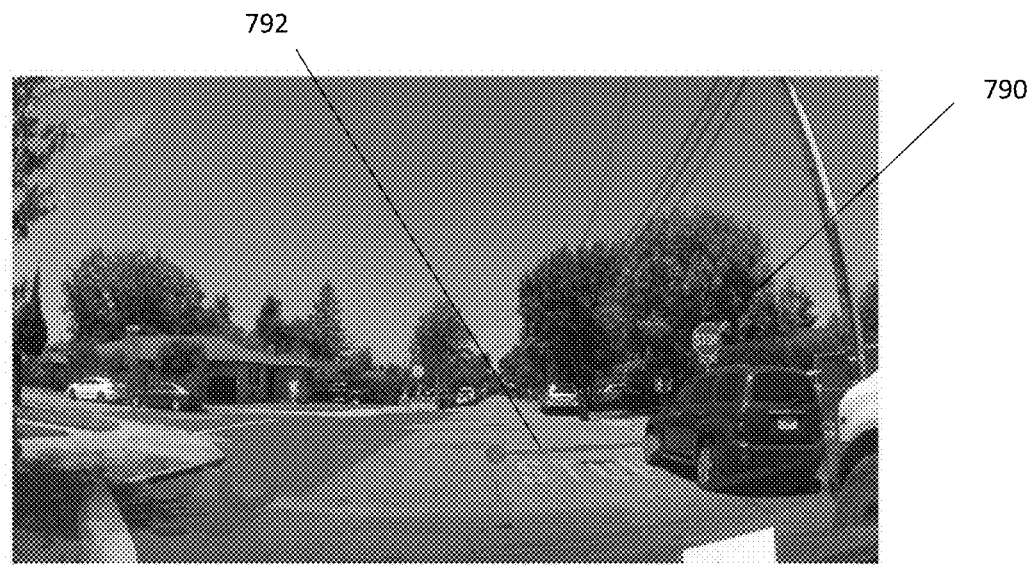

FIGS. 19A-19B illustrate other examples of object detection in which the objects being detected by the object detector 216 are associated with an intersection. As shown in FIG. 19A, the object detector 216 may be configured to detect traffic lights 780. As shown in FIG. 19B, the object detector 216 may be configured to detect stop sign 790. The object detector 216 may also be configured to detect other items associated with an intersection, such as a road marking, a corner of a curb, a ramp, etc.

In some embodiments, the intersection violation predictor 222 is configured to detect an intersection based on the detected object(s) 216 detected by the object detector 216. In some cases, the object detector 216 may detect a stop line at an intersection indicating an expected stop location of the subject vehicle. The intersection violation predictor 222 may determine a TTC (time-to-crossing) based on the location of the stop line and the speed of the subject vehicle. For example, the intersection violation predictor 222 may determine a distance d between the subject vehicle and the location of the stop line, and calculate the TTC based on the equation TTC=d/V, where V is the speed of the subject vehicle. Also, in some embodiments, as shown in FIG. 19B, the intersection violation predictor 222 may be configured to determine a line 792 corresponding with the detected stop line, and perform calculation to obtain the TTC based on the line 792. In some cases, if no stop line is detected by the object detector 216, the intersection violation predictor 222 may estimate a location of the expected stopping based on the detected objects at the intersection. For example, the intersection violation predictor 222 may estimate a location of the expected stopping based on known relative position between the expected stop location and surrounding objects, such as stop sign, traffic light, etc.

Figure 19C:
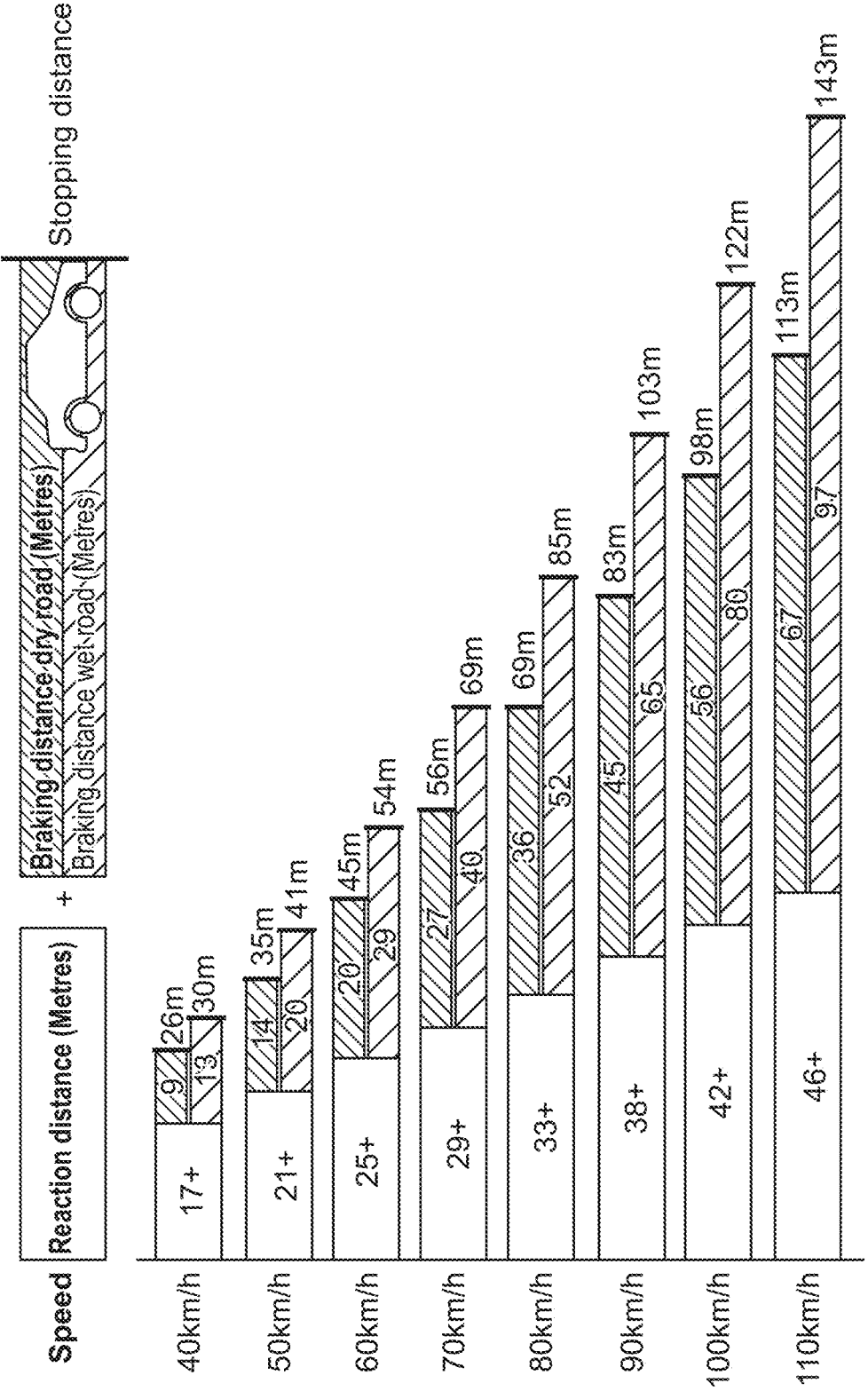
FIG. 19C illustrates a concept of braking distance.

In some embodiments, instead of determining the TTC, the intersection violation predictor 222 may be configured to determine time-to-brake (TTB) based on the location of the stop line and the speed of the subject vehicle. The TTB measures the time the driver has left at the current speed in order to initiate a breaking maneuver to safely stop at or before the required stopping location associated with the intersection. For example, the intersection violation predictor 222 may determine a distance d between the subject vehicle and the location of the stop line, and calculate the TTB based on the current speed of the subject vehicle. In some embodiments, the intersection violation predictor 222 may be configured to determine a braking distance BD indicating a distance required for a vehicle to come to a complete stop based on the speed of the vehicle, and to determine the TTB based on the braking distance. The braking distance is longer for a traveling vehicle with higher speed. The braking distance may also be based on road conditions in some embodiments. For example, for the same given speed of the vehicle, braking distance may be longer for wet road condition compared to dry road condition. FIG. 19C illustrates the different braking distances required for different vehicle speeds and different road conditions. For example, as shown in the figure, a vehicle traveling at 40 km/h will require 9 meters of braking distance in a dry road condition, and 13 meters of braking distance in a wet road condition. On the other hand, a vehicle traveling at 110 km/h will require 67 meters of braking distance in a dry road condition, and 97 meters of braking distance in a wet road condition. FIG. 19C also shows how much the vehicle would have travelled based on a driver's reaction time of 1.5 seconds. For example, for a vehicle traveling at 40 km/hr, it would travel 17 meters in about 1.5 seconds (driver's reaction time) before the driver applies the brake. Thus, the total distance it would take for a vehicle traveling at 40 km/hr to stop (and considering reaction time of the driver) will be 26 meters in dry road condition and 30 meters in wet road condition.

In some embodiments, the intersection violation predictor 222 may determine TTB based on the equation: TTB=(d−BD)/V, where V is the speed of the vehicle. Because d is the distance from the current vehicle position to the stop location (e.g., stop line), and BD is the braking distance, the term (d−BD) represents the remaining distance to be traveled by the subject vehicle, during which time the driver may react to the environment before applying brake for the vehicle. Thus, the term (d−BD)/V represents the time that the driver has to react to the environment before applying the brake for the vehicle. In some embodiments, if TTB=(d−BD)/V<=a threshold reaction time, then the intersection violation predictor 222 may generate a control signal to operate a device to provide a warning to the driver, and/or to operate a device to automatically control the vehicle, as described herein.

In some embodiments, the threshold reaction time may be 1 second or more, 1.5 seconds or more, 2 seconds or more, 2.5 seconds or more, 3 seconds or more, 4 seconds or more, etc.

Also, in some embodiments, the threshold reaction time may be variable based on a state of the driver as determined by the driver monitoring module 211. For example, in some embodiments, if the driver monitoring module 211 determines that the driver is distracted, then the processing unit 210 may increase the threshold reaction time (e.g., changing it from 2 seconds for non-distracted driver to 4 seconds for distracted driver, etc.). In addition, in some embodiments, the threshold reaction time may have different values for different states of the driver. For example, if the driver is alert and is distracted, the threshold reaction time may be 4 seconds, and if the driver is drowsy, the threshold reaction time may be 6 seconds.

In some embodiments, the intersection violation predictor 222 may be configured to determine the distance d between the subject vehicle and the stop location by analyzing image(s) from the first camera 202. Alternatively, or additionally, the intersection violation predictor 222 may receive information from a GPS system indicating a position of the subject vehicle, and a location of an intersection. In such cases, the intersection violation predictor 222 may determine the distance d based on the position of the subject vehicle and the location of the intersection.

In some embodiments, the intersection violation predictor 222 may determine the braking distance BD by looking up a table that maps different vehicle speeds to respective braking distances. In other embodiments, the intersection violation predictor 222 may determine the braking distance BD by performing a calculation based on a model (e.g., equation) that receives the speed of the vehicle as input, and outputs braking distance. Also, in some embodiments, the processing unit 210 may receive information indicating a road condition, and may determine the braking distance BD based on the road condition. For example, in some embodiments, the processing unit 210 may receive output from a moisture sensor indicating that there is rain. In such cases, the processing unit 210 may determine a higher value for the braking distance BD.

In some embodiments, instead of, or in addition to, determining TTB, the intersection violation predictor 222 may be configured to determine the braking distance BD based on the speed V of the subject vehicle (and optionally also based on road condition and/or vehicle dynamics), and may generate a control signal if the braking distance BD is less than the distance d to the intersection (e.g., a distance between the subject vehicle and the expected stop location associated with the intersection), or if d−BD<=distance threshold. The control signal may operate a device to generate a warning for the driver, and/or may operate a device to control the vehicle, as described herein. In some embodiments, the distance threshold may be adjusted based on a state of the driver. For example, if the driver monitoring module 211 determines that the driver is distracted, then the processing unit 210 may increase the distance threshold to account for the longer distance for the driver to react.

Distance Estimation

In one or more embodiments described herein, the processing unit 210 may be configured to determine a distance d that is between the subject vehicle and a location in front of the vehicle, wherein the location may be a location of an object (e.g., a lead vehicle, a pedestrian, etc.) as captured in an image from the first camera 202, an expected stop position for the vehicle, etc. Various techniques may be employed in different embodiments to determine the distance d.

Figure 20:
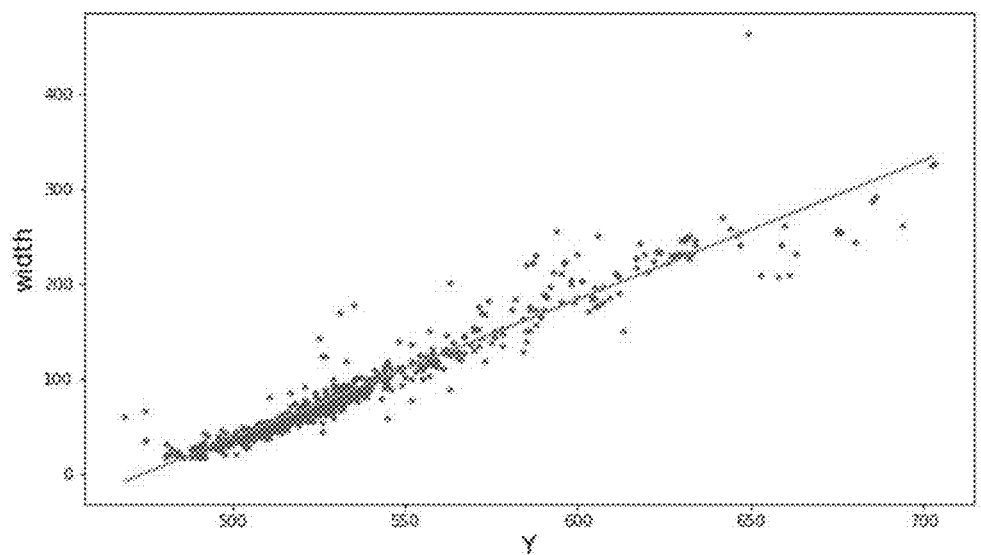
FIG. 20 illustrates a technique of determining a distance between the subject vehicle and a location in front of the vehicle.
Figure 20:
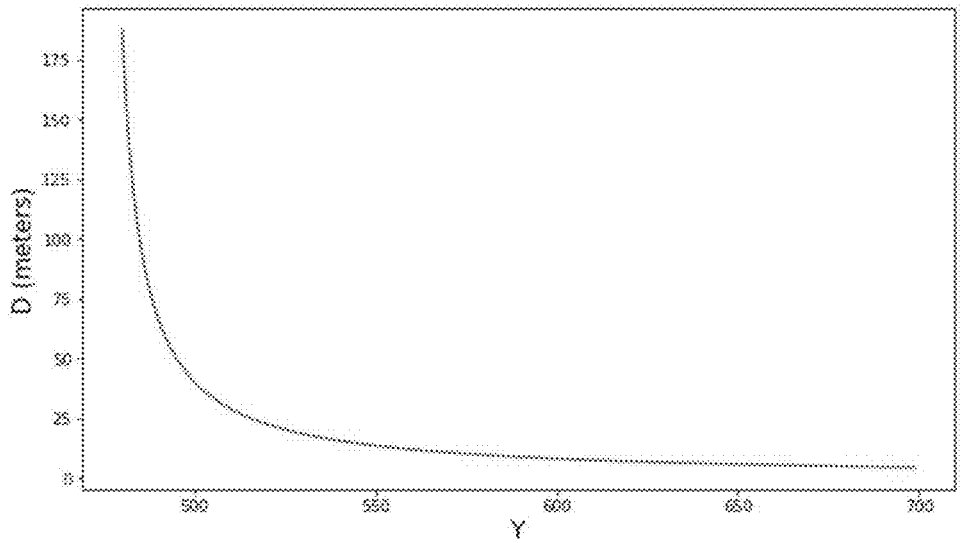

In some embodiments, the processing unit 210 may be configured to determine the distance d based on a Y-to-d mapping, wherein Y represents a y-coordinate in an image frame, and d represents the distance between the subject vehicle and the location corresponding to y-coordinate in the image frame. This concept is illustrated in the example of FIG. 20, which illustrates an example of a technique of determining a distance d between the subject vehicle and a location in front of the vehicle. In the top graph, different widths of bounding boxes of lead vehicles detected in camera images are plotted with respect to their respective y-coordinates (i.e., the y components of the respective locations of the bounding boxes of detected objects as they appear in the camera images), and a best-fit line can be determined to relate the y-coordinates and the respective widths of the bounding boxes. In the top graph, the y-coordinates are based on a coordinate system in which the origin y=0 is at a top of a camera image. In other embodiments, the y-coordinates may be based on other coordinate systems (e.g., a coordinate system in which the origin y=0 is at a bottom of the image, or in a middle of the image). In the illustrated example, the higher y-coordinate values correspond larger widths of the bounding boxes. This is because a vehicle detected closer to the camera will be larger (having larger corresponding bounding box) and will appear closer to a bottom of the camera image, compared to another vehicle that is further away from the camera. Also, in the illustrated example, the best-fit line in the top graph of FIG. 20 has a line equation with two parameters: B=−693.41 and m=1.46, where B is the value when y=0, and m is the slope of the best-fit line.

It should be noted that a width (or a horizontal dimension) in a coordinate system of a camera image is related to the real world distance d based on homography principles. Thus, the width parameter in the top graph of FIG. 20 may be converted into real world distance d based on perspective projection geometry in some embodiments. In some embodiments, the width-to-distance mapping may be obtained empirically by performing calculation based on the perspective projection geometry. In other embodiments, the width-to-distance mapping may be obtained by measuring actual distance d between the camera and an object at a location, and determining a width of the object in the coordinate system of a camera image that captures the object at the distance d from the camera. Also, in further embodiments, instead of determining the width-to-distance mapping, the y-to-d mapping may be determined by measuring actual distance d between the camera and a location L in the real world, and determining the y-coordinate of the location L in the coordinate system of a camera image.

Information in the lower graph of FIG. 20 can be used by the processing unit 210 to determine the distance d in some embodiments. For example, in some embodiments, the information relating the y-coordinate to the distance d may be stored in a non-transitory medium. The information may be an equation of the curve relating distances d to different y-coordinates, a table containing different y-coordinates and their corresponding distances d, etc. During use, the processing unit 210 may detect an object (e.g., a vehicle) in a camera image from the first camera 202. The image of the detected object as it appears in the camera image has a certain coordinate (x, y) with respect to a coordinate system of the camera image. For example, if the y-coordinate of the detected object has a value of 510, then based on the curve of FIG. 20, the distance of the detected object from the camera/subject vehicle is about 25 meters.

As another example, during use, the processing unit 210 may determine a location in the camera image representing a desired stopping position for the subject vehicle. The location in the camera image has a certain coordinate (x, y) with respect to a coordinate system of the camera image. For example, if the y-coordinate of the location (representing the desired position for the subject vehicle) has a value of 490, then based on the curve of FIG. 20, the distance d between the desired stopping position (e.g., actual intersection stop line, or an artificially created stop line) and the camera/subject vehicle is about 50 meters.

It should be noted that the technique for determining the distance d is not limited to the example described, and that the processing unit 210 may utilize other techniques for determining distance d. For example, in other embodiments, the processing unit 210 may receive distance information from a distance sensor, such as a sensor that utilizes time-of-flight technique for distance determination.

Alert Generation and/or Automatic Vehicle Control

As described herein, the signal generation control 224 is configured to generate a control signal for operating a warning generator and/or for causing a vehicle control to control the subject vehicle based on output from the collision predictor 218 or from the intersection violation predictor 222, and also based on output from the driver monitoring module 211 indicating a state of the driver. The output from the collision predictor 218 or the intersection violation predictor 222 may be a TTC value indicating a time-to-collision (with another vehicle or another object) or a time-to-crossing a detected intersection.

In some embodiments, the signal generation control 224 is configured to compare the TTC value (as it changes in correspondence with passage of time) with a threshold (threshold time), and determine whether to generate the control signal based on a result of the comparison. In some embodiments, the threshold utilized by the signal generation controller 224 of the processing unit 210 to determine whether to generate the control signal (in response to a predicted collision or predicted intersection violation) may have a minimum value that is at least 1 second, or 2 seconds, or 3 seconds, or 4 seconds, or 5 seconds, or 6 seconds, or 7 seconds, or 8 seconds or 9 seconds, or 10 seconds. The threshold is variable based on the state of the driver as indicated by the information provided by the driver monitoring module 211. For example, if the state of the driver indicates that the driver is distracted, then the processing unit 210 may adjust the threshold by increasing the threshold time from its minimum value (e.g., if the minimum value is 3 seconds, then the threshold may be adjusted to be 5 seconds). On the other hand, if the state of the driver indicates that the driver is drowsy, then the processing unit 210 may adjust the threshold so that it is 7 seconds (i.e., more than 5 seconds in the example), for example. This is because a driver who is in a drowsy state may take the driver longer to notice the collision risk or stopping requirement, and to take action to mitigate the risk of collision.

Figure 21:
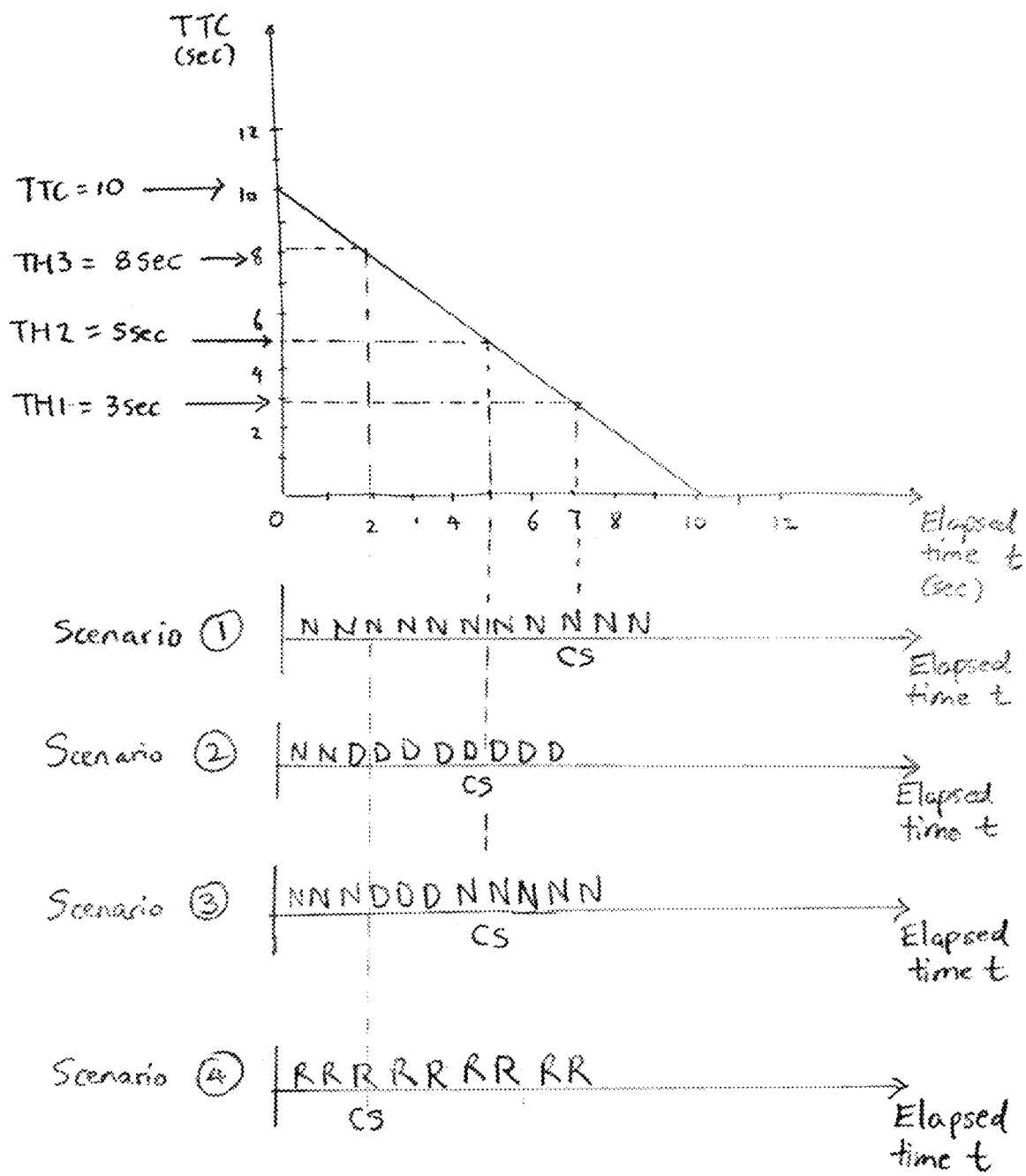
FIG. 21 illustrates an example of a technique for generating a control signal for controlling a vehicle and/or for causing a generation of an alert for a driver.

FIG. 21 illustrates an example of a technique for generating a control signal for controlling a vehicle and/or for causing a generation of an alert for a driver. In the example, the collision predictor 218 determines that the TTC is 10 seconds. The x-axis in the graph indicates elapsed time that has elapsed since the determination of the TTC. At time t=0, the initial TTC=10 seconds was determined by the collision predictor 218. As time elapses (represented by the x-axis), the TTC (represented by the y-axis) correspondingly decreases based on the relationship: TTC=10−t, where 10 is the initial determined time-to-collision TTC of 10 sec. As time passes, the TTC also reduces because the predicted collision is approaching temporally. In the illustrated example, the processing unit 210 utilizes a first threshold TH1 of 3 seconds for providing a control signal (to warn the driver and/or to automatically cause operate a vehicle control to mitigate the risk of collision) when the state of the driver as output by the driver monitoring module 211 indicates that the driver is not distracted. Also, in the illustrated example, the processing unit 210 utilizes a second threshold TH2 of 5 seconds for providing a control signal (to warn the driver and/or to automatically cause operate a vehicle control to mitigate the risk of collision) when the state of the driver as output by the driver monitoring module 211 indicates that the driver is distracted. In the illustrated example, the processing unit 210 utilizes a third threshold TH3 of 8 seconds for providing a control signal (to warn the driver and/or to automatically cause operate a vehicle control to mitigate the risk of collision) when the state of the driver as output by the driver monitoring module 211 indicates that the driver is drowsy.

As shown in FIG. 21, four different scenarios are being presented. In scenario 1, the output of the driver monitoring module 211 indicates that the driver is not-distracted (N) from t=0 to 7 seconds (corresponding to TTC of 3 seconds) and beyond. Accordingly, the signal generation controller 224 utilizes the first threshold TH1 (at TTC=3 sec, which corresponds to t=7 sec) as the time for providing the control signal CS (to operate a warning device and/or a vehicle control). In other words, when the TTC decreases from the initial 10 sec and reaches the 3 sec threshold, then the signal generation controller 224 provides the control signal CS.

In scenario 2, the output of the driver monitoring module 211 indicates that the driver is not-distracted (N) from t=0 to t=1.5 sec, and is distracted (D) from t=1.5 to 5 sec (corresponding to TTC of 5 seconds) and beyond. Accordingly, the signal generation controller 224 utilizes the second threshold TH2 (at TTC=5 sec, which corresponds to t=5 sec) as the time for providing the control signal CS (to operate a warning device and/or a vehicle control). In other words, when the TTC decreases from the initial 10 sec and reaches the 5 sec threshold, then the signal generation controller 224 provides the control signal CS. Therefore, in the situation in which the driver is distracted, the signal generation controller 224 will provide the control signal earlier to cause a warning to be provided to the driver and/or to operate the vehicle.

In scenario 3, the output of the driver monitoring module 211 indicates that the driver is not-distracted (N) from t=0 to t=2 sec, is distracted (D) from t=2 to 3.5 sec, and becomes not-distracted (N) again from t=3.5 to 5 sec and beyond. Although the state of the driver is not-distracted (N) when the second threshold TH2 is reached at t=5 sec, the signal generation controller 224 still uses the second threshold TH2 (for distracted state) because the state of the driver in this scenario changes from distracted state to not-distracted state only shortly before the threshold TH2 at t=5 sec. Thus, in some embodiments, the signal generation controller 224 may be configured to consider the state of the driver within a temporal window before the threshold (e.g., 1.5 sec, 2 sec, etc. before TH2) to determine whether to use the threshold for determining the generation of the control signal. In other embodiments, the signal generation controller 224 may be configured to consider the state of the driver at the time of the threshold to determine whether to use the threshold.

In scenario 4, the output of the driver monitoring module 211 indicates that the driver is drowsy (R) from t=0 to t=2 sec (corresponding to TTC of 8 seconds) and beyond. Accordingly, the signal generation controller 224 utilizes the third threshold TH3 (at TTC=8 sec, which corresponds to t=2 sec) as the time for providing the control signal CS (to operate a warning device and/or a vehicle control). In other words, when the TTC decreases from the initial 10 sec and reaches the 8 sec threshold, then the signal generation controller 224 provides the control signal CS. Therefore, in the situation in which the driver is drowsy, the signal generation controller 224 will provide the control signal even earlier (i.e., earlier than when the driver is alert but is distracted) to cause a warning to be provided to the driver and/or to operate the vehicle.

Thus, as shown in the above examples, in some embodiments, the threshold is variable in real time based on the state of the driver as determined by the driver monitoring module 211.

In any of the above scenarios, if the signal generation controller 224 receives sensor information (e.g., provided by sensor(s) 225) indicating that the driver is operating the vehicle to mitigate the risk of collision (such as applying brake), then the signal generation controller 224 may hold off in providing the control signal.

Although the example of FIG. 21 and the four scenarios are described with reference to collision prediction, they may also apply for intersection violation prediction. For intersection violation prediction, the TTC value will indicate time-to-crossing the intersection. In some embodiments, the same thresholds TH1, TH2, TH3 for determining when to provide control signal (to operate a warning generator and/or to operate a vehicle control) for collision prediction may also be used for intersection violation prediction. In other embodiments, the thresholds TH1, TH2, TH3 for determining when to provide control signal for collision prediction may be different for the thresholds TH1, TH2, TH3 for determining when to provide control signal for intersection violation prediction.

As illustrated in the above example, in some embodiments, the collision predictor 218 is configured to determine an estimated time it will take for the predicted collision to occur, and the signal generation controller 224 of the processing unit 210 is configured to provide the control signal to operate a device if the estimated time it will take for the predicted collision to occur is below a threshold. In some embodiments, the device comprises a warning generator, and the signal generation controller 224 of the processing unit 210 is configured to provide the control signal to cause the device to provide a warning for the driver if the estimated time it will take for the predicted collision to occur is below the threshold. Alternatively or additionally, the device may include a vehicle control, and the signal generation controller 224 of the processing unit 210 is configured to provide the control signal to cause the device to control the vehicle if the estimated time it will take for the predicted collision to occur is below the threshold.

Also, as illustrated in the above example, in some embodiments, the signal generation controller 224 of the processing unit 210 is configured to repeatedly evaluate the estimated time (TTC) with respect to the variable threshold, as the predicted collision/intersection violation is temporally approaching in correspondence with a decrease of the estimated time it will take for the predicted collision/intersection violation to occur.

Also, in some embodiments, the processing unit 210 (e.g., the signal generation controller 224 of the processing unit 210) is configured to increase the threshold if the state of the driver indicates that the driver is distracted or is not attentive to a driving task.

Also, as illustrated in the above example, in some embodiments, the signal generation controller 224 of the processing unit 210 is configured to at least temporarily hold off in providing the control signal if the estimated time it will take for the predicted collision to occur is higher than the threshold.

In some embodiments, the threshold has a first value if the state of the driver indicates that the driver is attentive to a driving task, and wherein the threshold has a second value higher than the first value if the state of the driver indicates that the driver is distracted or is not attentive to the driving task.

Also, as illustrated in the above example, in some embodiments, the threshold is also based on sensor information indicating that the vehicle is being operated to mitigate the risk of the collision. For example, if the sensor(s) 225 provides sensor information indicating that the driver is applying brake of the vehicle, then the processing unit 210 may increase the threshold to a higher value. In some embodiments, the signal generation controller 224 of the processing unit 210 is configured to determine whether to provide the control signal or not based on (1) the first information indicating the risk of collision with the vehicle, (2) the second information indicating the state of the driver, and (3) sensor information indicating that the vehicle is being operated to mitigate the risk of the collision.

In some embodiments, the processing unit 210 is configured to determine a level of the risk of the collision, and the processing unit 210 (e.g., the signal generation controller 224 of the processing unit 210) is configured to adjust the threshold based on the determined level of the risk of the collision.

In some embodiments, the state of the driver comprises a distracted state, and the processing unit 210 is configured to determine a level of a distracted state of the driver, wherein the processing unit 210 (e.g., the signal generation controller 224 of the processing unit 210) is configured to adjust the threshold based on the determined level of the distracted state of the driver.

Also, in some embodiments, different alerts may be provided at different thresholds, and based on whether the driver is attentive or not. For example, in some embodiments, the processing unit 210 may control a device to provide a first alert with a first characteristic if there is a risk of collision (with a vehicle, pedestrian, etc.) and if the driver is attentive, and may control the device to provide a second alert with a second characteristic if there is a risk of collision and if the driver is distracted. The first characteristic of the first alert may be a first alert volume, and the second characteristic of the second alert may be a second alert volume that is higher than the first alert volume. Also, in some embodiments, if the processing unit 210 determines that the risk of collision is higher, the processing unit 210 may control the device to provide a more intense alert (e.g., an alert with a higher volume, and/or with higher frequency of beeps). Thus, in some embodiments, a gentle alert may be provided when the subject vehicle is approaching an object, and a more intense alert may be provided when the subject vehicle is getting closer to the object.

Similarly, in some embodiments, the processing unit 210 may control a device to provide a first alert with a first characteristic if there is a risk of intersection violation and if the driver is attentive, and may control the device to provide a second alert with a second characteristic if there is a risk of intersection violation and if the driver is distracted. The first characteristic of the first alert may be a first alert volume, and the second characteristic of the second alert may be a second alert volume that is higher than the first alert volume. Also, in some embodiments, if the processing unit 210 determines that the risk of intersection violation is higher, the processing unit 210 may control the device to provide a more intense alert (e.g., an alert with a higher volume, and/or with higher frequency of beeps). Thus, in some embodiments, a gentle alert may be provided when the subject vehicle is approaching an intersection, and a more intense alert may be provided when the subject vehicle is getting closer to the intersection.

As illustrated in the above examples, the apparatus 200 is advantageous because it considers the state of the driver when determining whether to generate a control signal to operate a device to provide warning and/or to operate a device to control the vehicle. Because the state of the driver may be used to adjust monitoring threshold(s), the apparatus 200 may provide warning to the driver and/or may control the vehicle to mitigate a risk of collision and/or a risk of intersection violation earlier to account for certain state of the driver (e.g., when driver is distracted, drowsy, etc.). For example, in some embodiments, the apparatus 200 may provide warning to the driver and/or may control the vehicle as early as 2 seconds before the predicted risk, or even earlier, such as at least 3 seconds, 4 seconds, 5 seconds, 6 seconds, 7, seconds, 8 seconds, 9 seconds, 10 seconds, 11 seconds, 12 seconds, 13 seconds, 14 seconds, 15 seconds, etc., before the predicted risk (e.g., risk of collision or risk of intersection violation). Also, in previous monitoring systems that do not consider the driver's state, higher precision is built into the systems in order to avoid false positives at the expense of increased sensitivity. By incorporating the driver's state, the apparatus 200 may be configured to operate on lower sensitivity (e.g., lower than, or equal to, existing solutions), and the sensitivity of the apparatus 200 may be increased only if the driver is inattentive. The increase in sensitivity based on the state of the driver may be achieved by adjusting one or more thresholds based on the state of the driver, such as adjusting a threshold for determining time-to-collision, a threshold for determining time-to-crossing an intersection, a threshold for determining time-to-brake, a threshold for determining whether an object intersects a region of interest (e.g., a camera calibration ROI, a ROI determined based on centerline detection, etc.), a threshold on the confidence of object detection.

Tailgating

In some embodiments, the processing unit 210 may also be configured to consider the scenario in which the subject vehicle is tailgating. In some embodiments, tailgating may be determined (e.g., measured) by time-to-headway, which is defined as the distance to the lead vehicle divided by the speed of the subject vehicle (ego-vehicle). In some embodiments, the speed of the subject vehicle may be obtained from the speed sensing system of the vehicle. In other embodiments, the speed of the subject vehicle may be obtained from a GPS system. In further embodiments, the speed of the subject vehicle may be determined by the processing unit 210 processing external images received from the first camera 202 of the apparatus 200. Also, in some embodiments, the distance to the lead vehicle may be determined by the processing unit 210 processing external images received from the first camera 202. In other embodiments, the distance to the lead vehicle may be obtained from a distance sensor, such as a sensor employing time-of-flight technology.

In some embodiments, the processing unit 210 may determine that there is tailgating if the time-to-headway is less than a tailgate threshold. By means of non-limiting examples, the tailgate threshold may be 2 seconds or less, 1.5 seconds or less, 1 second or less, 0.8 second or less, 0.6 second or less, 0.5 second or less, etc.

In some embodiments, the processing unit 210 may be configured to determine that there is a risk of collision if the subject vehicle is tailgating, and if driver monitoring module 211 determines that the driver is distracted. The processing unit 210 may then generate a control signal to cause a device (e.g., a warning generator) to provide a warning for the driver, and/or to cause a device (e.g., a vehicle control) to control the vehicle, as described herein. For examples, the vehicle control may automatically apply the brake of the vehicle, automatically disengage the gas pedal, automatically activate hazard lights, or any combination of the foregoing.

Rolling Stop

In some embodiments, the processing unit 210 may include a rolling-stop module configured to detect a rolling stop maneuver. The rolling stop module may be implemented as a part of the intersection violation predictor 222 in some embodiments. During use, the processing unit 210 may detect an intersection that requires the vehicle to stop (e.g., the processing unit 210 may identify a stop sign, a red light, etc., based on processing of image(s) from the first camera 202). The rolling-stop module may monitor one or more parameters indicating operation of the vehicle to determine if the vehicle is making a rolling stop maneuver for the intersection. For example, the rolling-stop module may obtain a parameter indicating a speed of the vehicle, a braking of the vehicle, a deceleration of the vehicle, etc., or any combination of the foregoing. In some embodiments, the rolling-stop module may determine that there is a rolling-stop maneuver by analyzing the speed profile of the vehicle over a period as the vehicle is approaching the intersection. For example, if the vehicle has slowed down (indicating that the driver is aware of the intersection), and if the vehicle's speed does not further decrease within a certain period, then the rolling-stop module may determine that the driver is performing a rolling-stop maneuver. As another example, if the vehicle has slowed down (indicating that the driver is aware of the intersection), and if the vehicle's speed starts to increase as the vehicle is approaching closer to the intersection, then the rolling-stop module may determine that the driver is performing a rolling-stop maneuver.

In another technique, if the vehicle's speed has decreased as it is approaching an intersection, but if the vehicle's speed has not decreased enough to reach certain threshold within a certain distance from the required stop location, the rolling-stop maneuver may determine that the driver is performing a rolling-stop maneuver.

In some embodiments, if the rolling-stop module determines that the vehicle is not coming to a complete stop (e.g., because the driver may react to a stop sign or red light by slowing down, but does not come to a complete stop), the intersection violation predictor 222 may determine that there is a risk of intersection violation. In response to the determined risk of intersection violation, the rolling-stop module may then generate a control signal to operate a device. For example, the control signal may operate a communication device to send a message wirelessly to a server system (e.g., a cloud system). The server system may be utilized by a fleet management for coaching of the driver, or may be utilized by insurance company to identify risky driver. Alternatively or additionally, the control signal may operate a warning system to provide a warning to the driver, which may serve as a way of coaching the driver. Alternatively or additionally, the control signal may operate a braking system of the vehicle to control the vehicle so that it will come to a complete stop.

Methods

Figure 22A:
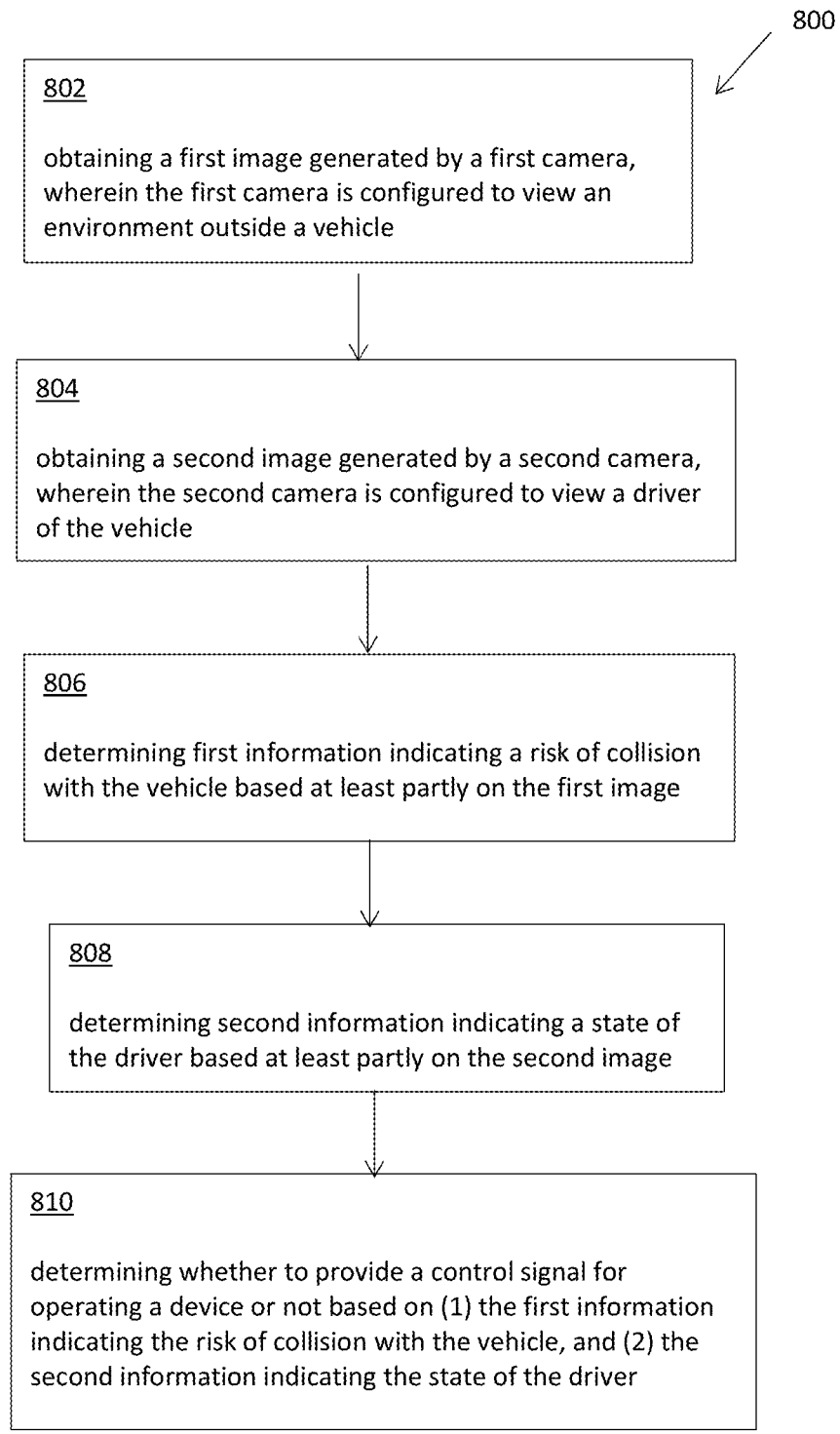
FIG. 22A illustrates a method that involves a prediction of collision in accordance with some embodiments.

FIG. 22A illustrates a method 800 performed by the apparatus 200 of FIG. 2A in accordance with some embodiments. The method 800 includes: obtaining a first image generated by a first camera, wherein the first camera is configured to view an environment outside a vehicle (item 802); obtaining a second image generated by a second camera, wherein the second camera is configured to view a driver of the vehicle (item 804); determining first information indicating a risk of collision with the vehicle based at least partly on the first image (item 806); determining second information indicating a state of the driver based at least partly on the second image (item 808); and determining whether to provide a control signal for operating a device or not based on (1) the first information indicating the risk of collision with the vehicle, and (2) the second information indicating the state of the driver (item 810).

Optionally, in the method 800, the first information is determined by predicting the collision, and wherein the collision is predicted at least 3 seconds or more before an expected occurrence time for the predicted collision.

Optionally, in the method 800, the first information is determined by predicting the collision, and wherein the collision is predicted with sufficient lead time for a brain of the driver to process input and for the driver to perform an action to mitigate the risk of the collision.

Optionally, in the method 800, the sufficient lead time is dependent on the state of the driver.

Optionally, in the method 800, the first information indicating the risk of collision comprises a predicted collision, wherein the method further comprises determining an estimated time it will take for the predicted collision to occur, and wherein the control signal is provided to cause the device to provide the control signal if the estimated time it will take for the predicted collision to occur is below a threshold.

Optionally, in the method 800, the device comprises a warning generator, and wherein the control signal is provided to cause the device to provide a warning for the driver if the estimated time it will take for the predicted collision to occur is below a threshold.

Optionally, in the method 800, the device comprises a vehicle control, and wherein the control signal is provided to cause the device to control the vehicle if the estimated time it will take for the predicted collision to occur is below the threshold.

Optionally, in the method 800, the threshold is variable based on the second information indicating the state of the driver.

Optionally, in the method 800, the estimated time is repeatedly evaluated with respect to the variable threshold, as the predicted collision is temporally approaching in correspondence with a decrease of the estimated time it will take for the predicted collision to occur.

Optionally, in the method 800, the threshold is variable in real time based on the state of the driver.

Optionally, the method 800 further includes increasing the threshold if the state of the driver indicates that the driver is distracted or is not attentive to a driving task.

Optionally, the method 800 further includes at least temporarily holding off in generating the control signal if the estimated time it will take for the predicted collision to occur is higher than the threshold.

Optionally, the method 800 further includes determining a level of the risk of the collision, and adjusting the threshold based on the determined level of the risk of the collision.

Optionally, in the method 800, the state of the driver comprises a distracted state, and wherein the method further comprises determining a level of a distracted state of the driver, and adjusting the threshold based on the determined level of the distracted state of the driver.

Optionally, in the method 800, the threshold has a first value if the state of the driver indicates that the driver is attentive to a driving task, and wherein the threshold has a second value higher than the first value if the state of the driver indicates that the driver is distracted or is not attentive to the driving task.

Optionally, in the method 800, the threshold is also based on sensor information indicating that the vehicle is being operated to mitigate the risk of the collision.

Optionally, in the method 800, the act of determining whether to provide the control signal for operating the device or not is performed also based on sensor information indicating that the vehicle is being operated to mitigate the risk of the collision.

Optionally, in the method 800, the act of determining the first information indicating the risk of the collision comprises processing the first image based on a first model.

Optionally, in the method 800, the first model comprises a neural network model.

Optionally, in the method 800, the act of determining the second information indicating the state of the driver comprises processing the second image based on a second model.

Optionally, the method 800 further includes determining metric values for multiple respective pose classifications, and determining whether the driver is engaged with a driving task or not based on one or more of the metric values.

Optionally, in the method 800, the pose classifications comprise two or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

Optionally, the method 800 further includes comparing the metric values with respective thresholds for the respective pose classifications.

Optionally, the method 800 further includes determining the driver as belonging to one of the pose classifications if the corresponding one of the metric values meets or surpasses the corresponding one of the thresholds.

Optionally, the method 800 is performed by an aftermarket device, and wherein the first camera and the second camera are integrated as parts of the aftermarket device.

Optionally, in the method 800, the second information is determined by processing the second image to determine whether an image of the driver meets a pose classification or not; and wherein the method further comprises determining whether the driver is engaged with a driving task or not based on the image of the driver meeting the pose classification or not.

Optionally, in the method 800, the act of determining the second information indicating the state of the driver comprises processing the second image based on a neural network model.

Figure 22B:
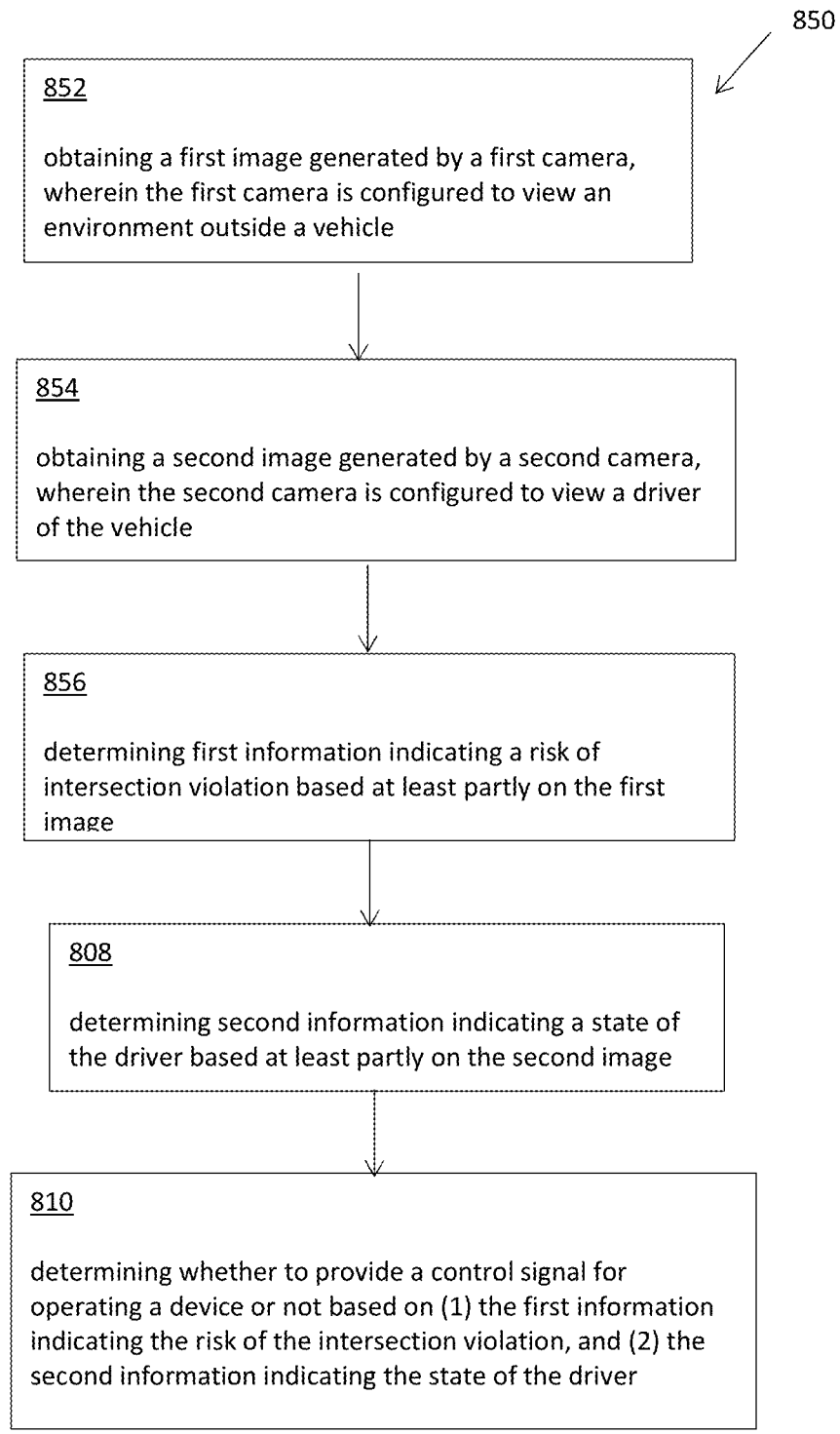
FIG. 22B illustrates a method that involves a prediction of intersection violation in accordance with some embodiments.

FIG. 22B illustrates a method 850 performed by the apparatus 200 of FIG. 2A in accordance with some embodiments. The method 850 includes: obtaining a first image generated by a first camera, wherein the first camera is configured to view an environment outside a vehicle (item 852); obtaining a second image generated by a second camera, wherein the second camera is configured to view a driver of the vehicle (item 854); determining first information indicating a risk of intersection violation based at least partly on the first image (item 856); determining second information indicating a state of the driver based at least partly on the second image (item 858); and determining whether to provide a control signal for operating a device or not based on (1) the first information indicating the risk of the intersection violation, and (2) the second information indicating the state of the driver (item 860).

Optionally, the first information is determined by predicting the intersection violation, and wherein the predicted intersection violation is predicted at least 3 seconds or more before an expected occurrence time for the predicted intersection violation.

Optionally, the first information is determined by predicting the intersection violation, and wherein the intersection violation is predicted with sufficient lead time for a brain of the driver to process input and for the driver to perform an action to mitigate the risk of the intersection violation.

Optionally, the sufficient lead time is dependent on the state of the driver.

Optionally, the first information indicating the risk of the intersection violation comprises a predicted intersection violation, wherein the method further comprises determining an estimated time it will take for the predicted intersection violation to occur, and wherein the control signal is provided to cause the device to provide the control signal if the estimated time it will take for the predicted intersection violation to occur is below a threshold.

Optionally, the device comprises a warning generator, and wherein the control signal is provided to cause the device to provide a warning for the driver if the estimated time it will take for the predicted intersection violation to occur is below a threshold.

Optionally, the device comprises a vehicle control, and wherein the control signal is provided to cause the device to control the vehicle if the estimated time it will take for the predicted intersection violation to occur is below the threshold.

Optionally, the threshold is variable based on the second information indicating the state of the driver.

Optionally, the estimated time is repeatedly evaluated with respect to the variable threshold, as the predicted intersection violation is temporally approaching in correspondence with a decrease of the estimated time it will take for the predicted intersection violation to occur.

Optionally, the threshold is variable in real time based on the state of the driver.

Optionally, the method further includes increasing the threshold if the state of the driver indicates that the driver is distracted or is not attentive to a driving task.

Optionally, the method further includes at least temporarily holding off in generating the control signal if the estimated time it will take for the predicted intersection violation to occur is higher than the threshold.

Optionally, the method further includes determining a level of the risk of the intersection violation, and adjusting the threshold based on the determined level of the risk of the intersection violation.

Optionally, the state of the driver comprises a distracted state, and wherein the method further comprises determining a level of a distracted state of the driver, and adjusting the threshold based on the determined level of the distracted state of the driver.

Optionally, the threshold has a first value if the state of the driver indicates that the driver is attentive to a driving task, and wherein the threshold has a second value higher than the first value if the state of the driver indicates that the driver is distracted or is not attentive to the driving task.

Optionally, the threshold is also based on sensor information indicating that the vehicle is being operated to mitigate the risk of the intersection violation.

Optionally, the act of determining whether to provide the control signal for operating the device or not is performed also based on sensor information indicating that the vehicle is being operated to mitigate the risk of the intersection violation.

Optionally, the act of determining the first information indicating the risk of the intersection violation comprises processing the first image based on a first model.

Optionally, the first model comprises a neural network model.

Optionally, the act of determining the second information indicating the state of the driver comprises processing the second image based on a second model.

Optionally, the method further includes determining metric values for multiple respective pose classifications, and determining whether the driver is engaged with a driving task or not based on one or more of the metric values.

Optionally, the pose classifications comprise two or more of: looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, and two-hands-on-wheel pose.

Optionally, the method further includes comparing the metric values with respective thresholds for the respective pose classifications.

Optionally, the method further includes determining the driver as belonging to one of the pose classifications if the corresponding one of the metric values meets or surpasses the corresponding one of the thresholds.

Optionally, the method is performed by an aftermarket device, and wherein the first camera and the second camera are integrated as parts of the aftermarket device.

Optionally, the second information is determined by processing the second image to determine whether an image of the driver meets a pose classification or not;

and wherein the method further comprises determining whether the driver is engaged with a driving task or not based on the image of the driver meeting the pose classification or not.

Optionally, the act of determining the second information indicating the state of the driver comprises processing the second image based on a neural network model.

Model Generation and Incorporation

Figure 23:
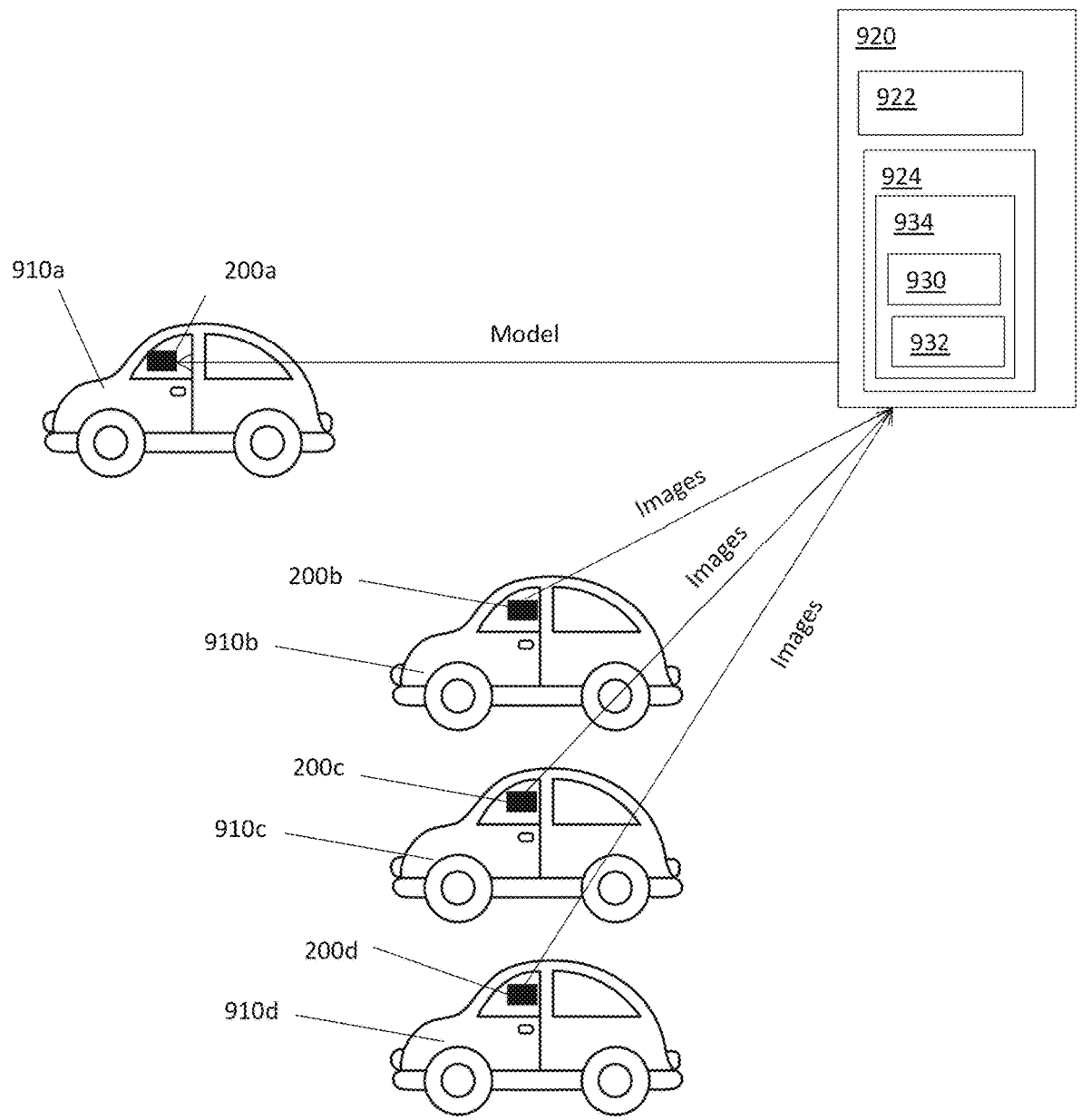
FIG. 23 illustrates a technique of determining a model for use by the apparatus of FIG. 2A in accordance with some embodiments.

FIG. 23 illustrates a technique of determining a model for use by the apparatus 200 in accordance with some embodiments. As shown in the figure, there may be multiple vehicles 910a-910d with respective apparatuses 200a-200d. Each of the apparatuses 200a-200d may have the configuration and features described with reference to the apparatus 200 of FIG. 2A. During use, cameras (both external viewing cameras and internal viewing cameras) of the apparatuses 200b-200d in the vehicles 910b-910d capture images of the environments outside the respective vehicles 910b-910d, and images of the respective drivers. The images are transmitted, directly or indirectly, to a server 920 via a network (e.g., a cloud, the Internet, etc.). The server 920 include a processing unit 922 configured to process the images from the apparatuses 200b-300d in the vehicles 910b-910d to determine a model 930, and one or more models 932. The model 930 may be configured to detect poses of drivers, and the model(s) 932 may be configured to detect different types of objects in camera images. The models 930, 932 may then be stored in a non-transitory medium 924 in the server 920. The server 920 may transmit the models 930, 932 directly or indirectly, to the apparatus 200a in the vehicle 910a via a network (e.g., a cloud, the Internet, etc.). The apparatus 200a can then use the model(s) 932 to process images received by the camera of the apparatus 200a to detect different poses of the driver of the vehicle 910a. Also, the apparatus 200a can then use the model(s) 932 to process images received by the camera of the apparatus 200a to detect different objects outside the vehicle 910a and/or to determine a region of interest for the camera of the apparatus 200a.

In the example shown in FIG. 23, there are three apparatuses 200b-200d in three respective vehicles 910b-910d for providing images. In other examples, there may be more than three apparatuses 200 in more than three respective vehicles 910 for providing images to the server 920, or there may be fewer than three apparatuses 200 in fewer than three vehicles 910 for providing images to the server 920.

In some embodiments, the model 930 provided by the server 920 may be a neural network model. The model(s) 932 provided by the server 920 may also be one or more neural network model(s). In such cases, the server 920 may be a neural network, or a part of a neural network, and the images from the apparatuses 200b-200d may be utilized by the server 920 to configure the model 930 and/or the model(s) 932. In particular, the processing unit 922 of the server 920 may configure the model 930 and/or the model(s) 932 by training the model 930 via machine learning. In some cases, the images from the different apparatuses 200b-200d form a rich data set from different cameras mounting at different positions with respect to the corresponding vehicles, which will be useful in training the model 930 and/or the model(s) 932. As used in this specification, the term "neural network" refers to any computing device, system, or module made up of a number of interconnected processing elements, which process information by their dynamic state response to input. In some embodiments, the neural network may have deep learning capability and/or artificial intelligence. In some embodiments, the neural network may be simply any computing element that can be trained using one or more data sets. By means of non-limiting examples, the neural network may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

In some embodiments, the processing unit 922 of the server 920 uses the images to configure (e.g., to train) the model 930 to identify certain poses of drivers. By means of non-limiting examples, the model 930 may be configured to identify whether a driver is looking-down pose, looking-up pose, looking-left pose, looking-right pose, cellphone-using pose, smoking pose, holding-object pose, hand(s)-not-on-the wheel pose, not-wearing-seatbelt pose, eye(s)-closed pose, looking-straight pose, one-hand-on-wheel pose, twohands-on-wheel pose, etc. Also, in some embodiments, the processing unit 922 of the server 920 may use the images to configure the model to determine whether a driver is engaged with a driving task or not. In some embodiments, the determination of whether a driver is engaged with a driving task or not may be accomplished by a processing unit processing pose classifications of the driver. In one implementation, pose classifications may be output provided by a neural network model. In such cases, the neural network model may be passed to a processing unit, which determines whether the driver is engaged with a driving task or not based on the pose classifications from the neural network model. In other embodiments, the processing unit receiving the pose classifications may be another (e.g., second) neural network model. In such cases, the first neural network model is configured to output pose classifications, and the second neural network model is configured to determine whether a driver is engaged with a driving task or not based on the pose classifications outputted by the first neural network model. In such cases, the model 930 may be considered as having both a first neural network model and a second neural network model. In further embodiments, the model 930 may be a single neural network model that is configured to receive images as input, and to provide an output indicating whether a driver is engaged with a driving task or not.

Also, in some embodiments, the processing unit 922 of the server 920 uses the images to configure (e.g., to train) the model(s) 932 to detect different objects. By means of non-limiting examples, the model(s) 932 may be configured to detect vehicles, humans, animals, bicycles, traffic lights, road signs, road markings, curb sides, centerlines of roadways, etc.

In other embodiments, the model 930 and/or the model(s) 932 may not be a neural network model, and may be any of other types of model. In such cases, the configuring of the model 930 and/or the model(s) 932 by the processing unit 922 may not involve any machine learning, and/or images from the apparatuses 200b-200d may not be needed. Instead, the configuring of the model 930 and/or the model(s) 932 by the processing unit 922 may be achieved by the processing unit 922 determining (e.g., obtaining, calculating, etc.) processing parameters (such as feature extraction parameters) for the model 930 and/or the model(s) 932. In some embodiments, the model 930 and/or the model(s) 932 may include program instructions, commands, scripts, parameters (e.g., feature extraction parameters), etc. In one implementation, the model 930 and/or the model(s) 932 may be in a form of an application that can be received wirelessly by the apparatus 200.

After the model 930 and model(s) 932 have been configured by the server 920, the models 930, 932 are then available for use by apparatuses 200 in different vehicles 910 to identify objects in camera images. As shown in the figure, the models 930, 932 may be transmitted from the server 920 to the apparatus 200a in the vehicle 910a. The models 930, 932 may also be transmitted from the server 920 to the apparatuses 200b-200d in the respective vehicles 910b-910d. After the apparatus 200a has received the models 930, 932, the processing unit in the apparatus 200a may then process images generated by the camera (internal viewing camera) of the apparatus 200a based on the model 930 to identify poses of drivers, and/or to determine whether drivers are engaged with a driving task or not, as described herein, and may process images generated by the camera (external viewing camera) of the apparatus 200a based on the model(s) 932 to detect objects outside the vehicle 910a.

In some embodiments, the transmission of the models 930, 932 from the server 920 to the apparatus 200 (e.g., the apparatus 200a) may be performed by the server 920 "pushing" the models 930, 932, so that the apparatus 200 is not required to request for the models 930, 932. In other embodiments, the transmission of the models 930, 932 from the server 920 may be performed by the server 920 in response to a signal generated and sent by the apparatus 200. For example, the apparatus 200 may generate and transmit a signal after the apparatus 200 is turned on, or after the vehicle with the apparatus 200 has been started. The signal may be received by the server 920, which then transmits the models 930, 932 for reception by the apparatus 200. As another example, the apparatus 200 may include a user interface, such as a button, which allows a user of the apparatus 200 to send a request for the models 930, 932. In such cases, when the button is pressed, the apparatus 200 then transmits a request for the models 930, 932 to the server 920. In response to the request, the server 920 then transmits the models 930, 932 to the apparatus 200.

It should be noted that the server 920 of FIG. 23 is not limiting to being one server device, and may be more than one server devices. Also, the processing unit 922 of the server 920 may include one or more processors, one or more processing modules, etc.

In other embodiments, the images obtained by the server 920 may not be generated by the apparatuses 200b-200d. Instead, the images used by the server 920 to determine (e.g., to train, to configure, etc.) the models 930, 932 may be recorded using other device(s), such as mobile phone(s), camera(s) in other vehicles, etc. Also, in other embodiments, the images used by the server 920 to determine (e.g., to train, to configure, etc.) the models 930, 932 may be downloaded to the server 920 from a database, such as from a database associated with the server 920, or a database owned by a third party.

Multi-Signal Predictive Model

Figure 24:
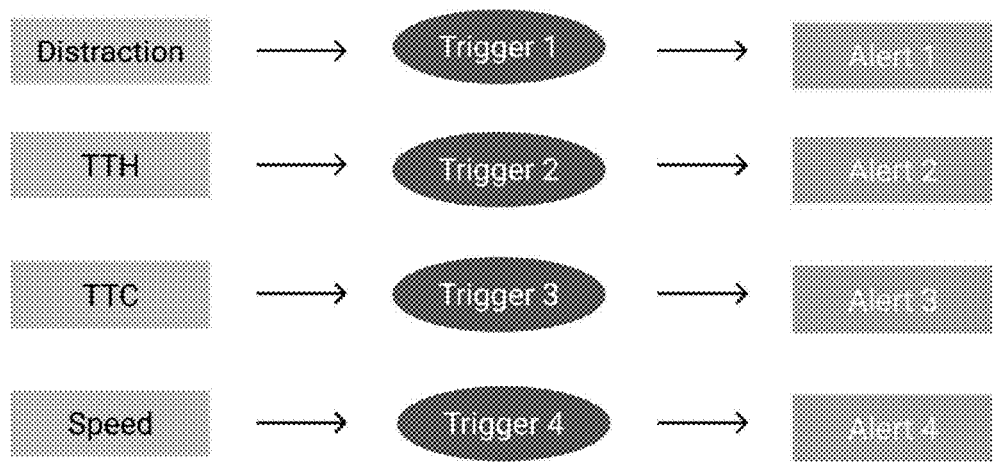
FIG. 24 illustrates one technique of processing risk factors.

In the above embodiments, the processing unit 210 has been described as being configured to determine various risk factors (e.g., risk of collision, risk of intersection violation, driver being in a distracted state, excessive speed, etc.) separately, and determine whether to generate a control signal for operating a device or not based on any of the individual risk factors meeting certain respective criterion. FIG. 24 illustrates an example of such technique, in which the various risk factors are evaluated with their respective triggers (e.g., respective criteria). In some cases, if a criterion is satisfied for one of the triggers, the processing unit 210 may generate a control signal to cause an alert to be generated. For example, as shown in the figure, if the distraction parameter determined by the processing unit 210 (e.g., by processing interior images of the driver) satisfies a distraction criterion, the processing unit 210 may then determine that the driver is distracted, and may generate a control signal to cause an alert to be generated. As another example, if the time-to-collision (TTC) parameter determined by the processing unit 210 satisfies a near-collision criterion, the processing unit 210 may then generate a control to cause an alert to be generated. In the above examples, the criterion may include a static threshold or a variable threshold, wherein the threshold may be user configurable (e.g., for high, medium, or low risk tolerance). In either case, when a risk parameter is determined as satisfying (e.g., crossing) the threshold, the processing unit 210 may then generate the control signal to cause the alert to be generated.

In the above-described technique of FIG. 24, the algorithms utilizing the various corresponding thresholds work in isolation, and they do not communicate with each other. For example, the algorithm that processes the distraction risk signals do not communicate with the algorithm that processes the time-to-collision risk signals. Also, the threshold utilized by each algorithm may not adapt to the instantaneous situation and context. Accordingly, combination of risks, relevancy of the risks, and context of the risks, are ignored. In addition, non-linearities are also ignored in the above technique of FIG. 24. Risk escalation in threshold models is linear until the threshold is reached. However, in reality, risk can escalate non-linearly (e.g. changing into a lane where the lead vehicle has started braking, or where an event is taking place further up the road). Also, in the above technique, the various risk factors are not considered in combination with driver's intent, driver's attention, cognitive load, and other factor(s) (e.g., other vehicle(s), anticipated reaction to environment, like overtaking maneuvers, traffic control signal changes, etc.).

In other embodiments, various risk factors may be processed together by the processing unit 210 to determine whether they collectively present a non-event (e.g., non-risky event) or not. This feature is advantageous because sometimes a single risk factor may indicate a risky situation (e.g., risk of collision), but when multiple risk factors are considered together, they may collectively indicate a non-risky situation, thereby reducing false positives for the system. In some cases, if only a single risk factor is utilized to trigger an alert, it may result in excessive false positive cases, causing unnecessary alerts to be generated. This is not desirable, as it may lead to drivers ignoring the alerts, and even turning off the on-board vehicle device to avoid the false positive alerts. The contrary is also true. In particular, sometimes a single risk factor may indicate a non-risky situation (e.g., the risk factor may not cross any threshold), but when multiple risk factors are considered together, they may collectively indicate a risky situation, thereby reducing false negatives for the system. In particular, risk factors individually may not cross any single threshold, but when combined and considered together in the fusion/holistic approach, they may collectively indicate a very risky situation.

Figure 25:
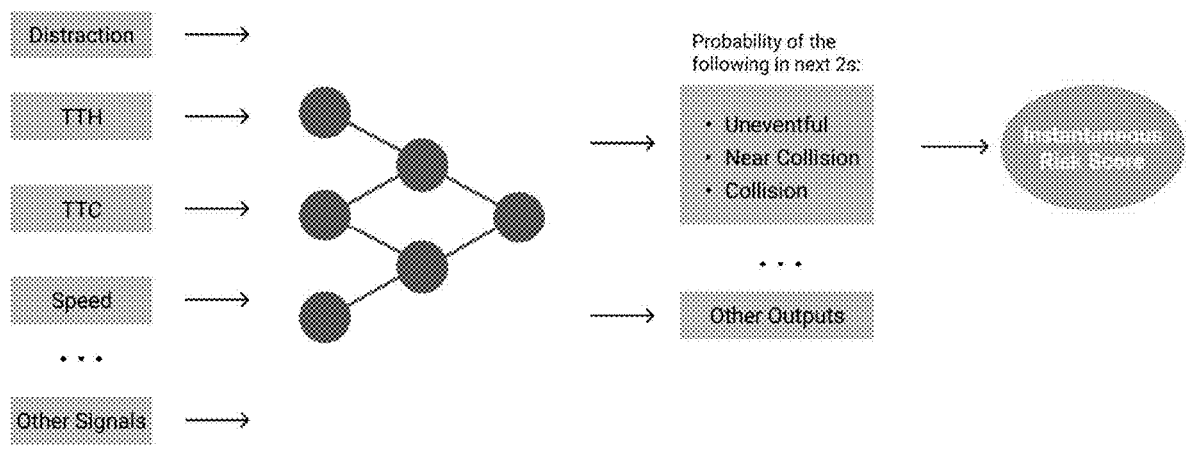
FIG. 25 illustrates another technique of processing risk factors.

FIG. 25 illustrates an example of such technique, in which the processing unit 210 is configured to process multiple risk factors together in order to determine whether they collectively present a non-event (non-risky event) or a risky event. In the illustrated example, the various risk factors (e.g., driver being in distracted state, time-to-intersection violation, time-to-collision, speed, etc.) are being fed as inputs to a model in the processing unit 210, which is configured to process two or more risk factors to determine they collectively indicate a risky situation or not. In the illustrated embodiments, the processing unit 210 is configured to determine a risk score (e.g., instantaneous risk score) based on probabilities of different respective states (predicted events), such as, probability of collision, probability of near-collision, probability of non-risky state, etc., or two or more of the foregoing. In the illustrated example, the model in the processing unit 210 determines the below three probabilities of predicted events based on the plurality of risk factors received by the model: probabilities of collision occurring within the next 2 seconds, probability of near-collision occurring within the next 2 seconds, and probability of non-risky state in the next 2 seconds. In other embodiments, the model may determine more or fewer than three probabilities of predicted events based on the plurality of risk factors. Also in other embodiments, the future duration for which the probabilities are determined may be longer than 2 seconds (e.g., within 3, 4, 5, 6, 7, 8, 9, 10 seconds, etc.) or shorter than 2 seconds (e.g., within 1.9, 1.8, 1.7, 1.6, 1.5, 1.4, 1.3, 1.2, 1.1, 1.0, 0.9, 0.8, 0.7, 0.6, 0.5 second, etc.).

Figure 26A:
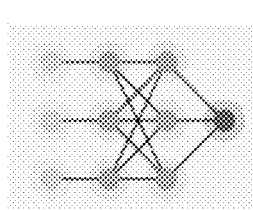
FIGS. 26A-26C illustrate examples of neural network architecture that may be employed to process multiple inputs.
Figure 26B:
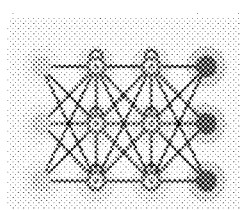
Figure 26C:
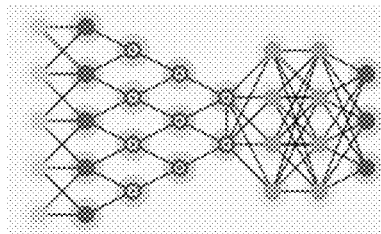

The model of the processing unit 210 may be a neural network model, which has been trained using prior risk factors. The neural network model may have any neural network architecture. FIGS. 26A-26C illustrate examples of neural network architecture that may be employed to process multiple risk factors as inputs by the neural network model. The neural network architecture may be, for examples, any shallow network (e.g., support-vector-machine (SVM), logistic regressor, etc.), an ensemble network (e.g., random forest), or any deep network (e.g., recurrent neural network, long-short-term memory network (LSTM), convolutional neural network (CNN)), etc. The neural network model may be any of the types of neural network described herein.

In some embodiments, the model may include sub-models that are implemented by respective processing units. In such cases, these processing units may be considered sub-processing units of the processing unit 210.

As discussed, the processing unit 210 may be a part of the apparatus 10 that includes the first camera 202 configured to view an environment outside a vehicle, and the second camera 204 configured to view a driver of the vehicle. The processing unit 210 is configured to receive a first image from the first camera, and a second image from the second camera. The processing unit 210 includes a model configured to receive a plurality of inputs, and generate a metric based on at least some of the inputs. The plurality of inputs comprises at least a first time series of information indicating a first risk factor, and a second time series of information indicating a second risk factor.

In some embodiments, the apparatus 200 may also include additional sensor(s) for sensing kinematic characteristic(s) associated with an operation of the vehicle. By means of non-limiting examples, the sensor(s) may include one or more sensors for sensing one or more of: acceleration, speed, centripetal force, steering angle, braking, accelerator position, turn signal, etc. In such cases, the processing unit 210 (e.g., the model therein) may be configured to receive inputs from the sensor(s), and may determine the risk score based on such inputs. In some embodiments, such inputs may be utilized by the model to determine the probabilities like those discussed with reference to FIG. 25. Also, in some embodiments, the processing unit 210 (e.g., the model therein) may be configured to receive CAN/OBD signals as inputs. In such cases, the processing unit 210 is connected to the vehicle, and may obtain signals regarding braking, pedal position, steering angle, speed, etc., from the vehicle communication system. Alternatively or additionally, the processing unit 210 may also be connected to the vehicle's on-board diagnostic system, and obtain signals from such system. Inputs from the CAN/OBD and/or vehicle's on-board diagnostic system may be utilized by the model in the processing unit 210 to determine the probabilities of various events like those discussed with reference to FIG. 25. In addition, in some embodiments, information received by the processing unit 210, and/or information output by the processing unit 210, may be transmitted via automotive Ethernet or any of other data transfer architectures (e.g., such as those that are capable of providing high bandwidth data transfer).

Figure 39:
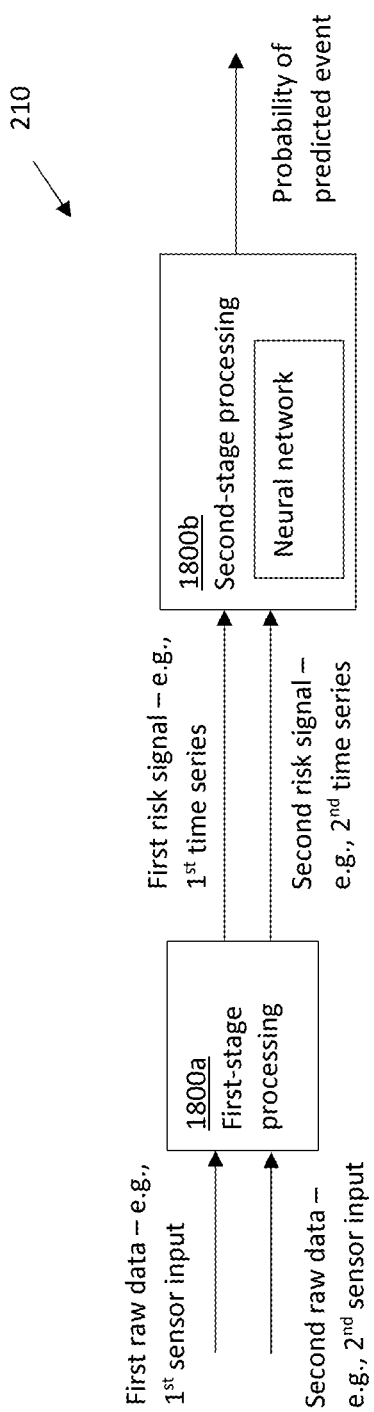
FIG. 39 illustrates a processing unit having a first-stage processing system and a second-stage processing system.

In a further implementation, the apparatus 200 may include multiple sensors that collect raw data (such as external video, internal video, speed, etc.) as inputs, and a processing unit that produces a high-level contextually-rich estimate of risk based on the collected raw data. The processing unit 210 may be a single stage processing unit (e.g., single-stage processor) or may include multiple-stage processing units (like that shown in FIG. 39). In the embodiment in which the processing unit 210 is implemented as a single stage processing unit, the single stage processing unit may include an end-to-end (E2E) deep-fusion risk model that obtains the raw data as inputs, and provides an estimate of risk based on the raw data. In the embodiment in which the processing unit 210 is implemented as multiple-stage processing units, the processing unit 210 may include at least (1) a first stage system 1800*a* that obtains raw data as inputs and provides risk signals as outputs, and (2) a second stage system 1800*b* that obtains the risk signals from the first stage system, and provides an estimated risk. In some embodiments, the first stage system is configured to obtain data (e.g., raw data) with higher dimension or complexity, and process the data to provide outputs (e.g., vector) with lower dimension or lower complexity. The outputs (risk signals) with lower dimension or lower complexity may then be input to the second stage system, which processes the outputs to determine probabilities of different events (predicted events) (e.g., collision event, near-collision event, non-risky event, etc.), and a risk score indicating an estimated risk based on the probabilities of different events. The outputs by the second stage system may have a lower dimension or lower complexity compared to the inputs (e.g., time series of risk signals) received by the second stage system. In some embodiments, the model described herein may be implemented by the second stage system 1800*b*. Because the estimated risk is based on the risk signals, the estimated risk may be considered as a "fused" risk that combines or incorporates the risk signals (corresponding with the respective risk factors).

In some embodiments, the first stage system may include multiple first-stage processing units. For example, in one implementation, the apparatus 200 may include multiple sensors that collect raw data (such as external video, internal video, speed, etc.), multiple first-stage processing units (e.g., first-stage processors) that provide individual risk signals based on the raw data, and a second-stage processing unit (e.g., a second-stage processor) that produces a high-level contextually-rich estimate of risk based on the individual risk signals. For example, there may be a first-stage processing unit that determines bounding boxes based on images or videos from the first camera 202. As another example, there may also be a first-stage processing unit that determines stop line distance based on images or videos from the first camera 202. As a further example, there may also be a first-stage processing unit that determines facial landmark(s) based on images or videos from the second camera 204. It should be noted that the second-stage processing unit is configured to provide the estimated risk based on output(s) from the first-stage processing unit(s), wherein the output(s) from the first-stage processing unit(s) may be considered as risk signals (e.g., meta data) for the respective risk factors that are different from the raw data obtained from the sensors.

In some embodiments, the first-stage processing unit(s) may be implemented by one or more first neural network model(s), and the second-stage processing unit(s) may be implemented by one or more second neural network model(s). In some embodiments, two or more of the inputs (e.g., risk factors) may be determined by the first neural network model implementing the first-stage processing unit(s), and may be fed to the second neural network model implementing the second-stage processing unit(s). The second neural network model considers the inputs together in order to determine whether the risk factors collectively pose a risky situation or a non-risky situation.

In some embodiments, the first-stage processing unit(s) and/or the second-stage processing unit may be considered to be a part of the processing unit 210. Also, in some embodiments, the second-stage processing unit may include multiple sub-processing units.

Figure 27:
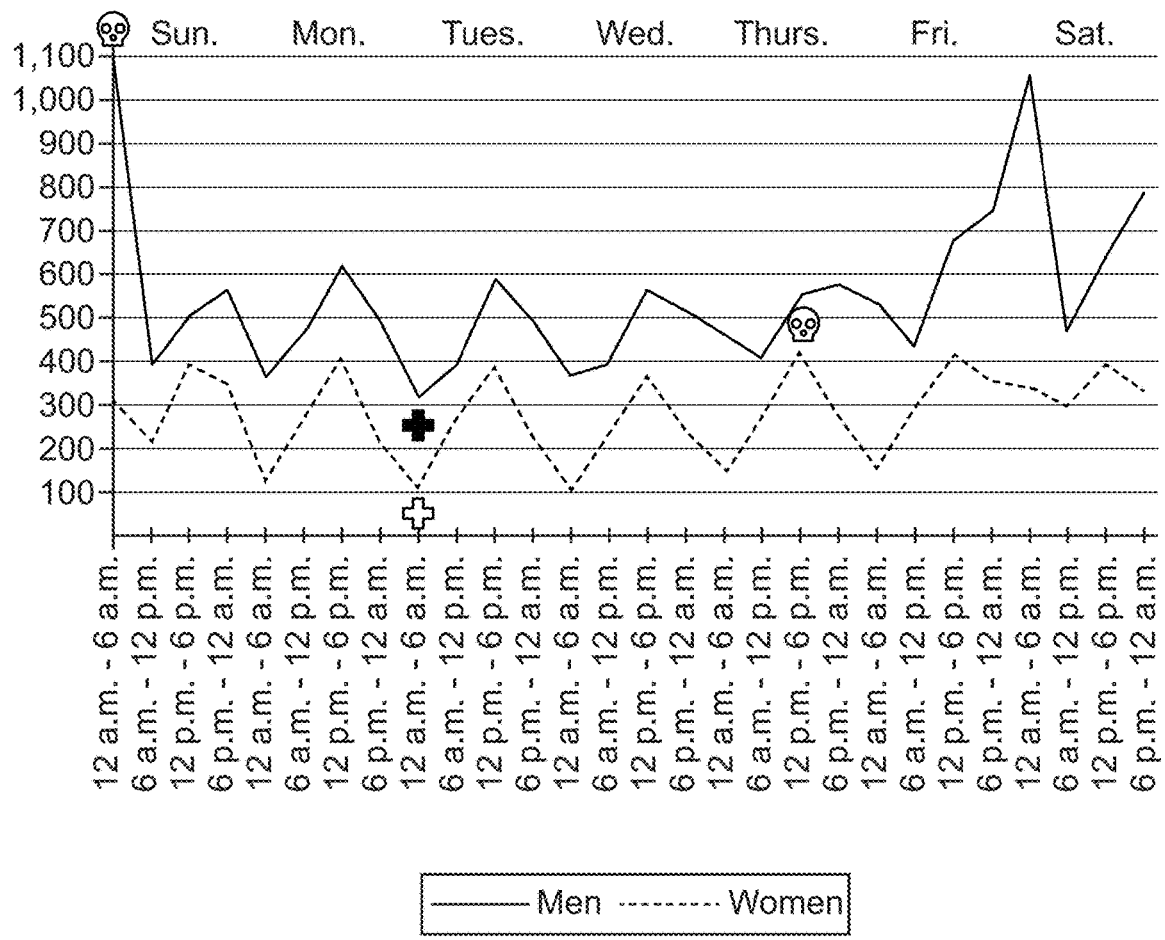
FIG. 27 illustrates number of fatalities by time of day and days of a week.

By means of non-limiting examples, the plurality of inputs received by the model/processing unit/first-stage processing units/second-stage processing unit may comprise one or a combination of two or more of: distance to collision, distance to intersection stop line, speed of vehicle, time-to-collision, time-to-intersection-violation, estimated braking distance, information regarding road condition (e.g., dry, wet, snow, etc.) which may include traction control information for slip indication, information regarding (e.g., identifying) special zone (e.g., construction zone, school zone, etc.), information regarding (e.g., identifying) environment (e.g., urban, suburban, city, etc.), information regarding (e.g., identifying) traffic condition, time of day, information regarding (e.g., identifying) visibility condition (e.g., fog, snow, precipitation, sun angle, glare, etc.), information (such as labels) regarding (e.g., identifying) object (e.g., stop sign, traffic light, pedestrian, car, animal, pole, tree, lane, curb, tail light, light-to-lane mapping, etc.), position of object, moving direction of object, speed of object, bounding box(es) (e.g., 2D bounding box(es), 3D bounding box(es)), operating parameter of vehicle (e.g., kinematic signals such as acceleration, speed, centripetal force, steering angle, brake, accelerator position, turn signal, traction control, etc.), information regarding (e.g., identifying) state(s) of driver (e.g., looking up, looking down, looking left, looking right, using phone, holding object, smoking, eyes closed, head turned or moved away so that no-face is detected, gaze direction relative to driver, gaze direction mapped onto external object(s) or object(s) in vehicle (e.g., head unit, mirror, etc.), change of gaze, object at which driver is looking, physiological condition of driver (e.g., drowsy, fatigue, road rage, stress, sudden sickness (e.g., heart attack, stroke, pulse, sweat, pupil dilation, etc.), etc.)), information regarding driver history (e.g., motor vehicle record, crash rate, experience, age, years of driving, tenure in fleet, experience with route, information provided by risk assessment tool such as VERA (Vision Enhanced Risk Assessment) that assesses drivers based on their driving behavior, etc.), time spent driving consecutively, proximity to meal times, and information regarding accident history (e.g., fatality at the given time, accident at the given time, geospatial heatmap for risk data per location over time, etc.), sensor signals (e.g., LIDAR signals, radar signals, GPS signals, ultrasound signals, signals communicated between vehicle and another vehicle (e.g., distance and relative speed signals communicated via 5G), signals communicated between vehicle and an infrastructure (e.g., via 5G), or any combination (e.g., fusion) of the foregoing), information regarding or indicating driver's driving activity or dynamic response (e.g., kinematics signals from vehicle system (e.g., indicating acceleration, speed, cornering, etc.), control signals (e.g., signals indicating steering angle, brake position, accelerator position, turn signals state, etc.)), location-specific information (e.g., geospatial heatmaps for risk data per location over time, type of road, type of intersection, accident history at specific location, etc.), risk information (e.g., risky road, risky intersection, any information indicating risk by location, date, and/or time (such as the information shown in FIG. 27, illustrating number of fatalities by time of day and days of a week), etc.), audio signals (such as detected speech, detected baby crying, detected loud music in the cabin, detected horn by ego vehicle or outside vehicle, etc.), etc.

In some embodiments, a GPS system of the vehicle may provide timing and location signals, which then may be used by the processing unit 210 to get the following information (e.g., via an api): road condition information, special zone (e.g., construction zone, school zone, etc.), information regarding (e.g., identifying) environment (e.g., urban, sub-urban, city, etc.), information regarding (e.g., identifying) traffic condition, time of day etc.

Also, in some embodiments, the processing unit 210 may include, or may communicate with, an object detection module. In such cases, whenever new classes are introduced to the object detection module (e.g., animals, poles, trees), they can be directly fed as inputs into the model. The model will then inherently learn the relevance of the new classes during training. In this way, new risk signals may be introduced to the model without the need for hand-engineered logic.

In some embodiments, the inputs fed to the model may comprise at least two of the above exemplary inputs. For example, in some embodiments, the inputs fed to the model may include first information regarding a state of a driver, and second information regarding condition outside the vehicle.

In some embodiments, the processing unit 210 may be configured to package two or more of the above exemplary inputs into a data structure for feeding to the model. The data structure may comprise a two-dimensional matrix of data. In some embodiments, the model is a Temporal-CNN, and the data structure of the inputs for the model may be configured by encoding inputs (risk signals) and time as columns and rows respectively, or vice versa, of a single-channel input image. The inputs for the model can take the form of a matrix time series of any signals that may conceivably be, either individually or jointly, relevant for predicting instantaneous situational risk. An example of such matrix will be described below with reference to FIG. 28.

In some embodiments, the model in the processing unit 210 of the apparatus 200 is configured to receive at least a first time series of input and a second time series of input in parallel, and/or process the first time series and the second time series in parallel. The first time series may be, for example, 6 seconds (or any of other durations) of TTC data, and the second time series may be, for example, 6 seconds (or any of other durations) of speed data. The first time series and the second time series may be combined to form the single-channel input image, which may be stored in a non-transitory medium. Alternatively, the first time series and the second time series may be stored separately. In such cases, the input image may still be considered as being formed by logical association linking the first time series and the second time series, and/or when the first time series and the second time series are fed in parallel to the model.

Figure 28:
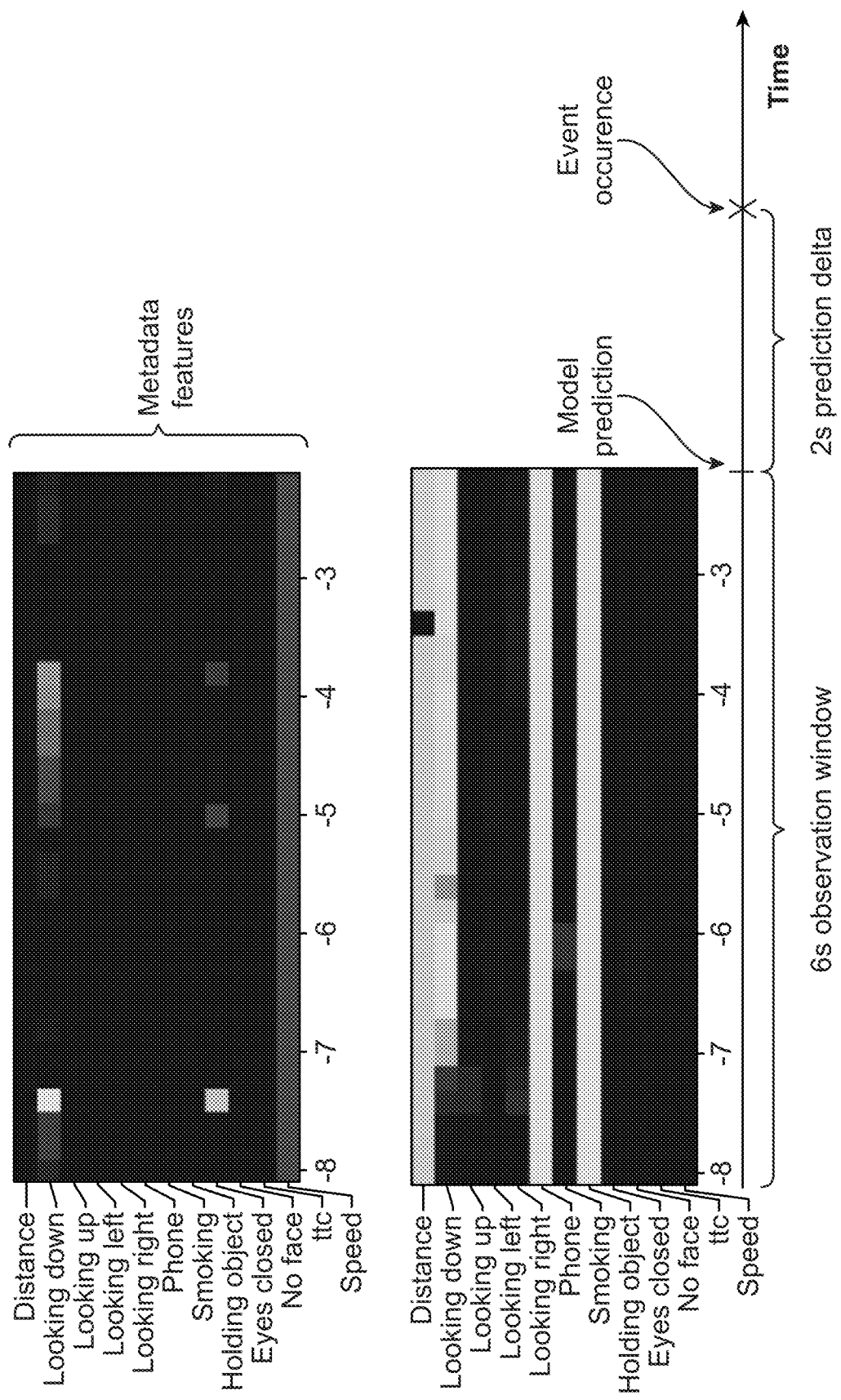
FIG. 28 illustrates an example of multiple inputs being processed by a model to generate a prediction at least two seconds before an occurrence of an event.

As discussed, in some embodiments, the processing unit 210 of the apparatus 200 may be configured to determine various probabilities of predicted events (e.g., probability of collision, probability of near-collision, probability of non-risky event, etc.) based on time series of inputs. FIG. 28 illustrates an example of a set of multiple inputs being processed by a model to generate a prediction at least two seconds before an occurrence of an event. As shown in the figure, inputs in the past six seconds are fed as input to the model in the processing unit 210, which makes a model prediction for one or more events that may occur in the future two seconds before an occurrence of an event. The inputs in the past six seconds include time series of data in the six-second window. In other embodiments, instead of using past six seconds of data, the processing unit 210 may be configured to process less than six seconds (e.g., 5, 4, 3, 2, 1 second, etc.) of data to determine the probabilities of the predicted events, or to process more than six seconds (e.g., 7, 8, 9, 10, 11, 12, . . . 30 seconds, etc.) of data to determine the probabilities of the predicted events.

In particular, as shown in FIG. 28, the set of inputs may include different parameters and their respective values for the corresponding time points within the preceding period (e.g., 6 seconds in the example). The parameters (or risk factors) of the set of inputs include: distance, looking down, looking up, looking left, looking right, phone, smoking, holding object, eyes closed, no face, time-to-collision, and speed. The "distance" parameter indicates a distance between the subject vehicle and leading vehicle. The "looking down" parameter indicates whether the driver is looking down or not, or a degree to which the driver is looking down (e.g., with higher value indicating higher probability that the driver is looking down). The "looking up" parameter indicates whether the driver is looking up or not, or a degree to which the driver is looking up (e.g., with higher value indicating higher probability that the driver is looking up). The "looking left" parameter indicates whether the driver is looking left or not, or a degree to which the driver is looking left (e.g., with higher value indicating higher probability that the driver is looking left). The "looking right" parameter indicates whether the driver is looking right or not, or a degree to which the driver is looking right (e.g., with higher value indicating higher probability that the driver is looking right). The "phone" parameter indicates whether the driver is using a phone or not (e.g., with higher value indicating higher probability that the driver is using a phone). The "smoking" parameter indicates whether the driver is smoking or not (e.g., with higher value indicating higher probability that the driver is smoking). The "holding object" parameter indicates whether the driver is holding an object or not (e.g., with higher value indicating higher probability that the driver is holding an object). The "eyes closed" parameter indicates whether the driver's eyes are closed or not, or a degree to which the driver's eyes are closed (e.g., with higher value indicating higher probability that the driver's eyes are closed). The "no face" parameter indicates whether the driver's face is detected or not, or a degree to which the driver's face is detected (e.g., with higher value indicating higher probability that the driver's face is not detected). The "time-to-collision" (TTC) parameter indicates a predicted time to a predicted collision (e.g., with higher value indicating shorter TTC). The "speed" parameter indicates a speed of the subject vehicle (e.g., with higher value indicating higher vehicle speed).

It should be noted that the set of inputs (input data) is not limited to having the examples of the above-described parameters, and that the set of inputs may have other parameters that may relate to risks. Thus, in other embodiments, the set of inputs may have additional parameter(s). In further embodiments, the set of inputs may not have all of the parameters described, and may have fewer parameters (e.g., may have 2, 3, 4, 5, 6, 7, 8, 9, 10, 11 parameters). In addition, in other embodiments, the set of inputs may have parameter(s) that is different from those described.

As shown in FIG. 28, the model is configured to generate model prediction based on the set of inputs (e.g., risk factors). In some embodiments, the model prediction may include (1) a probability of collision within T second(s), (2) a probability of near-collision within T second(s), and (3) a probability of non-risky event within T second(s). Because the model has been trained to identify these three events, the model can determine whether a set of inputs indicates a collision event, a near-collision event, or a non-risky event. The model can also determine a probability for each of the predicted events. In some embodiments, the model can determine a probability for each of the predicted events by applying a softmax function on the output vectors/logits so that the final output for each type of the predicted events is a probability value between 0 and 1, with the summation of all the outputs (probabilities for the different predicted events) being 1. In some embodiments, the model is trained with a sufficient quantity of similar examples of collision event, so that it can predict a high probability for a collision event for a given set of inputs that would lead to a collision event. The model may also be trained with a sufficient quantity of similar examples of near-collision event, so that it can predict a high probability for a near-collision event for a given set of inputs that would lead to a near-collision event. The model may also be trained with a sufficient quantity of similar examples of non-event, so that it can predict a high probability for a non-event for a given set of inputs that would lead to a non-event. In other embodiments, the model prediction may include additional predictions, or may include only one or two of the above three probabilities. For example, in other embodiments, instead of predicting probabilities for collision event, near-collision event, and non-risky event, the model may be configured to predict two probabilities for "risky event" and "non-risky" event.

After the probabilities for the various predicted events (e.g., collision event, near-collision event, non-risky event, etc.) have been determined, the processing unit 210 may then determine a metric (e.g., risk score) based on these probabilities. In some embodiments, the metric determined by the processing unit 210 may indicate whether the risk factors collectively pose a risky situation or a non-risky situation. The metric may be a risk score indicating a degree of risk in some embodiments. For example, a risk score with a higher value may indicate a more risky situation, while a risk score with a lower value may indicate a less risky situation.

In some embodiments, the metric determined by the processing unit 210 based on the probabilities of the various events may be a weighted sum of scores (probabilities) for the different respective events. In other embodiments, the metric may be calculated as a sum of weighted scores (probabilities).

Figure 29:
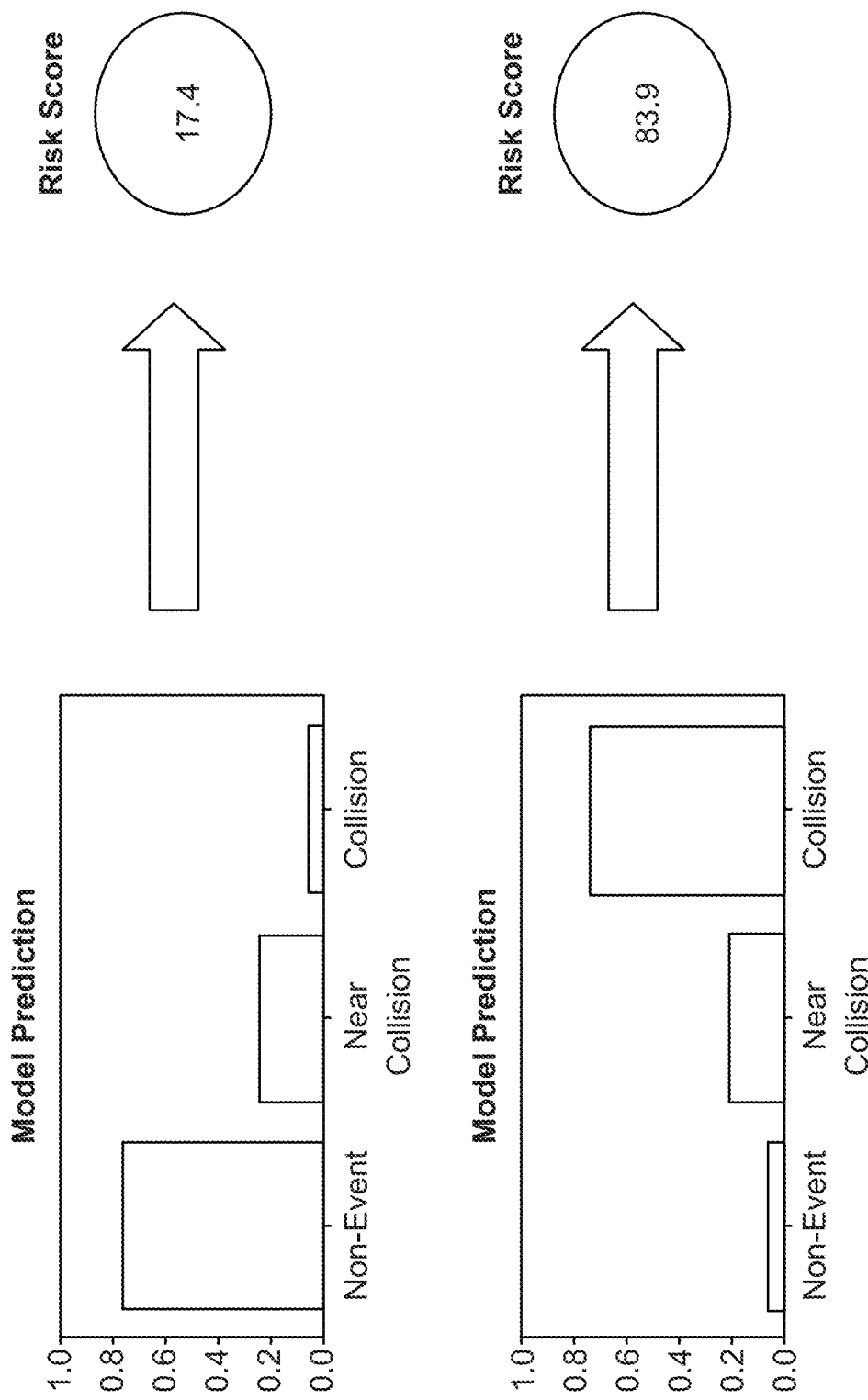
FIG. 29 illustrates examples of risk score calculations based on model predictions.

FIG. 29 illustrates examples of risk score calculations based on model predictions. In the top example, the model of the processing unit 210 makes the below prediction: the probability of collision within T second(s) is 6%, the probability of near-collision with T second(s) is 22.8%, and the probability of non-risky event with T second(s) is 71.2%. If a weight of 1.0 is applied for the collision prediction, a weight of 0.5 is applied for the near-collision prediction, and a weight of 0.0 is applied for the non-risky event prediction, the processing unit 210 may then calculate the risk score as a sum of weighted prediction, as follows: 1.0*6%+ 0.5*22.8%+0*71.2%=17.4.

In the bottom example of FIG. 29, the model of the processing unit 210 makes the below prediction: the probability of collision within T second(s) is 73.4%, the probability of near-collision with T second(s) is 21%, and the probability of non-risky event with T second(s) is 5.6%. If a weight of 1.0 is applied for the collision prediction, a weight of 0.5 is applied for the near-collision prediction, and a weight of 0.0 is applied for the non-risky event prediction, the processing unit 210 may then calculate the risk score as a sum of weighted prediction, as follows: 1.0*73.4%+ 0.5*21%+0*5.6%=83.9.

In some embodiments, the processing unit 210 may be configured to compare the risk score with one or more thresholds. If a threshold is met (e.g., exceeded), the processing unit 210 may then generate a control signal to cause an alert to be generated and/or to cause a vehicle control to operate (e.g., to apply brakes automatically, to turn on exterior lights, to apply horn, etc.). Following the above two examples of FIG. 29, the risk score is 17.4 for the top example, and is 83.9 for the bottom example. If a threshold is set to be 70 for application of alert and/or vehicle control, the processing unit 210 will determine that the threshold is not met in the top example (because the risk score 17.4 is less than the threshold of 70). Accordingly, in the top example, the processing unit 210 will not generate the control signal to cause an alert to be generated and to cause the vehicle control to operate. On the other hand, the processing unit 210 will determine that the threshold is met in the bottom example (because the risk score 83.9 is greater than the threshold of 70). In such case, the processing unit 210 will generate the control signal to cause the alert to be generated and/or to cause the vehicle control to operate (e.g., to apply brake automatically, to decelerate, to honk, to activate external light(s), to provide tactile feedback, etc., or any combination of the foregoing).

Alternatively or additionally, if the risk score is above a threshold, the processing unit 210 may generate the control signal for informing a fleet manager or fleet management system that the driver performed a bad driving.

In some embodiments, if the risk score is below the threshold or another threshold, then the processing unit 210 will not generate the control signal, and/or may generate a control signal to operate a speaker to provide an audio praise for the driver, and/or to inform a fleet manager or fleet management system that the driver performed a good driving.

Also, in some embodiments, the model may learn what is considered good driving behaviors. In such cases, the model may detect certain event, and may determine what is considered good driving behavior(s) for that detected event. The processing unit 210 may also compare the actual driving behavior (e.g., by obtaining vehicle control signals, by analyzing interior images of the cabin, etc.) with the good driving behavior, and see how well the driver is following the good driving behavior. The result of the comparison may be transmitted to a fleet management system in some embodiments. In such cases, the fleet management system may use such information to improve driving skills of the drivers and/or to provide praise to good drivers. Alternative or additionally, the processing unit 210 may generate a control signal causing a praising message to be provided for the driver (in the case in which the driver is exhibiting good driving behavior), or a coaching message to be provided for the driver (in the case in which the driver is not exhibiting good driving behavior). By means of non-limiting examples, good driving behaviors may include: slowing down in dense traffic, slowing down in presence of pedestrian, slowing down when approaching an intersection, etc.

Figure 30:
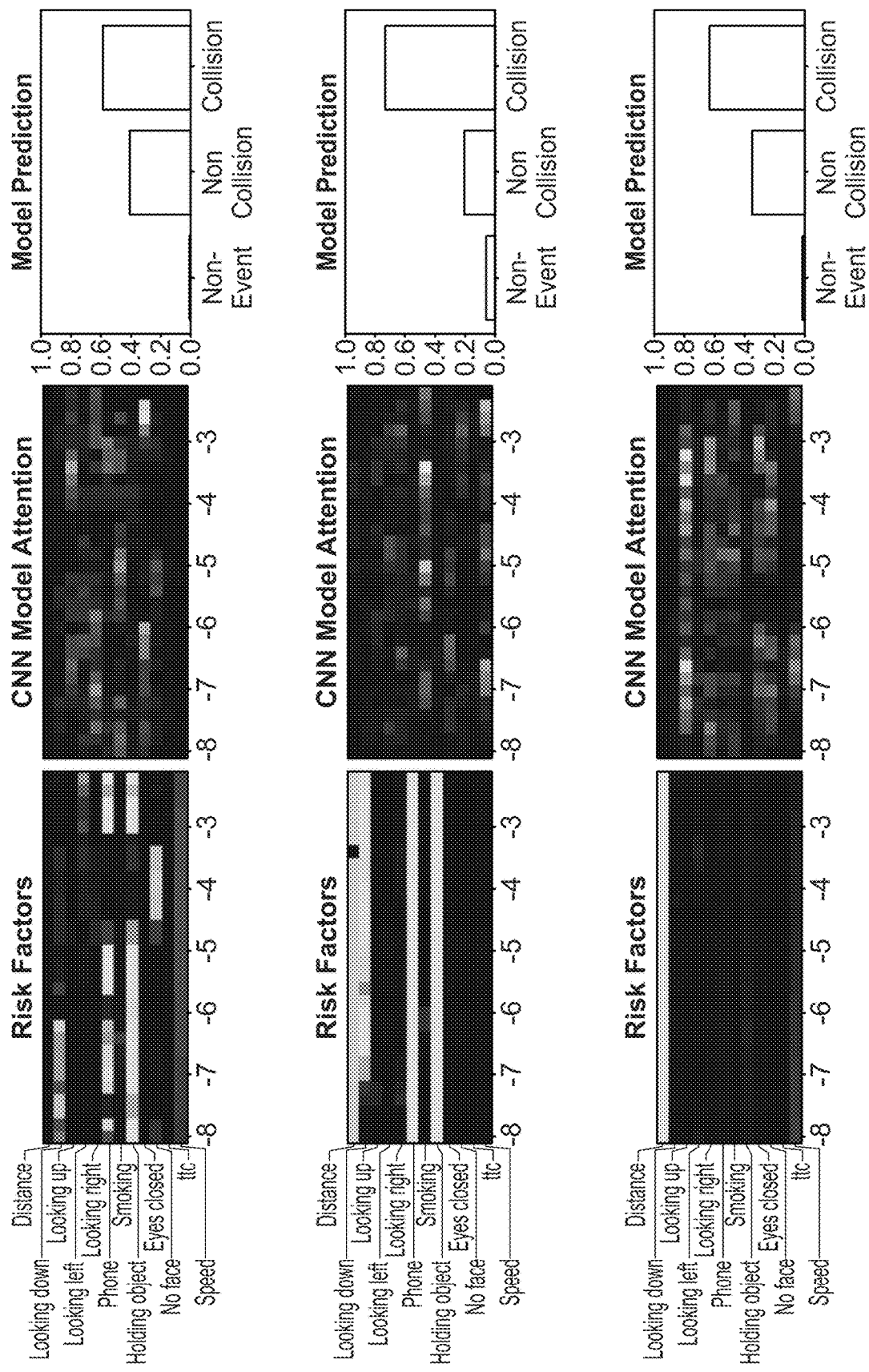
FIG. 30 illustrates examples of model outputs based on multiple time series of inputs, wherein the model outputs indicate a high "collision" state.
Figure 30:
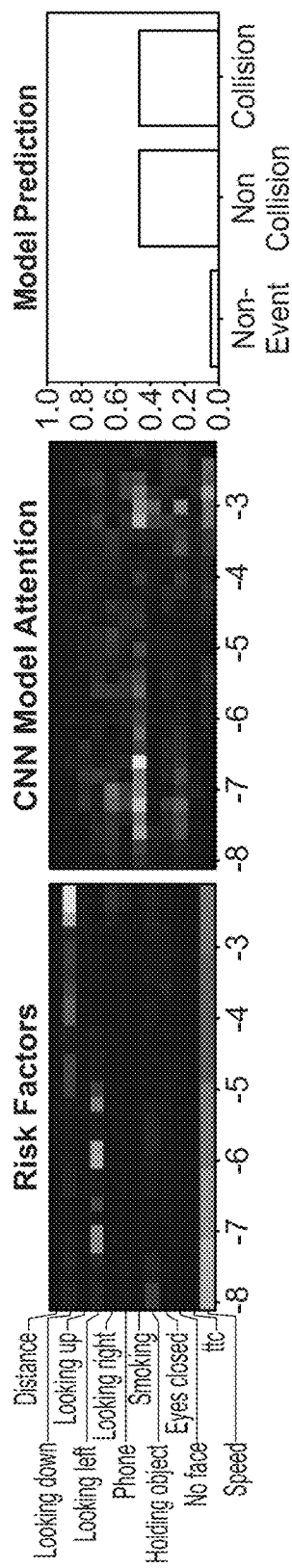
Figure 30:
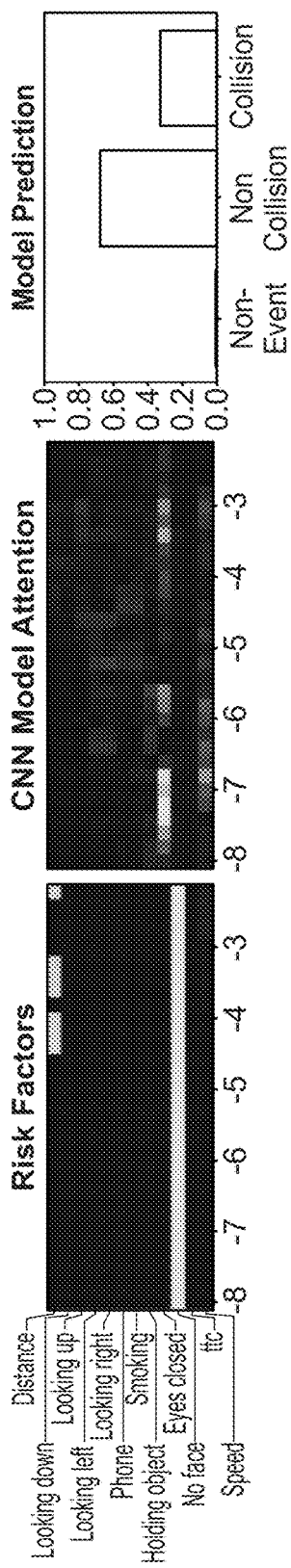

FIG. 30 illustrates examples of model outputs based on multiple time series of inputs, wherein the model outputs indicate a high "collision" state. In particular, the left column in the figure illustrates different examples of inputs that are inputted into the model. Each example of inputs includes different parameters and their respective values for the corresponding time points within the preceding period (e.g., 6 seconds in the example), like that shown and described with reference to FIG. 28. The middle column in FIG. 30 indicates intermediate representations learned by the model. In particular, saliency maps of the neural network model are shown to visualize which parts of the inputs the model is paying attention to. The model processes the inputs to determine probabilities of the respective three events: collision event, near-collision event, and non-risky event (as shown in the right column in the figure). In all of the examples shown in FIG. 30, the "collision event" has the highest probabilities (compared to the probabilities of the other two events).

Figure 31:
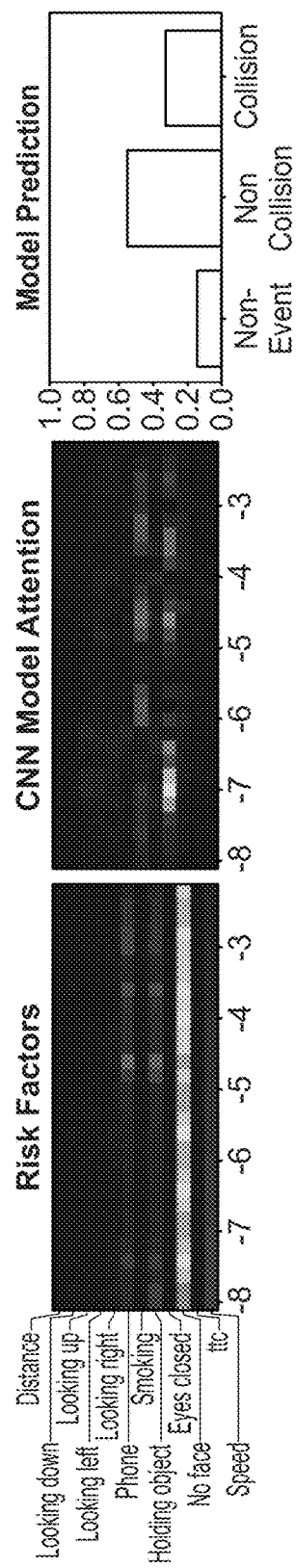
FIG. 31 illustrates examples of model outputs based on multiple time series of inputs, wherein the model outputs indicate a high "near-collision" state.

FIG. 31 illustrates examples of model outputs based on multiple time series of inputs, wherein the model outputs indicate a high "near-collision" state. In particular, the left column in the figure illustrates different examples of inputs that are inputted into the model. Each example of inputs includes different parameters and their respective values for the corresponding time points within the preceding period (e.g., 6 seconds in the example), like that shown and described with reference to FIG. 28. The middle column in FIG. 31 indicates intermediate representations learned by the model. In particular, saliency maps of the neural network model are shown to visualize which parts of the inputs the model is paying attention to. The model processes the inputs to determine probabilities of the respective three events: collision event, near-collision event, and non-risky event (as shown in the right column in the figure). In all of the examples shown in FIG. 31, the "near-collision event" has the highest probabilities (compared to the probabilities of the other two events).

Figure 32:
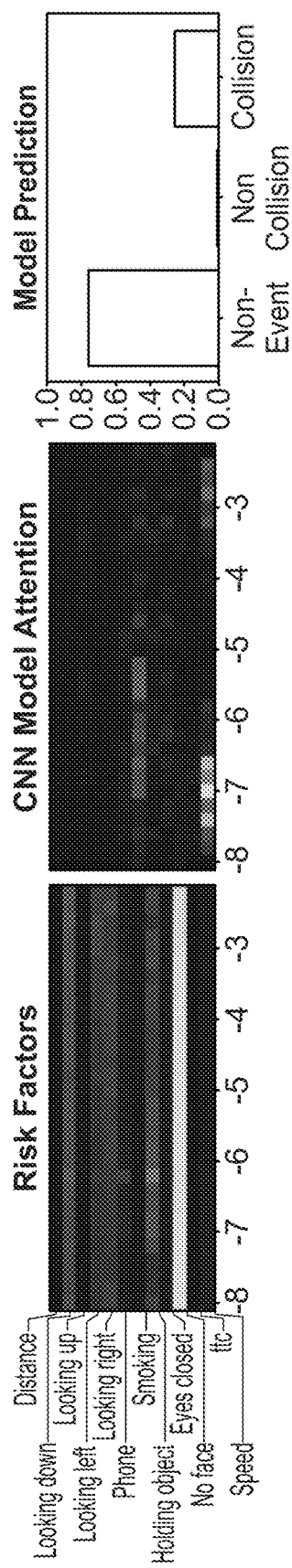
FIG. 32 illustrates examples of model outputs based on multiple time series of inputs, wherein the model outputs indicate a high "non-event" state.

FIG. 32 illustrates an example of model outputs based on multiple time series of inputs, wherein the model outputs indicate a high "non-event" state. In particular, the left diagram in the figure illustrates an example of inputs that are inputted into the model. The example of inputs includes different parameters and their respective values for the corresponding time points within the preceding period (e.g., 6 seconds in the example), like that shown and described with reference to FIG. 28. The middle diagram in FIG. 32 indicates intermediate representation learned by the model. In particular, saliency map of the neural network model is shown to visualize which parts of the inputs the model is paying attention to. The model processes the inputs to determine probabilities of the respective three events: collision event, near-collision event, and non-risky event (as shown in the right column in the figure). In the example shown in FIG. 32, the "non-risky event" has the highest probabilities (compared to the probabilities of the other two events).

As shown in the examples of FIGS. 30-32, each set of inputs may form a certain pattern. In some cases, the model may be a neural network that can be trained to make decision based on such pattern. For example, the neural network model may be trained using a number of sets of inputs (like the examples shown in FIG. 30) that are labeled as "collision" events. The neural network model may also be trained using a number of sets of inputs (like the examples shown in FIG. 31) that are labeled as "near-collision" events. The neural network may also be trained using a number of sets of input (like the example shown in FIG. 32) that are labeled as "non-risky" events. Through the training, the model will learn to pay attention differently to different sets of inputs. For example, referring to the middle diagrams in FIGS. 30-32, it can be seen how the model attention differs for each event-type. In some embodiments, the model may be trained using a supervised approach. In such approach, the input signals over time are encoded as a single-channel image and fed into a CNN model. The model is then trained to predict the probability of an event occurring some time interval away in the future: such as, non-risky event, near-collision event, or collision event. For training the model, these prediction targets may be created by human-labelers in the "supervised" training approach. In some embodiments, the model may be trained to make prediction for events occurring within T-seconds (with, e.g., 1.5 seconds 2 seconds, 3 seconds, 4 seconds, etc.). It should be noted that the training of the model may take any form, and is not limited to supervised learning in which the model learns directly from provided labels. For example, in other embodiments, the model may be trained using reinforcement learning, in which an agent learns from its environment through trial and error.

As discussed, the model described herein is advantageous because it may reduce both false positive cases (e.g., cases in which alert is generated for non-risky situations), as well as false negative cases (e.g., cases in which alert is not generated when in risky situations). FIGS. 33-37 illustrate examples of these scenarios.

Figure 33A:
Figure 33B:
Figure 33C:
Figure 33H:
Figure 33I:
Figure 33J:
Figure 33K:
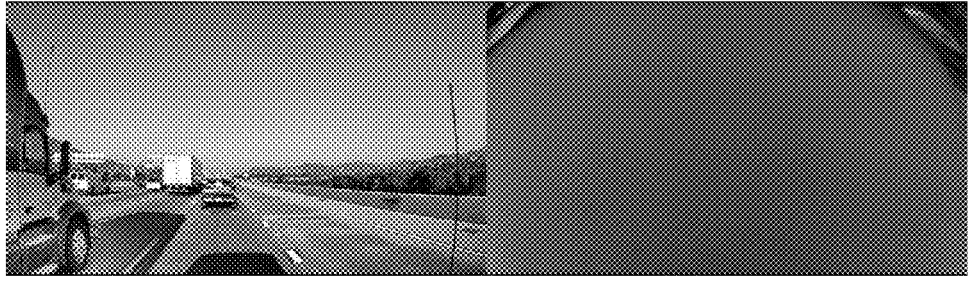

FIGS. 33A-33K illustrate a series of exterior images and corresponding interior images, particularly showing a problem that can be addressed by the technique of FIG. 25. In particular, this example illustrates why too sensitive alerts without considering the surrounding context can hinder the goal of helping the driver. FIGS. 33A-33C are snapshots (frame 1, 5, and 10 from a 25 fps (frame/sec) video) corresponding to the scenario. In the 3 frames shown, before the "holding object" event is initiated, the driver: (1) has his eyes on the road, (2) was not speeding, and (3) was maintaining a safe distance with the lead vehicle. During the "holding object" event, the driver is still maintaining safe distance with the lead vehicle, isn't speeding, and is looking at the road as apparent from the snapshots (see FIGS. 33D-33G). In the example, a distraction module detected the "holding object" pose, and generated an alert because the "holding object" pose is assumed to be a distraction that may pose a risky situation. However, given the context, the "holding object" event alone is not particularly risky here. Accordingly, the alert generation here is a false positive case. The driver puts down his vizor blocking the camera as he seemed to be annoyed by the alert as seen in the following frames (see FIGS. 33H-33K). Alerting in such unremarkable scenarios reduces the relevance of alerts and reduces drivers' confidence on such alerts which hinders the goal of assisting them for safe driving. As shown in this example, a distraction signal was triggered because the "holding-object" detection score crossed the pre-defined threshold. However, this is not exactly a risky scenario since the driver had eyes on the road, wasn't speeding, and was maintaining a safe distance with the lead vehicle. The technique of FIG. 25 is advantageous because by considering a combination of the detected inputs, the model will recognize that the "holding object" event alone is not risky when taken in context with other inputs, and the processing unit 210 will correctly hold off in generating any control signal to generate any alert.

Figure 34A:
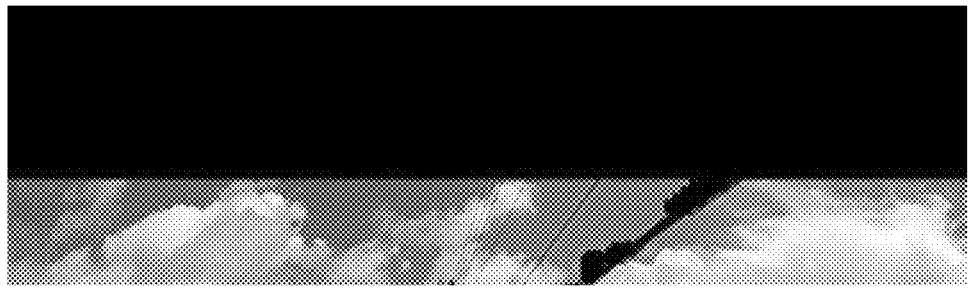
FIGS. 34A-34E illustrate a series of exterior images and corresponding interior images, particularly showing a problem that can be addressed by the technique of FIG. 25.
Figure 34B:
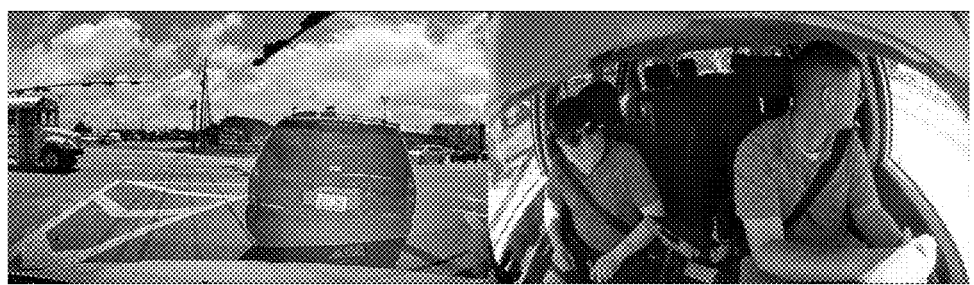
Figure 34C:
Figure 34D:
Figure 34E:
Figure 35A:
FIGS. 35A-35D illustrate a series of exterior images and corresponding interior images, particularly showing a problem that can be addressed by the technique of FIG. 25.
Figure 35B:
Figure 35C:
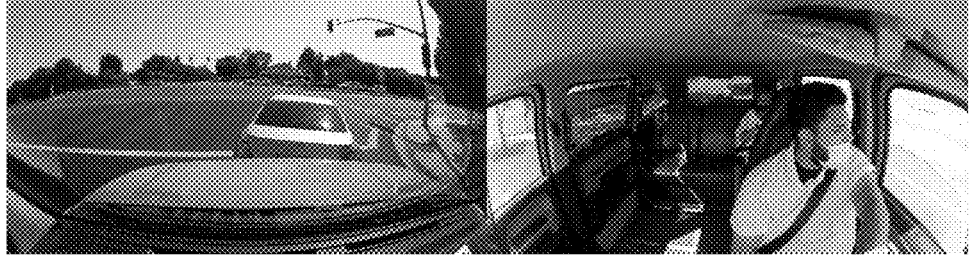
Figure 35D:
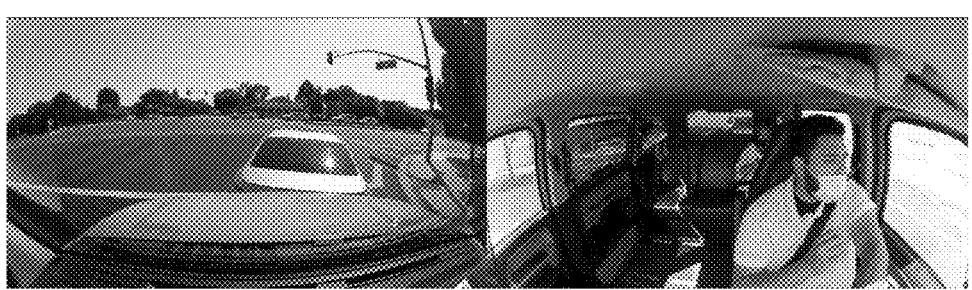

FIGS. 34A-34E illustrate a series of exterior images and corresponding interior images, particularly showing a problem that can be addressed by the technique of FIG. 25. In this scenario, no alert was triggered before the near-collision. This is because although the driver was repeatedly distracted, the distraction duration threshold was not crossed for any individual distraction segment. Accordingly, this example presents a problem of false negative. FIGS. 34A-34B are some relevant snapshots corresponding to the scenario (frame 158, 166 from a 25 fps video). In these frames, it is visible that the driver is repeatedly distracted (looking left, chatting) in relatively shorter bursts of time. Ultimately, the ego vehicle approaches the lead vehicle too closely leading to a near-collision scenario (frame 214, 212, 225 from a 25 fps video)—See FIGS. 34C-34E. The combination of repeated distraction and closely approaching a lead vehicle is a risky scenario irrespective of how long the driver has been distracted for. On the other hand, the new model of FIG. 25 was able to detect this "near-collision" event, and provided a high risk score of 65.7 for this predicted near-collision event. The new model can do so because it had access to both the distraction stream (first time series of input) and the TTH stream (second time series of input). This is advantageous since even if risk factors individually do not cross any single threshold, when combined together actually create a very risky situation, which can be detected by the model of FIG. 25.

FIGS. 35A-35D illustrate a series of exterior images and corresponding interior images, particularly showing a problem that can be addressed by the technique of FIG. 25. Similar scenario as example 2 where the driver is briefly distracted (looking left) while closely approaching a stopped lead vehicle at an intersection as seen in the following snapshots (frame 90, 110, 125 from a 25 fps video)—see FIGS. 35A-35C. Although distraction duration is relatively shorter, it's a fairly risky scenario which ultimately led to a collision. The frame below shows the moment of collision (frame 134 from a 25 fps video)—see FIG. 35D.

Figure 36A:
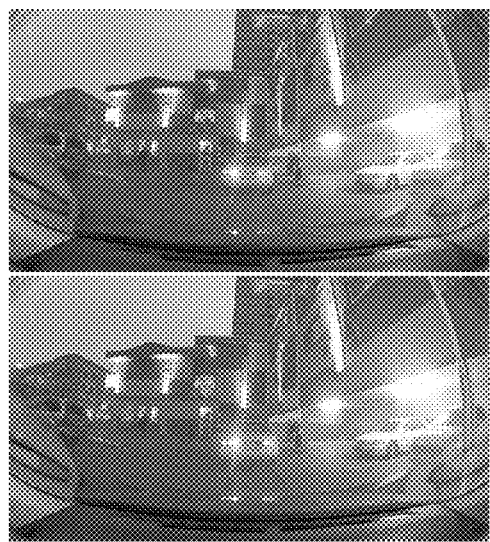
FIGS. 36A-36C illustrate a series of exterior images and corresponding interior images, particularly showing a problem that can be addressed by the technique of FIG. 25.
Figure 36B:
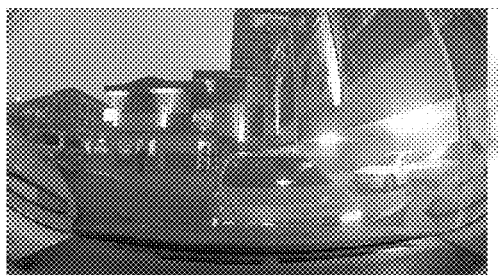
Figure 36C:

FIGS. 36A-36C illustrate a series of exterior images and corresponding interior images, particularly showing a problem that can be addressed by the technique of FIG. 25. This is example, the driver was sparsely distracted (using cellphone, looking down), and the lead vehicle was backing up as seen in the snapshots (frame 29, 65 from a 25 fps video)—see FIGS. 36A-36B. However, no alert was triggered by the existing system. Accordingly, this case presents another example of false negative. Using the model of FIG. 25, the processing unit 210 predicted this event to be a "collision" event and assigned a high risk score of 83.9 based on processing of a raw distraction stream (first time series of input) and TTH/TTC stream (second time series of input). The frame shown in FIG. 36C illustrates the moment of collision (frame 126 from a 25 fps video).

Figure 37A:
FIGS. 37A-37C illustrate a series of exterior images and corresponding interior images, particularly showing a problem that can be addressed by the technique of FIG. 25.
Figure 37B:
Figure 37C:

FIGS. 37A-37C illustrate a series of exterior images and corresponding interior images, particularly showing a problem that can be addressed by the technique of FIG. 25. In this scenario, an alert was generated, but the alert was irrelevant since although the driver was distracted (looking down), there was no lead vehicle ahead for a long time and he was driving on an empty road without speeding up as seen in the snapshots (frame 49, 143, 213 from a 25 fps video)—see FIGS. 37A-37C. On the other hand, the model of FIG. 25 predicted this event to be non-risky event (uneventful/unremarkable) and calculated a low risk score of 17.4 using cues from the distraction, speeding, and TTH/TTC streams. Accordingly, the model prevented the problem of false positive in this example.

It should be noted that the model of FIG. 25 may be implemented in the apparatus 200 in a variety of ways. For example, in some embodiments, a trigger-based approach may be used. In such cases, the model is only run when a set of one or more conditions are met (e.g., distraction reaches a threshold). When triggered, the model is run on the whole event duration. As another example, in other embodiments, a continuous approach may be used. In such approach, the model is continuously run on the last X-seconds of data based on a sliding-window.

In the above example, the model has been described as providing model prediction, which may include predicted "collision" event, predicted "near-collision" event, predicted "non-risky' event, and their respective probabilities (first output). However, the first output is not limited to these examples, and may be any conceivable driving state relevant to risk. For example, in other embodiments, the first output may also include a metric indicating a severity of collision (e.g., high-speed crash versus a fender-bender), and/or a characteristic(s) of a risk event, such as hard-braking, swerving, whether "good" driving behavior is present, etc.

Also, in the above example, the probabilities of the various predicted events (first output) are utilized by the processing unit 210 to calculate the risk score (second output) based on a sum of weighted probabilities. In other embodiments, other techniques may be used to calculate the risk score. For example, any continuous function that maps the immediate model outputs (e.g., probabilities of the different events) to a single score may be used.

In further embodiments, the processing unit 210 may also determine a change of the risk score (second output) over time as a third output. This third input advantageously may indicate whether a situation at any given moment is turning riskier or safer, and by how much.

In further embodiments, the processing unit 210 may determine a fourth output indicting, relating, or based on, the optimal behavior that should be taken at any given time, especially so in risky scenarios. For example, in some embodiments, the processing unit 210 may determine the course of action taken by a "good driver" based on a set of inputs indicating a certain risky situation. In such cases, the model will be able to better assess emerging risk, not only by processing the external risk factors, but also by evaluating how the current driver behavior compares to the ideal driving behavior. These good behaviors may include: Slowing down, Changing gaze, Changing lanes, etc.

Also, in some embodiments, the processing unit 210 (e.g., model therein) may be configured to processing first image data from the first camera 202, and second image data from the second camera 204, to generate one or more outputs (e.g., probabilities of different event categories), wherein the first image data are generated during a first time window, and the second image data are generated during a second time window that is at least partly co-extensive with the first time window. For example, first image data may be generated from t=2 s to t=8 s, and second image data may be generated from t=3 s to t=10 s. In other embodiments, the first time window and the second time window may be completely co-extensive. For example, first image data may be generated from t=1 s to t=5 s, and second image data may be generated from t=1 s to t=5 s. In further embodiments, the first time window and the second time window may be non-coextensive. For example, a series of distractions in close proximity captured in second image data during time window A may give rise to a heightened state of external risk captured in first image data during a later time window B.

In addition, in some embodiments, the processing unit 210 (e.g., model therein) may be configured to predict a future distraction based on past behavior of the driver. For example, the processing unit 210 may predict that a future distraction (e.g., in the next minutes) is more likely because of the past behavior detected by the processing unit 210

(e.g., distraction events that occurred frequently in the past duration window), even if the momentary distraction has ended. Distraction events may be considered to occur frequently if there are multiple distraction events that occurred temporally in close proximity (e.g., events that occurred within a certain time duration, such as within: 2 minutes, 1 minute, 30 seconds, 15 seconds, 10 seconds, 5 seconds, 4 seconds, 3 seconds, 2 seconds, 1 second, etc.).

Furthermore, in some embodiments, the processing unit 210 (e.g., the model therein) may be configured to identify a clustering of higher frequency distractions at a certain geographic location and/or time as a more permanent indicator of external risk. For example, the processing unit 210 may determine that the driver is always distracted at location X in the past few days. In such cases, when the vehicle driven by the same driver (or another driver) is at location X, the processing unit 210 may determine that there is a heightened state of external risk. In one implementation, when processing external camera images, vehicle controls signals, and/or other sensor signals captured when the vehicle is at location X, the processing unit 210 may apply a weight, and/or may change a threshold for risk prediction, to account for the fact that the driver may have a higher chance of being distracted based on past behavior.

In the above embodiments, the processing unit 210 has been described with reference to determining risk of collision. It should be noted that the risk of collision is not limited to frontal collision with vehicle that is in front of the subject vehicle. In other embodiments, the processing unit 210 may also be configured to identify risk of collision involving side impact, or rear collision (in which the subject vehicle is backing into object, such as other vehicle, tree, post, pedestrian, etc.). Accordingly, in some embodiments, the apparatus 200 may be a 360-degree monitoring device configured to monitor risks of collision surrounding all four-sides of a vehicle.

Also, in some embodiments, the processing unit 210 may identify a risk, and may weigh the risk by frequency (e.g., likelihood of the risk resulting in a collision), and/or may weigh the risk by severity (e.g., amount and/or type of damage of collision). In such cases, the processing unit 210 may intervene more aggressively if the collision type that would result is more damaging. For example, the processing unit 210 may intervene faster and more urgently if it predicts that the probability of risk is associated with a pedestrian fatality, as opposed to a vehicle knocking over a mailbox.

In addition, in some embodiments, the processing unit 210 may determine what want a good driver will do (e.g., what is a reference action) in a given situation, and compare the reference action with what the subject driver is actually doing (actual action of the driver). If the actual action is different from the reference action, the processing unit 210 may then generate one or more control signals (e.g., to warn the driver, to control the vehicle automatically, etc.) as similarly described herein. In some cases, the processing unit 210 may keep track of an amount of time that has passed since the expectation of the reference action has occurred. If the subject driver has not performed the reference action within a given period of time, the processing unit 210 may then generate one or more control signals. Good drivers know how to identify an exponential risk situation, and take an action to quickly reduce the risk before it leads to a collision. Thus, in some embodiments, the model of the processing unit 210 may be trained (based on prior good drivers' data indicating good reference actions) to learn to predict what a good driver should do in a given risky situation. By means of non-limiting examples, action of a good driver (reference action) may include looking at a certain direction (e.g., left and right at intersection), reducing speed, increasing speed, braking, signaling, changing lane, changing direction by steering, etc.

Furthermore, in some embodiments, the model of the processing unit 210, module(s) of the model, module(s) of the processing unit 210, data received by the processing unit 210, data output by the processing unit 210, or any combination of the foregoing, may be stored in one or more non-transitory medium in the vehicle (such as in one or more ECU boxes). The one or more non-transitory medium may be associated with an automotive safety system (e.g., operated under ASIL-A, ASIL-B, ASIL-C, ASIL-D, etc.), or may be associated with an infotainment non-safety system of the vehicle.

Advantages

As illustrated in the above examples, the model and technique of FIGS. 25 and 28 are advantageous because they can accurately reduce collisions in real-time while achieving minimizing false positive and false negative scenarios. By identifying a number of risk factors and considering them together, non-linearity of risk escalation may be accounted for, and a rich context-based approach may be utilized to correctly identify a risky event or a non-risky event. In some cases, by considering driver attention, gaze, and/or action, the model may accurately predict whether a risk is increasing or reducing. Because the model is configured to learn association between multiple risk factors and various predicted events (e.g., high risk event, non-risky event, etc.), the model is capable of processing multiple time series of input (risk factors) collectively to accurately distinguish a risky event from a non-risky event.

The model and technique described herein are advantageous on a driver level because the resulting risk score accurately indicates whether a situation is risky or not. As a result, when an alert is generated based on the risk score, the alert will not be a false alert. Also, because the risk score is based on contextually rich signals, the processing unit 210 implementing the model can suppress alerts in low-risk scenarios, and can raise severity for alert generations in high-risk scenarios. Also, in some embodiments, by considering driver actions, the model can factor in driver actions to suppress alerts (e.g., in situations in which the driver is changing gaze direction or changing acceleration/braking to indicate mitigation of risk, or in which the driver is turning to look at a red light while pedestrian is slowing down preemptively, etc.), or to escalate risk to trigger an alert (e.g., in situations in which the driver is turning away from hazard or is overloaded with other activity, such as eating food, using phone, etc.).

The model and technique described herein are also advantageous on a system level. In some cases, the risk score may be utilized by the system to identify interesting events for presentation to fleet managers, to down-rank unremarkable events, to up-rank remarkable events, etc. Alternatively or additionally, the system may utilize the risk score to determine whether to upload the set of inputs associated with the risk score to the system database, or to disregard it. For example, high risk score resulted from a set of inputs indicating a new scenario may be uploaded (e.g. via long-term-evolution network) to the system database for training the model. In other example, low-risk events resulting a low risk score may be disregarded, and may not be uploaded to the system database.

Specialized Processing System

Figure 38:
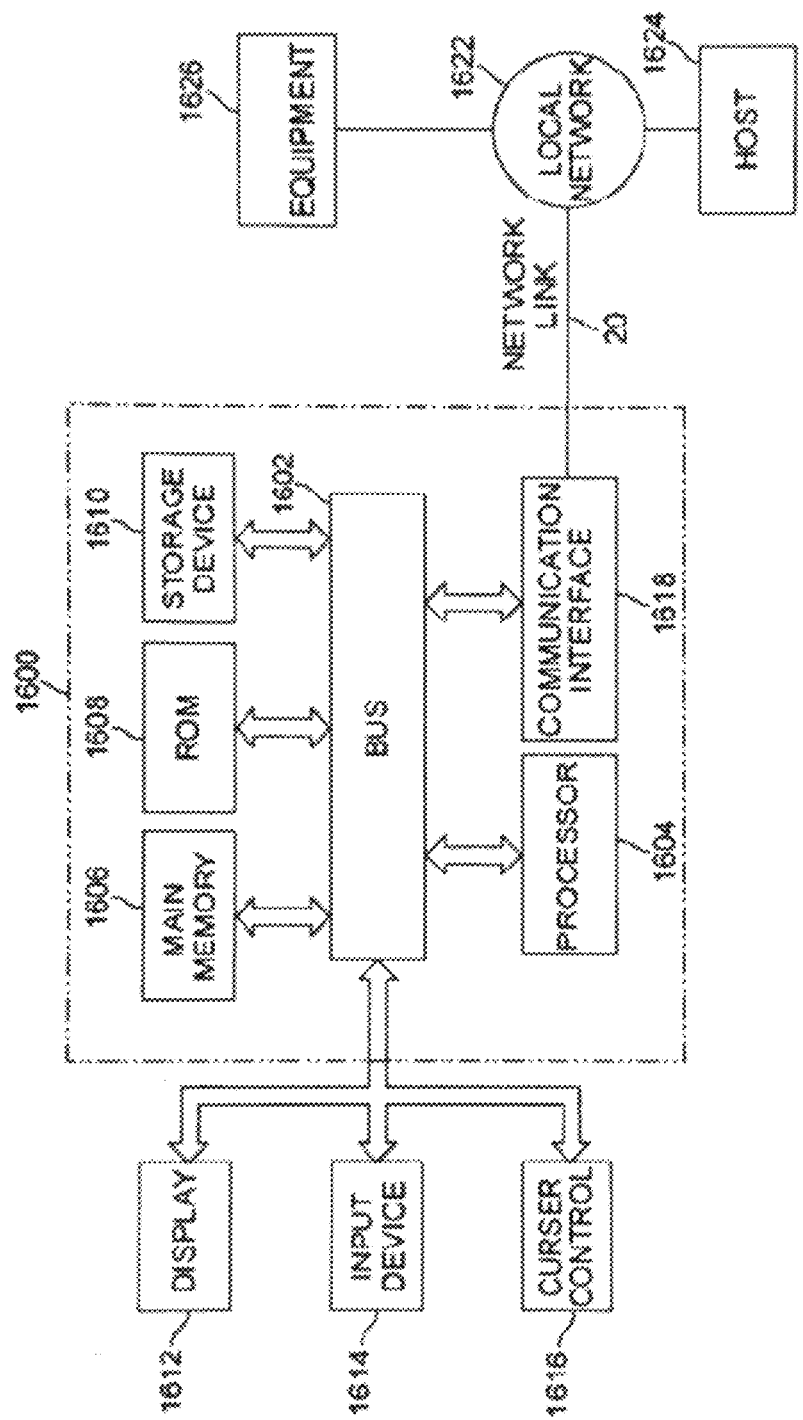
FIG. 38 illustrates a specialized processing system for implementing one or more electronic devices described herein.

FIG. 38 illustrates a specialized processing system for implementing one or more electronic devices described herein. For examples, the processing system 1600 may implement the apparatus 200, or at least a part of the apparatus 200, such as the processing unit 210 of the apparatus 200.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a touchpad, a touchscreen, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

As used in this specification, the term "image" is not limited to an image that is displayed, and may refer to an image that is displayed or not displayed (e.g., an image in data or digital form that is stored). Also, the term "image" may refer to any 2D or 3D representation of object(s), such as lidar point clouds, radar echo map, infrared image, heat map, risk map, or any of other sensors that provides visual or non-visual pixel map. In addition, in some embodiments, the term "image" may refer to metadata image that comprises one or more metadata represent information relating to one or more risk factors. In some cases, the metadata may be generated based on processing of raw data from one or more sensors (e.g., sensing units). In some embodiments, the term "image" may refer to a set of data, such as a collection of raw data from one or more sensors, or a collection of metadata (such as that described with reference to FIGS. 28 and 30-32) derived from processing one or more sets of raw data (e.g., from sensor(s)). Also, in some embodiments, data in an image may belong to a same time point (e.g., they are generated based on raw data created at the same time point) or same period of time (e.g., they are generated based on raw data created within a same duration). In some cases, an "image" may represent presence, absence, or a degree of an underlying risk, for a driving condition at a point in time. In other cases, an "image" may represent a time series or a pattern indicating how risk factors evolve over time (e.g., more pedestrian appears, the car is speeding up, following distance with lead vehicle is decreasing, etc.). Any of the images described herein may be output by a processing unit (e.g., a neural network model), and/or input into a processing unit (e.g., a neural network model). For example, the image of FIG. 28 may be fed into the processing unit 210, which is configured to identify patterns of a circumstance (driver state+vehicle state+external environment (such as weather, road, other vehicles and people)) that is rapidly becoming risky. The image(s) of time series data may indicate that a situation is heading towards a bad outcome—like watching a movie that shows a speeding car, a driver distracted, and a red light or blockage coming up, etc., where if the combination of risks keep increasing, it will lead to a collision and injury.

In addition, as used in this specification, the term "model" may refer to one or more algorithms, one or more equations, one or more processing applications, one or more variables, one or more criteria, one or more parameters, or any combination of two or more of the foregoing. Also, the term "model" may in some embodiments cover neural network architecture, or components thereof, such as layers, interconnections weights, or any combination of the foregoing.

Furthermore, as used in this specification, the phrase "determine whether the driver is engaged with a driving task or not", or any of other similar phrases, do not necessarily require both (1) "driver is engaged with a driving task" and (2) "driver is not engaged with a driving task" to be possible determination outcomes. Rather, such phrase and similar phases are intended to cover (1) "driver is engaged with a driving task" as a possible determination outcome, or (2) "driver is not engaged with a driving task" as a possible determination outcome, or (3) both "driver is engaged with a driving task" and "driver is not engaged with a driving task" to be possible determination outcomes. Also, the above phrase and other similar phrases do not exclude other determination outcomes, such as an outcome indicating that a state of the driver is unknown. For example, the above phrase or other similar phrases cover an embodiment in which a processing unit is configured to determine that (1) the driver is engaged with a driving task, or (2) it is unknown whether the driver is engaged with a driving task, as two possible processing outcomes (because the first part of the phrase mentions the determination outcome (1)). As another example, the above phrase or other similar phrases cover an embodiment in which a processing unit is configured to determine that (1) the driver is not engaged with a driving task, or (2) it is unknown whether the driver is not engaged with a driving task, as two possible processing outcomes (because the later part of the phrase mentions the determination outcome (2)).

Also, as used in this specification, the term "signal" may refer to one or more signals. By means of non-limiting examples, a signal may include one or more data, one or more information, one or more signal values, one or more discrete values, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An apparatus comprising:
a first sensor configured to provide a first input associated with an environment outside a vehicle;
a second sensor configured to provide a second input associated with an operation of the vehicle; and
a processing unit configured to receive the first input from the first sensor, and the second input from the second sensor;
wherein the processing unit comprises a first-stage processing system and a second-stage processing system;
wherein the first-stage processing system is configured to receive the first input from the first sensor and the second input from the second sensor, process the first input to obtain a first time series of information, and process the second input to obtain a second time series of information;
wherein the second-stage processing system comprises a neural network model configured to receive the first time series of information and a second time series of information in parallel; and
wherein the neural network is configured to process the first time series and the second time series to determine a probability of a predicted event associated with an operation of the vehicle.

2. The apparatus of claim 1, wherein the first input has fewer dimensions or less complexity compared to the first time series of information.

3. The apparatus of claim 1, wherein the first time series of information indicates a first risk factor, and a second time series of information indicates a second risk factor.

4. The apparatus of claim 1, wherein the processing unit is configured to package the first time series and the second time series into a data structure for feeding to the neural network model.

5. The apparatus of claim 4, wherein the data structure comprises a two-dimensional matrix of data.

6. The apparatus of claim 1, wherein the first time series indicates conditions outside the vehicle for different respective time points, and the second time series indicates states of a driver and/or states of the vehicle for the different respective time points.

7. The apparatus of claim 1, wherein the probability of the predicted event is a first probability of a first predicted event,
wherein the processing unit is configured to determine a second probability of a second predicted event, wherein the first predicted event and the second predicted event are associated with the operation of the vehicle; and
wherein the processing unit is configured to calculate a risk score based on the first probability of the first predicted event, and based on the second probability of the second predicted event.

8. The apparatus of claim 7, wherein the first predicted event is a collision event, and the second predicted event is a non-risky event; and wherein the processing unit is configured to calculate the risk score based on the first probability of the collision event, and based on the second probability of the non-risky event.

9. The apparatus of claim 7, wherein the processing unit is configured to calculate the risk score by applying a first weight to the first probability to obtain a first weighted probability, applying a second weight to the second probability to obtain a second weighted probability, and adding the first weighted probability and the second weighted probability.

10. The apparatus of claim 7, wherein the processing unit is configured to determine a third probability of a third predicted event; and
wherein the processing unit is configured to calculate the risk score based on the first probability of the first predicted event, based on the second probability of the second predicted event, and based on the third probability of the third predicted event.

11. The apparatus of claim 10, wherein the first predicted event is a collision event, the second predicted event is a near-collision event, and the third predicted event is a non-risky event; and
wherein the processing unit is configured to calculate the risk score based on the first probability of the collision event, based on the second probability of the near-collision event, and based on the third probability of the non-risky event.

12. The apparatus of claim 10, wherein the processing unit is configured to calculate the risk score by:
applying a first weight to the first probability to obtain a first weighted probability,
applying a second weight to the second probability to obtain a second weighted probability,
applying a third weight to the third probability to obtain a third weighted probability, and
adding the first weighted probability, the second weighted probability, and the third weighted probability.

13. The apparatus of claim 1, wherein the first input and the second input are obtained in the past T seconds, and wherein the processing unit is configured to process the first input and the second input obtained in the past T seconds to determine the probability of the predicted event, wherein T is at least 3 seconds.

14. The apparatus of claim 1, wherein the predicted event is for a future time that is at least 1 second from a current time.

15. The apparatus of claim 1, wherein the processing unit is configured to calculate a first risk score for a first time point based on the probability, and wherein the processing unit is also configured to calculate a second risk score for a second time point, and to determine a difference between the first risk score and the second risk score, wherein the difference indicates whether a risky situation is escalating or subsiding.

16. The apparatus of claim 1, wherein the processing unit is configured to determine a risk score based on the probability of the predicted event.

17. The apparatus of claim 16, wherein the processing unit is configured to generate a control signal based on the risk score.

18. The apparatus of claim 17, wherein the processing unit is configured to generate the control signal if the risk score meets a criterion.

19. The apparatus of claim 18, wherein the processing unit is configured to generate the control signal for operating a device if the risk score meets the criterion.

20. The apparatus of claim 19, wherein the device comprises:
a speaker for generating an alarm;
a display or a light-emitting device for providing a visual signal;
a haptic feedback device;
a collision avoidance system; or
a vehicle control for the vehicle.

21. The apparatus of claim 1, wherein the first time series and the second time series respectively comprise any two or more of: distance to lead vehicle, distance to intersection stop line, speed of the vehicle, time-to-collision, time-to-intersection-violation, estimated braking distance, information regarding road condition, information regarding special zone, information regarding environment, information regarding traffic condition, time of day, information regarding visibility condition, information regarding identified object, object position, object moving direction of, object speed, bounding box(es), operating parameter(s) of the vehicle, information regarding state(s) of a driver, information regarding driver history, time spent driving consecutively, proximity to meal times, information regarding accident history, and audio information.

22. The apparatus of claim 1, wherein the first sensor comprises a camera, a Lidar, a radar, or any combination of the foregoing, configured to sense the environment outside a vehicle.

23. The apparatus of claim 1, wherein the second sensor comprises a camera configured to view a driver of the vehicle.

24. The apparatus of claim 1, wherein the second sensor comprises one or more sensing units configured to sense one or more characteristics of the vehicle.

25. The apparatus of claim 1, wherein the first input comprises first images, and the second input comprises second images, and wherein the first-stage processing system is configured to receive first images and the second images, process the first images to obtain a first time series of information, and process the second images to obtain a second time series of information.

* * * * *